(12) United States Patent
Fricke et al.

(10) Patent No.: US 8,289,966 B1
(45) Date of Patent: Oct. 16, 2012

(54) PACKET INGRESS/EGRESS BLOCK AND SYSTEM AND METHOD FOR RECEIVING, TRANSMITTING, AND MANAGING PACKETIZED DATA

(75) Inventors: Stephen John Joseph Fricke, Felton, CA (US); William Charles Jordan, Tres Pinos, CA (US); Bryon Irwin Moyer, Sunnyvale, CA (US); Roberto Attias, Alameda, CA (US); Akash Renukadas Deshpande, San Jose, CA (US); Navendu Sinha, Milpitas, CA (US); Vineet Gupta, San Jose, CA (US); Shobhit Sonakiya, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 898 days.

(21) Appl. No.: 11/607,429

(22) Filed: Dec. 1, 2006

(51) Int. Cl.
*G06F 13/12* (2006.01)
*H04L 12/28* (2006.01)

(52) U.S. Cl. .......... 370/392; 370/389; 370/474; 710/30; 710/62; 710/65

(58) Field of Classification Search .................. None
See application file for complete search history.

(56) References Cited

U.S. PATENT DOCUMENTS

| | | | | | |
|---|---|---|---|---|---|
| 4,642,789 | A | | 2/1987 | Lavelle | 345/537 |
| 4,700,292 | A | | 10/1987 | Campanini | 709/211 |
| 5,408,469 | A | * | 4/1995 | Opher et al. | 370/399 |
| 5,758,106 | A | | 5/1998 | Fenwick et al. | |
| 5,898,889 | A | * | 4/1999 | Davis et al. | 710/29 |
| 5,948,067 | A | * | 9/1999 | Caldara et al. | 709/236 |
| 5,996,032 | A | * | 11/1999 | Baker | 710/62 |
| 6,009,096 | A | * | 12/1999 | Jaisingh et al. | 370/310.1 |
| 6,058,438 | A | | 5/2000 | Diehl et al. | 710/24 |
| 6,088,740 | A | | 7/2000 | Ghaffari et al. | |
| 6,163,539 | A | * | 12/2000 | Alexander et al. | 370/392 |
| 6,172,540 | B1 | * | 1/2001 | Gandhi | 327/145 |
| 6,182,177 | B1 | | 1/2001 | Harriman | |
| 6,381,242 | B1 | * | 4/2002 | Maher et al. | 370/394 |
| 6,408,369 | B1 | | 6/2002 | Garrett et al. | 711/165 |
| 6,421,751 | B1 | | 7/2002 | Gulick | |
| 6,453,360 | B1 | * | 9/2002 | Muller et al. | 709/250 |
| 6,480,489 | B1 | * | 11/2002 | Muller et al. | 370/389 |
| 6,513,102 | B2 | | 1/2003 | Garrett et al. | 711/165 |

(Continued)

OTHER PUBLICATIONS

'Design of an Efficient Memory Subsystem for Network Processor' by Gong et al., copyright 2005, IEEE.*

(Continued)

*Primary Examiner* — Steven Snyder
(74) *Attorney, Agent, or Firm* — Fenwick & West LLP

(57) ABSTRACT

Packet ingress/egress block and logic and system and method for receiving, transmitting, and managing packetized data. System including a line port; a computing resource output port; a host interface; a memory, and a block that: receives information on the line port, creates a context including information for managing computation derived from the received information, and sends context out on computing resource output port. Device comprising first circuit component including line port that receives information, second circuit component that generates context information including an information for managing computation derived from the received unit of information; and third circuit component that communicates the generated context out to a computing resource output port. Method comprising receiving information, generating context information including an information for managing computation derived from the received unit of information; and communicating the generated context information out to an external receiver via a computing resource output port.

33 Claims, 49 Drawing Sheets

U.S. PATENT DOCUMENTS

| | | | |
|---|---|---|---|
| 6,606,301 B1* | 8/2003 | Muller et al. | 370/230 |
| 6,700,888 B1* | 3/2004 | Jonsson et al. | 370/392 |
| 6,804,679 B2 | 10/2004 | Jevons et al. | 707/102 |
| 7,076,595 B1 | 7/2006 | Dao et al. | |
| 7,133,984 B1 | 11/2006 | Dickensheets | |
| 7,162,608 B2 | 1/2007 | Bethard | 711/207 |
| 7,228,422 B2* | 6/2007 | Morioka et al. | 713/171 |
| 7,246,197 B2 | 7/2007 | Rosenbluth et al. | 711/108 |
| 7,289,537 B1* | 10/2007 | Devanagondi et al. | 370/474 |
| 7,295,575 B2* | 11/2007 | Ido et al. | 370/474 |
| 7,307,986 B2* | 12/2007 | Henderson et al. | 370/366 |
| 7,320,041 B2* | 1/2008 | Biran et al. | 710/29 |
| 7,325,122 B2 | 1/2008 | Abdelilah et al. | 712/14 |
| 7,337,201 B1 | 2/2008 | Yellin et al. | 707/206 |
| 7,380,106 B1 | 5/2008 | Bilski | |
| 7,386,704 B2 | 6/2008 | Schulz et al. | |
| 7,389,315 B1 | 6/2008 | Scott | 707/205 |
| 7,389,403 B1 | 6/2008 | Alpert et al. | |
| 7,487,302 B2 | 2/2009 | Gouldey et al. | |
| 7,545,809 B2* | 6/2009 | Engbersen et al. | 370/392 |
| 7,602,801 B2* | 10/2009 | Hayashi et al. | 370/429 |
| 7,623,539 B2* | 11/2009 | Isley | 370/429 |
| 7,715,437 B2* | 5/2010 | Denney et al. | 370/474 |
| 7,742,480 B2* | 6/2010 | Calvignac et al. | 370/392 |
| 7,826,486 B2* | 11/2010 | Calvignac et al. | 370/476 |
| 7,835,398 B2* | 11/2010 | Denney et al. | 370/474 |
| 7,839,852 B2* | 11/2010 | Liu et al. | 370/392 |
| 7,924,882 B2* | 4/2011 | Nagai et al. | 370/474 |
| 2002/0026502 A1* | 2/2002 | Phillips et al. | 709/219 |
| 2002/0085551 A1* | 7/2002 | Tzeng | 370/389 |
| 2002/0091826 A1 | 7/2002 | Comeau et al. | |
| 2002/0105910 A1* | 8/2002 | Maher et al. | 370/235 |
| 2002/0136211 A1* | 9/2002 | Battle et al. | 370/389 |
| 2002/0145974 A1* | 10/2002 | Saidi et al. | 370/230 |
| 2002/0161941 A1 | 10/2002 | Chue et al. | 710/22 |
| 2002/0163914 A1* | 11/2002 | Dooley | 370/394 |
| 2002/0163922 A1* | 11/2002 | Dooley et al. | 370/412 |
| 2002/0174279 A1* | 11/2002 | Wynne et al. | 710/113 |
| 2002/0174316 A1 | 11/2002 | Dale et al. | |
| 2003/0031172 A1* | 2/2003 | Grinfeld | 370/389 |
| 2003/0079104 A1 | 4/2003 | Bethard | 711/207 |
| 2003/0086300 A1 | 5/2003 | Noyes et al. | |
| 2003/0105617 A1 | 6/2003 | Cadambi et al. | |
| 2003/0145155 A1 | 7/2003 | Wolrich et al. | |
| 2003/0152078 A1* | 8/2003 | Henderson et al. | 370/389 |
| 2003/0152084 A1* | 8/2003 | Lee et al. | 370/395.21 |
| 2003/0161327 A1 | 8/2003 | Vlodavsky et al. | |
| 2003/0177252 A1 | 9/2003 | Krichevski et al. | |
| 2003/0231634 A1* | 12/2003 | Henderson et al. | 370/395.32 |
| 2003/0233503 A1* | 12/2003 | Yang et al. | 710/100 |
| 2004/0004961 A1* | 1/2004 | Lakshmanamurthy et al. | 370/364 |
| 2004/0004964 A1* | 1/2004 | Lakshmanamurthy et al. | 370/394 |
| 2004/0037276 A1* | 2/2004 | Henderson et al. | 370/371 |
| 2004/0039891 A1 | 2/2004 | Leung et al. | |
| 2004/0054837 A1* | 3/2004 | Biran et al. | 710/305 |
| 2004/0083308 A1 | 4/2004 | Sebastian et al. | |
| 2004/0098701 A1 | 5/2004 | Klein | |
| 2004/0193733 A1* | 9/2004 | Vangal et al. | 709/250 |
| 2004/0193768 A1* | 9/2004 | Carnevale et al. | 710/260 |
| 2004/0205110 A1 | 10/2004 | Hinshaw | |
| 2004/0258043 A1* | 12/2004 | Engbersen et al. | 370/351 |
| 2005/0013318 A1 | 1/2005 | Fike et al. | |
| 2005/0027958 A1 | 2/2005 | Fuente et al. | |
| 2005/0038946 A1 | 2/2005 | Borden | |
| 2005/0080928 A1 | 4/2005 | Beverly et al. | 709/245 |
| 2005/0165985 A1* | 7/2005 | Vangal et al. | 710/107 |
| 2005/0188129 A1 | 8/2005 | Abdelilah et al. | |
| 2005/0259672 A1* | 11/2005 | Eduri | 370/412 |
| 2005/0278502 A1 | 12/2005 | Hundley | |
| 2006/0007862 A1* | 1/2006 | Sayeedi et al. | 370/235 |
| 2006/0039374 A1* | 2/2006 | Belz et al. | 370/389 |
| 2006/0056435 A1* | 3/2006 | Biran et al. | 370/412 |
| 2006/0112272 A1* | 5/2006 | Morioka et al. | 713/171 |
| 2006/0129767 A1 | 6/2006 | Berenyi et al. | |
| 2006/0146808 A1* | 7/2006 | Campini et al. | 370/360 |
| 2006/0149921 A1* | 7/2006 | Lim | 712/10 |
| 2006/0221976 A1* | 10/2006 | Isley | 370/395.6 |
| 2006/0251120 A1* | 11/2006 | Arimilli et al. | 370/469 |
| 2006/0294149 A1 | 12/2006 | Seshadri et al. | 707/200 |
| 2007/0088932 A1 | 4/2007 | Bethard | 711/207 |
| 2007/0248075 A1* | 10/2007 | Liu et al. | 370/349 |
| 2008/0010390 A1 | 1/2008 | Abdelilah et al. | 710/52 |
| 2008/0013541 A1* | 1/2008 | Calvignac et al. | 370/392 |
| 2008/0072005 A1 | 3/2008 | Abdelilah | 711/165 |
| 2008/0155135 A1 | 6/2008 | Garg et al. | |
| 2008/0253398 A1* | 10/2008 | Calvignac et al. | 370/474 |
| 2009/0067429 A1* | 3/2009 | Nagai et al. | 370/392 |
| 2009/0296738 A1* | 12/2009 | Shimada | 370/474 |

OTHER PUBLICATIONS

'Approaching ATM switch architectures' article by Bert Williams and Rob Newman in Network World, Nov. 1992.*

* cited by examiner

PACKET INGRESS/EGRESS BLOCK AND SYSTEM AND METHOD FOR RECEIVING, TRANSMITTING, AND MANAGING PACKETIZED DATA

RELATED APPLICATIONS

This application is related to U.S. application Ser. No. 11/607,474, filed on 1 Dec. 2006, entitled "Structured Block Transfer Module, System Architecture, and Method For Transferring,"; U.S. application Ser. No. 11/607,481, filed on 1 Dec. 2006, entitled "System and Method For Managing Abstract Objects In Memory,"; and U.S. application Ser. No. 11/607,452, filed on 1 Dec. 2006, entitled "System and Method For Generating Hardware Accelerators and Processor Offloads,"; each of which applications are hereby incorporated by reference in their entirety.

FIELD OF THE INVENTION

This invention pertains generally to a Packet Ingress/Egress Block and to systems and methods for receiving, transmitting, and/or managing data especially when the data are packetized data or packets.

BACKGROUND OF THE INVENTION

Packet processing engines need to have some way to bring a packet into the system for processing. There have conventionally been a number of alternatives ways of accomplishing this, the choice often depending on the throughput required.

One of the simplest way is by copying a packet into memory and providing a pointer to that packet in memory to a general-purpose processor. The processor software or computer code would then operate on the packet while in memory. This approach typically works only for low-performance systems, such as systems having throughput requirements less than about 100 Megabits per second. FIG. 1 is a diagrammatic illustration showing an example using a general-purpose processor. General Purpose Processor 100, Packet Source/Sink 140, and Memory 120 are all connected to and communicate with each other via Main bus 150. Packets arrive and are sent via Packet Source/Sink 140, and are stored in Memory 120. A register 110 inside General Purpose Processor 100 contains the address of a Packet 130 in Memory 120.

For higher performance, one may dedicate some specific logic for processing the packet contents at higher speed, such as an accelerator to and under the control of a general-purpose processor. While this can increase the speed of the actual packet processing, the general-purpose processor may usually still remain a bottleneck and limit packet throughput. FIG. 2 illustrates General Purpose Processor 200, Packet Source/Sink 240, Memory 220, and Packet Processing Offload 250 all connected by and intercommunicating via Main bus 260. Packet 230 in memory is sent to Packet Processing Offload 250 for higher-speed processing, under the control of General Purpose Processor 200.

One possible partial solution for obtaining greater performance might be obtained by having the traffic come directly into Accelerator 250 so that packets can be processed directly. Only occasional "exception" packets would be sent to the general-purpose processor. Exceptions, might for example arise when management packets are sent. Management packets do not normally contain network traffic, but rather contain instructions for changing network characteristics, or requests for network information. This for example is shown in FIG. 3, where Packet Source/Sink 310 is directly connected to Packet Processing Fast Path 320 without having to traverse Main bus 330 or be processed by General Purpose Processor 300.

There are two ways to provide access to the packet data for the fast path. One is to treat the packet as a stream, and have the stream of data run through the fast path, as shown in FIG. 4. Here packet data going to and from Packet Source/Sink 410 is sent in streams, arriving into the Packet Processing Fast Path 420 on stream 440 and leaving Packet Processing Fast Path 420 via stream 450. However, many applications only require operations on a small portion of the entire packet, so that having to move the entire packet hampers throughput.

FIG. 5 describes an alternative to the above described system and approach. Here full packet 540 is broken into two portions: a first portion 570 that will affect computation, and a second portion 560 that will not affect computation. The first portion 570 streams through Packet Processing Fast Path 520; the second portion 560 is stored in Memory 500. The first portion, when combined with other optional data such as a pointer to the second portion 560 in memory, a context size, and other such optional information, may be referred to as the "context." The second portion 560 may conveniently be referred to as the "payload", even though it may or may not constitute the entire actual payload, or may include more than the actual payload. The portion of the context that was severed from the payload prior to entering the fast path must be rejoined with the payload before the packet is sent on or forwarded to the next destination. FIG. 5 shows an exiting context 580 and payload 590 being rejoined into full packet 550 when being sent back to Packet Source/Sink 510.

One conventional approach illustrated and described relative to the configuration of FIG. 6 is to use a Media Switch Fabric (MSF) circuit or similar circuit. FIG. 6 shows Packet Processing Fast Path 600, being fed by Packet Source/Sink 610. MSF 640 takes the packets and sends the context to Computing Resources 630 via connection 660, and sends the payload portion to Memory 620 via connection 670. Exiting packets are rejoined in MSF 640 by combining the context that arrives on connection 650 with the payload retrieved from Memory 620 on connection 670. The functioning of MSF 640 is controlled by the Computing Resources 630; the computation determines which packets to intercept, how to divide and route the bits internally, and any other operations performed by MSF 640. One downside or disadvantage to this approach is that computational resources are required for this, making less processing or computing power available for the actual packet processing algorithms.

In light of these problems and limitations on conventional systems and methods, it will be apparent that there remains a need for a system, device, and method that provides a system for receiving, transmitting, and managing packetized data that has a high-throughput and does not consume computational or processing resources that may better be utilized for actual packet processing.

SUMMARY OF THE INVENTION

In one aspect the invention provides a packet ingress/egress block and logic and system and method for receiving, transmitting, and managing packetized data.

In another aspect the invention provides a system comprising at least one line port; at least one computing resource output port; a host interface; at least one memory, and at least one block that: (i) receives a unit of information on the at least one line port, (ii) creates a context including information for managing computation derived from the received unit of information, and (iii) sends the context out on the computing resource output port.

In another aspect the invention provides a circuit comprising: a first circuit component including at least one line port that receives a unit of information; a second circuit component that generates a context information including an information for managing computation derived from the received unit of information; and a third circuit component that communicates the generated context out to a computing resource output port.

In another aspect the invention provides a method comprising the steps of: receiving a unit of information; generating a context information including an information for managing computation derived from the received unit of information; and communicating the generated context information out to an external receiver via a computing resource output port.

In yet another aspect the invention provides a method comprising the steps of: receiving a context information; extracting data from the context information to form a unit of information; and communicating the generated unit of information out to an external receiver via a line output port.

In still another aspect the invention provides a method comprising the steps of: receiving a context information request; generating a context information including an information for managing computation; and communicating the generated context information out to an external receiver via a computing resource output port.

In still another aspect the invention provides a computer program stored on a computer readable medium for performing the methods of the invention.

DETAILED DESCRIPTION OF THE EXEMPLARY EMBODIMENTS OF THE INVENTION

Aspects of the invention provide system, device, circuit, and method for receiving, transmitting, and managing packetized data or information. This may be referred to as a Packet Ingress/Egress Block (PE/IB) and the associated system in which it may operate as well as the method utilized within the PE/IB and system.

In one particular aspect, the invention provides a system component (sometimes referred to here as a data ingress/egress block, or as a packet ingress/egress block if the data are or include packets) that takes incoming data (or packets), divides them where appropriate, and sends the divided parts (such as a context and a payload) to their respective places or destinations. Therefore in one aspect embodiments of the invention are directed to a Data Ingress and/or Egress Block and where the data is or includes packets to a Packet Ingress and/or Egress Block; these may be self-directed at least in that once initialized, they may not be controlled by any other block.

Figure 1:
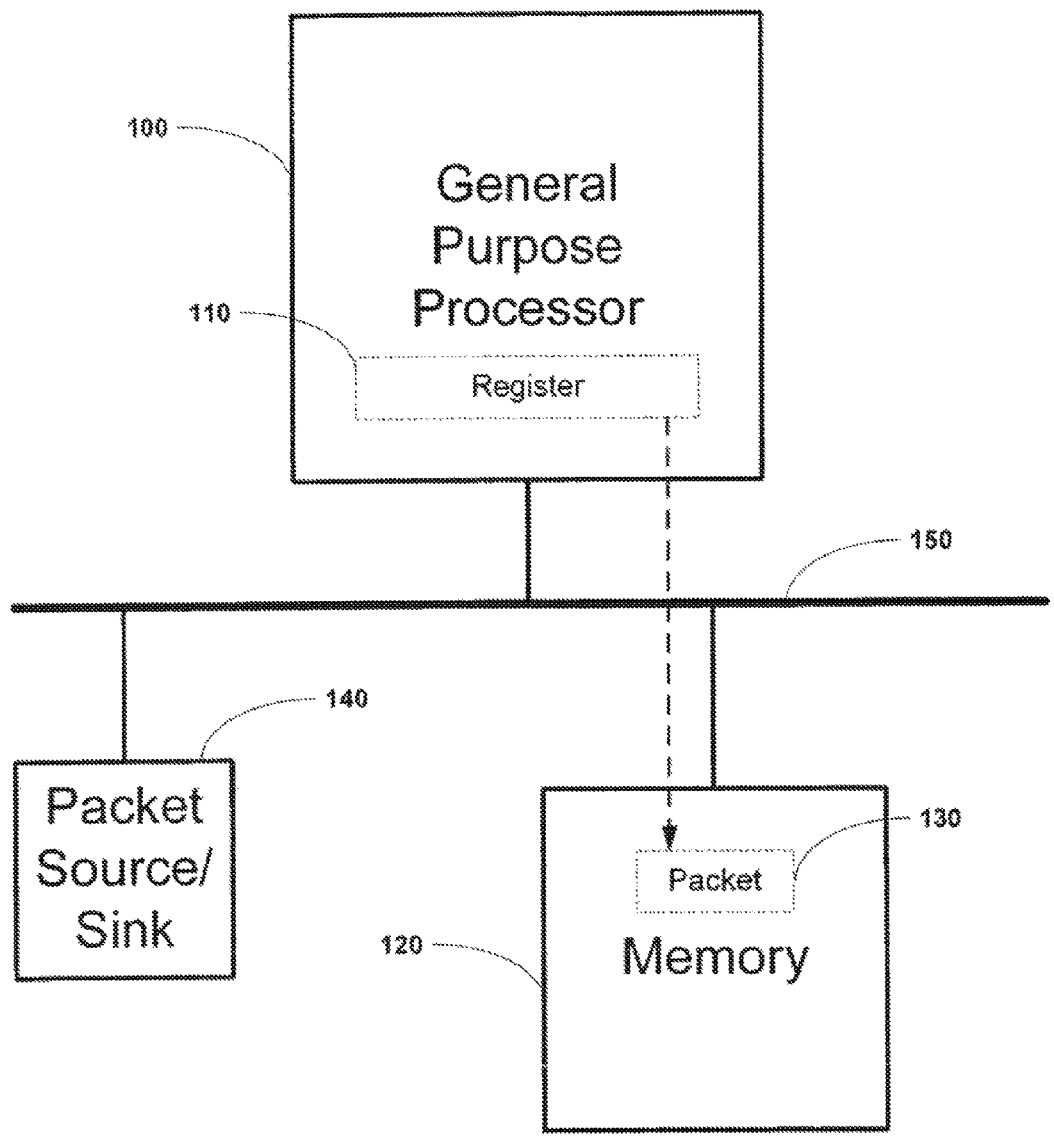
FIG. 1 shows a conventional arrangement that uses a general-purpose processor to process packets.
Figure 2:
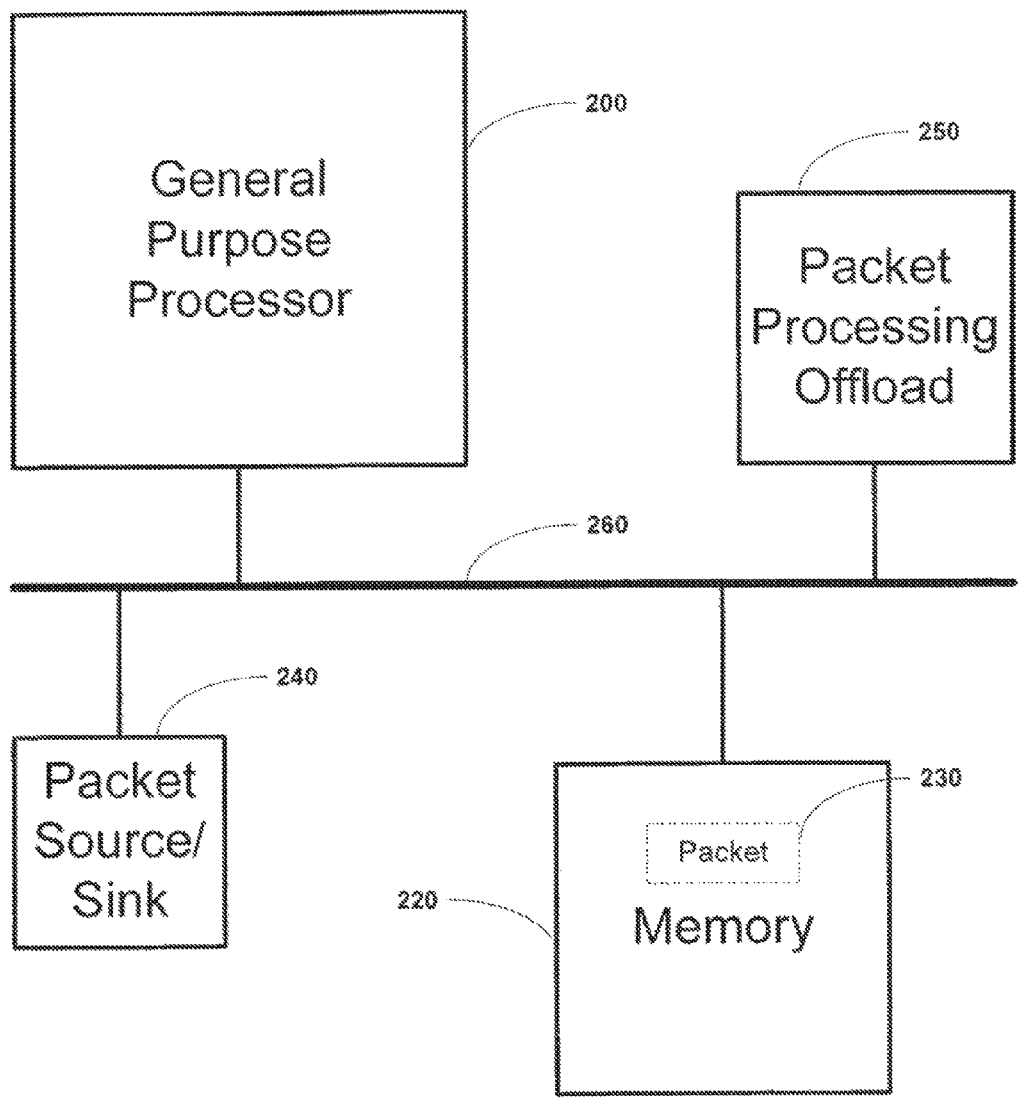
FIG. 2 shows a conventional arrangement where a dedicated packet processing offload unit handles packets, and the offload communicates with the general-purpose processor, memory, and source and sink of packets through a bus.
Figure 3:
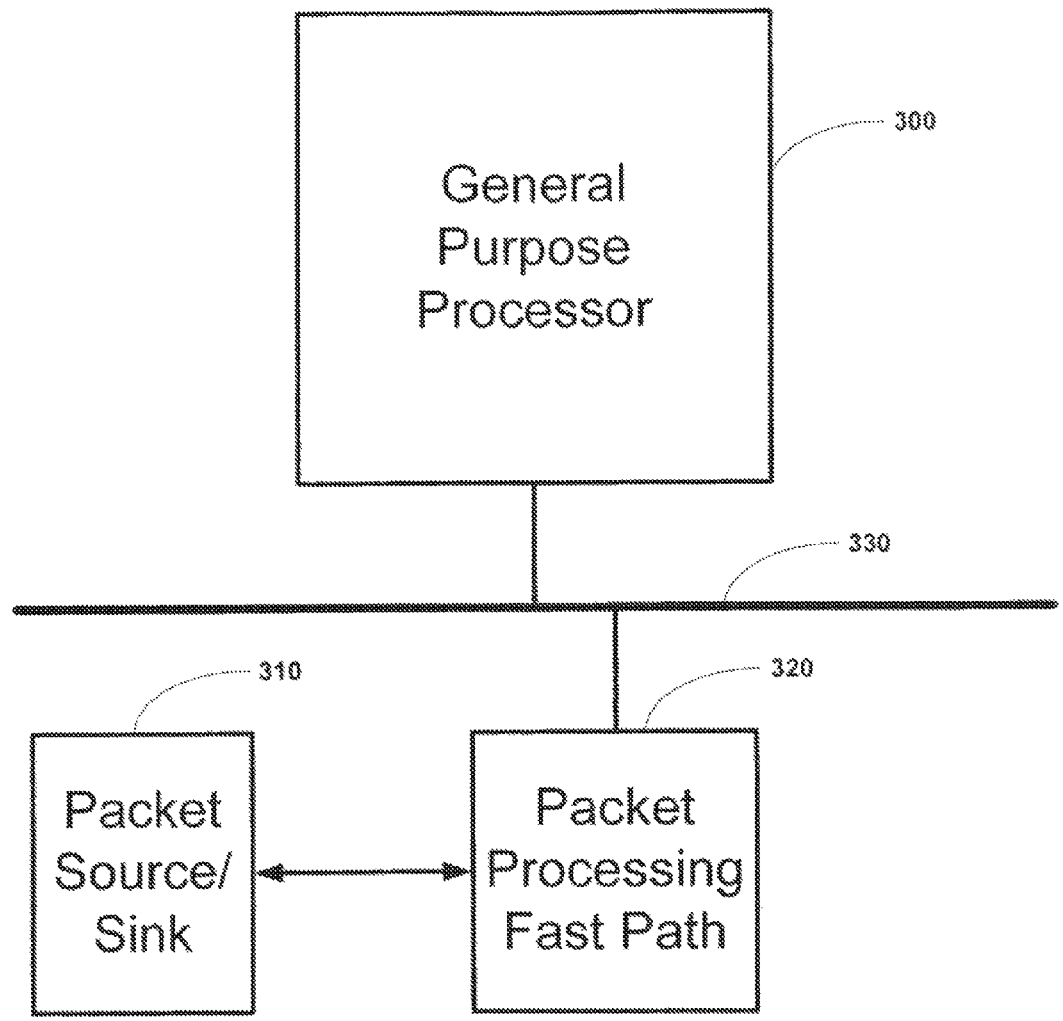
FIG. 3 shows a conventional arrangement where a packet processing offload is used for that portion of packet traffic requiring the fastest processing (the "fast path"), and where the offload communicates with the general-purpose processor through a bus, but with the source and sink of packets through a dedicated connection.
Figure 4:
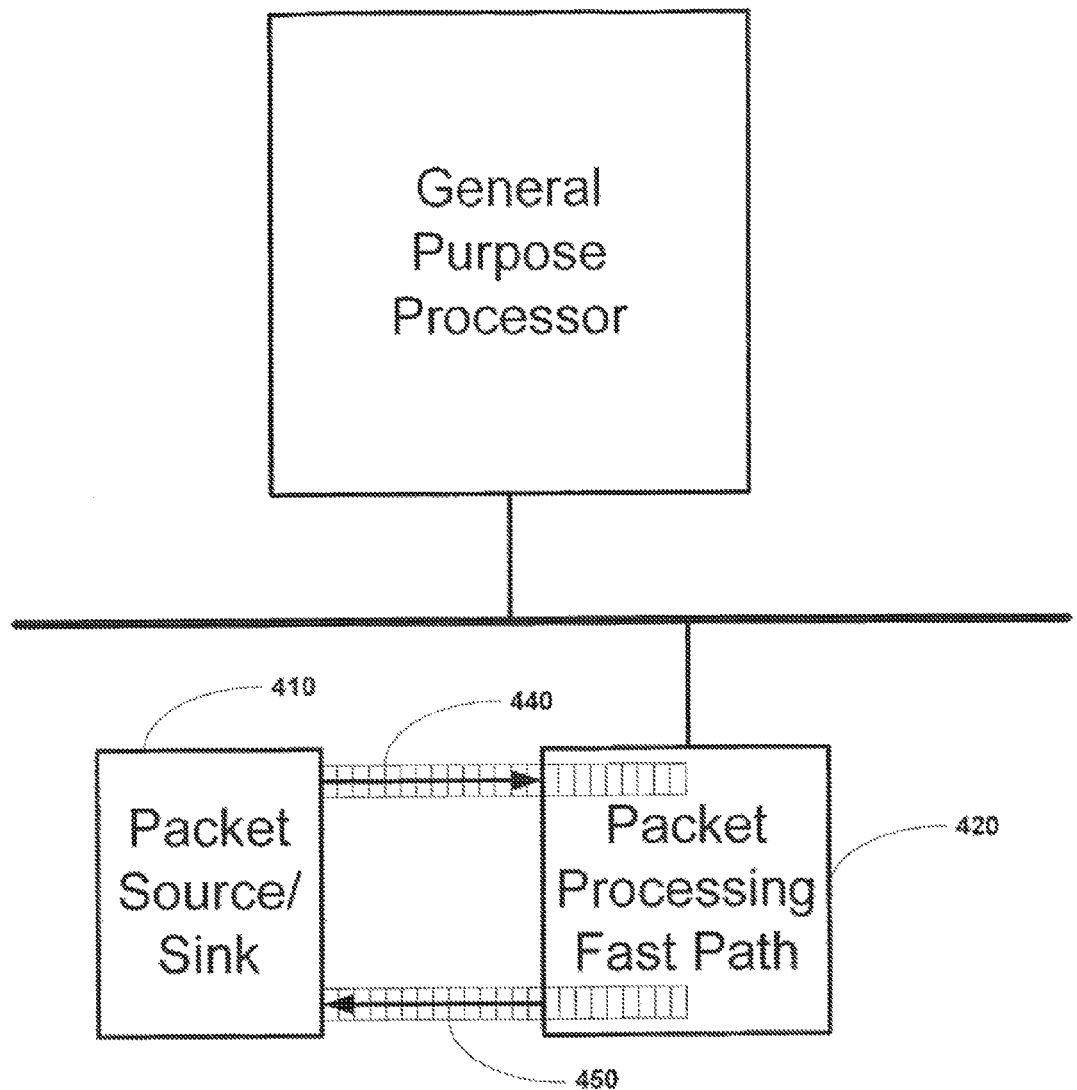
FIG. 4 shows a conventional arrangement of the type described in FIG. 3, but where the packet traffic all streams through the packet processing offload for the fast path.
Figure 5:
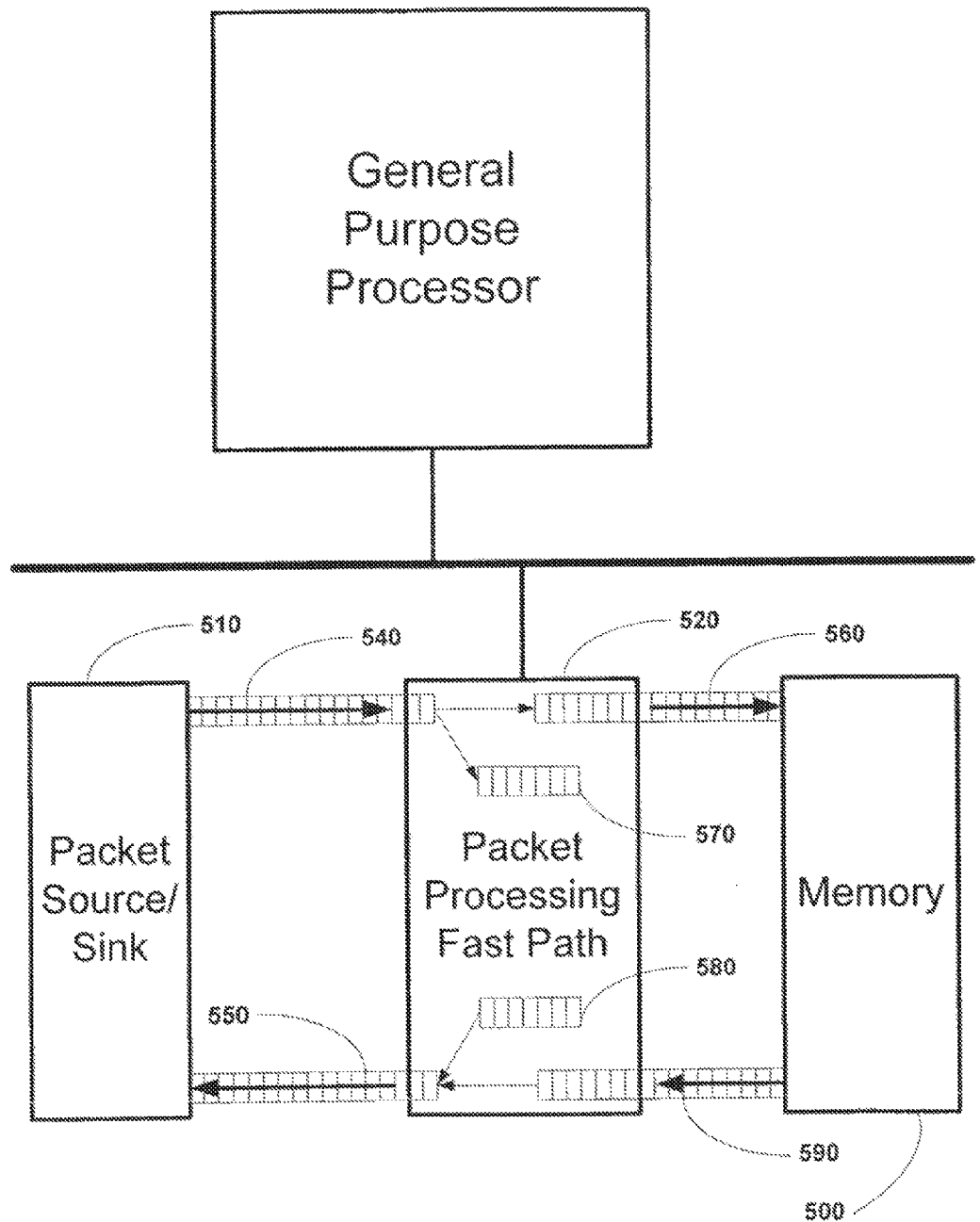
FIG. 5 shows a conventional arrangement of the type described in FIG. 3, but where the packet traffic is divided, with part of the traffic being sent into the fast path for processing, and part being stored in memory for later reassembly when being transmitted.
Figure 6:
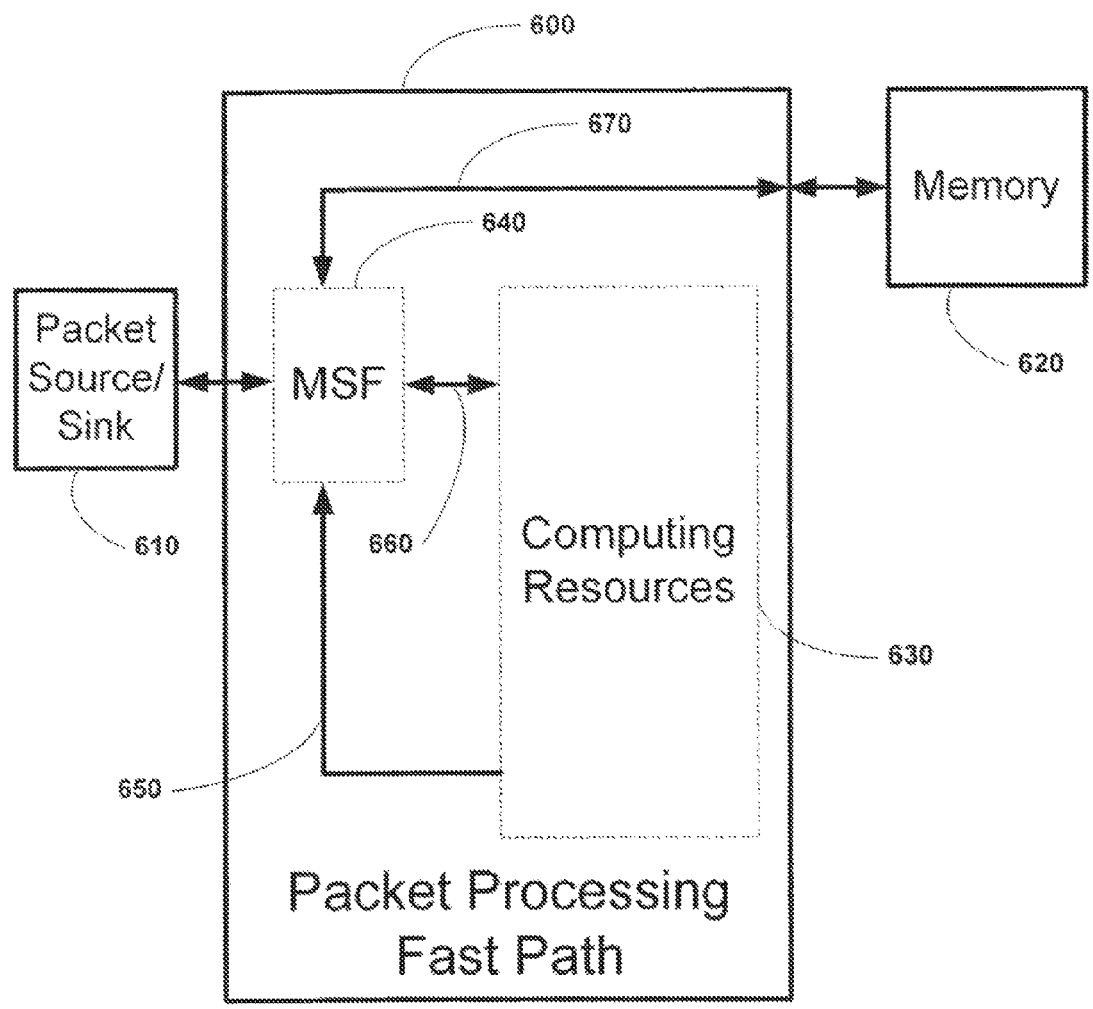
FIG. 6 shows a conventional arrangement of the type described in FIG. 5, with an MSF being used to receive and send traffic, splitting and rejoining traffic between the Computing Resources and Memory.
Figure 7:
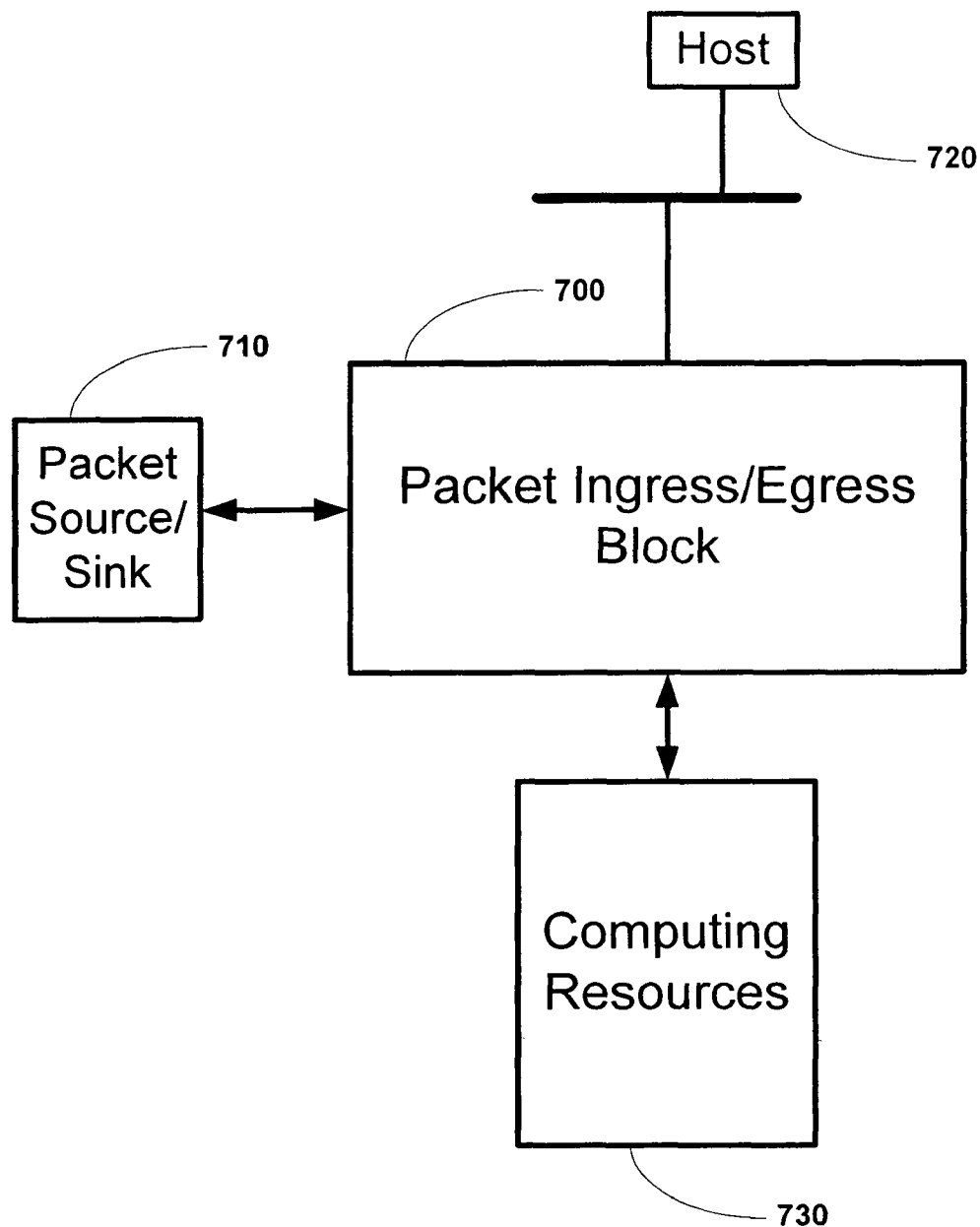
FIG. 7 shows an example of an embodiment of the invention being used in a system.

FIG. 7 is a diagrammatic illustration showing an exemplary high-level diagram of a non-limiting embodiment of the invention as connected in an exemplary configuration with other exemplary system elements. For convenience of description, embodiments of the invention are described relative to packets as the data type or structure, however, it will be appreciated that aspects and embodiments of the invention may be utilized for other data types and structures. Data or Packet Ingress/Egress Block 700 is coupled with or connected to a Packet Source/Sink 710, and can communicate with a Host 720. In at least one non-limiting embodiment the connection between the Data or Packet Ingress/Egress Block 700 and the Packet Source/Sink 710 may be a direct connection. It may also communicate with Computing Resources 730. In one non-limiting embodiment, packets received from Packet Source/Sink 710 are delivered to Packet Ingress/Egress Block 700. The contexts from those packets are sent to Computing Resources 730, where they are processed. When complete, they are sent back to Packet Ingress/Egress block 700, where they are reassembled into packets and sent back to Packet Source/Sink 710. Initialization and other management functions may optionally be performed by Host 720.

In at least one non-limiting embodiment for a data or packet-processing system and method, the Packet Ingress/Egress Block can perform any one or any combination of the following operations: (1) receive packets, (2) split packets between context and payload, (3) store payload in memory, (4) send the context into the pipeline, (5) receive contexts from the pipeline, (6) rejoin the contexts with their payload to form complete packets, (7) transmit completed packets, (8) abort the processing of an incoming packet if so directed by the packet source, (9) drop packets if so marked or identified, (10) timestamp the context, (11) store the packet size in the context, (12) store state information about the packet in the context, (13) manage the allocated memory for the payload, (14) create packets and allocate memory at the request of the host, (15) maintain statistics, (16) facilitate clock domain crossings between clock domains that may be present in various parts of the interconnected system, or any combination of these.

Figure 8:
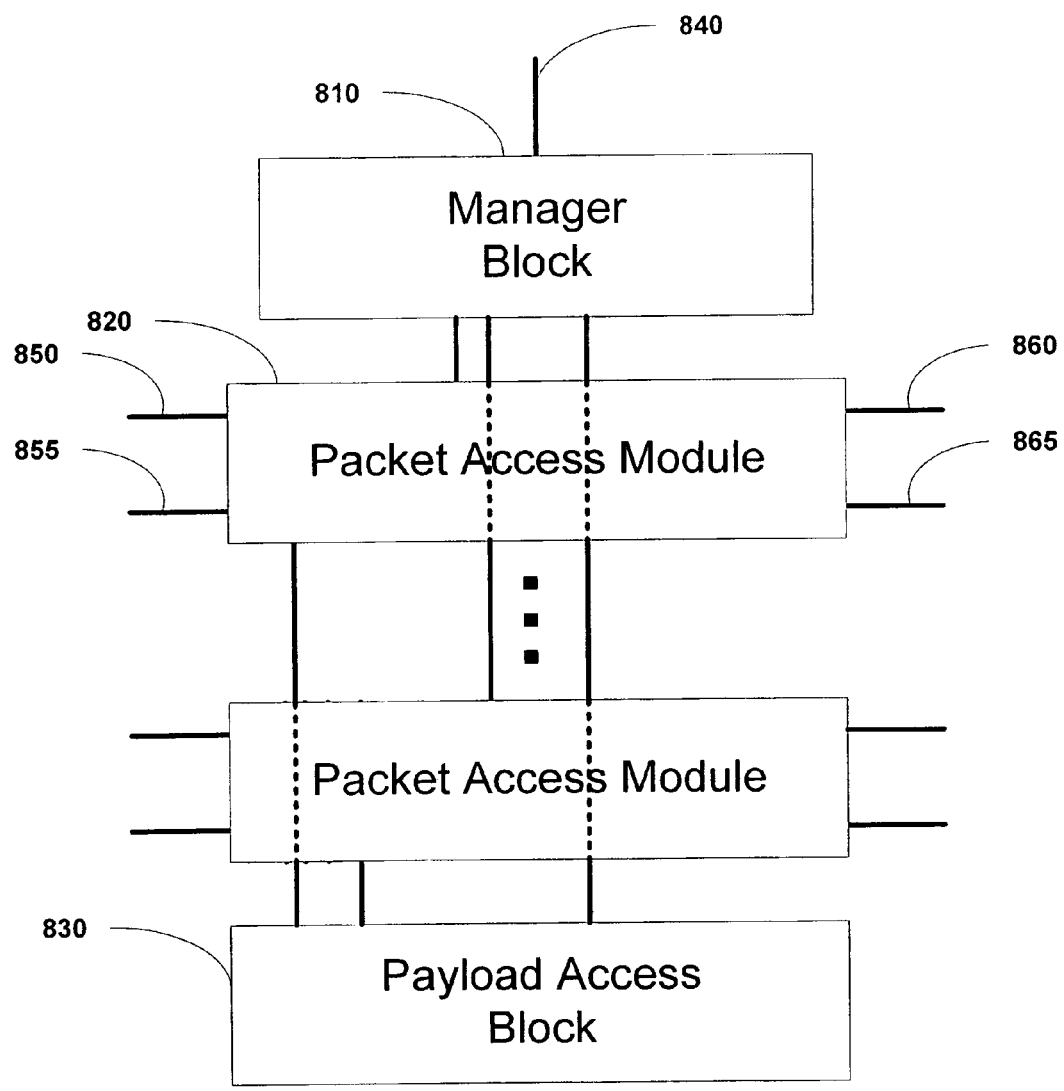
FIG. 8 shows a high-level block diagram of an exemplary embodiment of the invention.

FIG. 8 shows an exemplary block diagram of an implementation of an embodiment of the invention. For data ingress in this implementation, a series of Packet Access Modules 820 are used to receive data from input signal or signal set 850, and send data out on output signal or signal set 855. The data received on input signal or signal set 850 can be split or divided, some being sent out onto payload memory via Payload Access Block 830, and some being formatted and sent out on output signal set 860. For data egress in this implementation, data received on input signal or signal set 865 can be recombined with payload data from Payload Access Block 830, and is sent out on output signal or signal set 855.

System initialization and various other functions may advantageously be controlled by Manager Block 810, which controls various aspects of the Packet Access Modules 820 and the Payload Access Block 830. Manager Block 810 may communicate to some host computer through host connection 840, which can be any connection suitable for the host in a given application.

Figure 9:
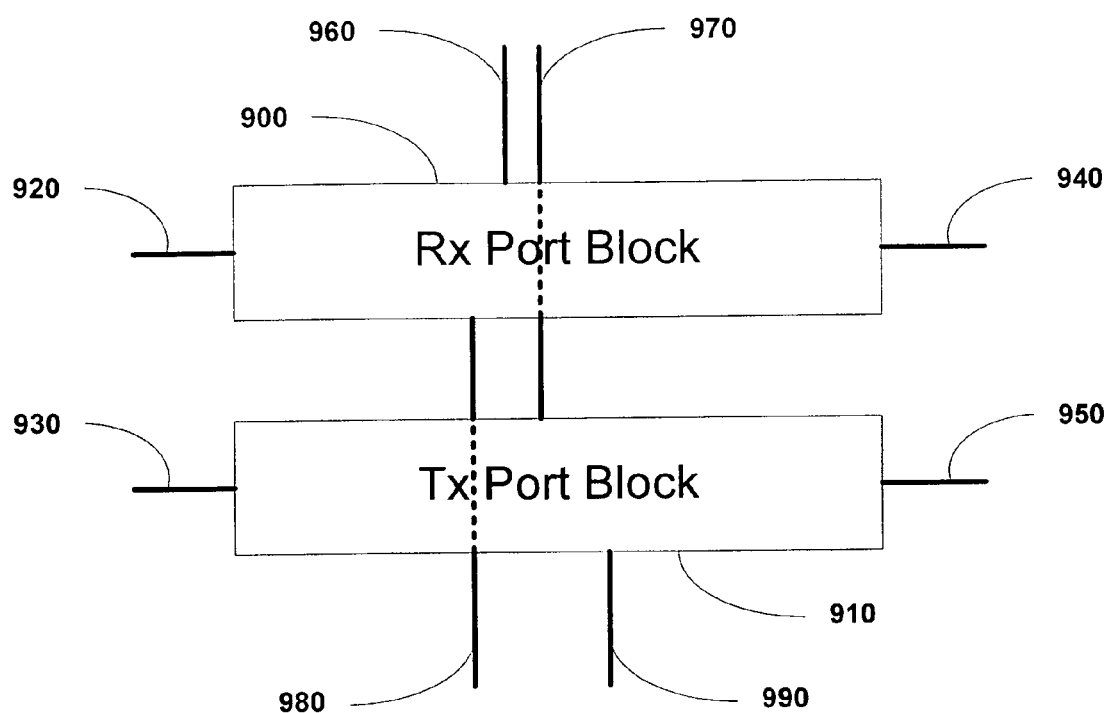
FIG. 9 shows an implementation of an exemplary embodiment of a Packet Ingress/Egress Block according to the invention.

An exemplary non-limiting embodiment of Packet Access Module 820 is illustrated in FIG. 9. It includes a receive (Rx) Rx Port Block 900 and a transmit (Tx) Tx Port Block 910. Rx Port Block 900 receives input from input signal set 920 and after optionally formatting the data, sends it out on output signal set 940, with part of the data optionally going out on output signal set 980, in accordance with a non-limiting embodiment of the invention, as will be described. Tx Port Block 910 receives formatted input on input signal set 950, and optionally combines it with data from input signal set 990, and sends it back out on output signal set 930. Both Rx Port Block 900 and Tx Port Block 910 can receive management information or instructions via input signal or signal sets 960 and 970, respectively. For ease of description it is noted that a signal set may include one signal or a plurality of signals.

Rx port block input signal set 920 may come or be received from any traffic interface. One non-limiting embodiment uses an Ethernet Media Access Controller (MAC) housed inside a Field Programmable Gate Array (FPGA). Another non-limiting embodiment uses an external Ethernet MAC with a different physical interface. Other embodiments may use an Asynchronous Transfer Mode (ATM) interface, or one of a number of other high-speed interfaces, such as by way of example but not of limitation, an interface like the System Packet Interface (SPI). The actual data received on input signal set 920 may be packet data, which includes delimiters indicating where the packet begins and ends, or could be streaming data with a pre-defined constant size for breaking up the stream, or other data. In at least some non-limiting embodiments of the invention, it is advantageous that it be known where a given block of data should start and stop. The means by which the starting and ending points are determined is not important or critical to the invention. Certain of the exemplary but preferred embodiments discussed below deal or are concerned with packet data; however the invention is not limited to packet data and this description addresses just one of the implementation choices.

The Rx port block output signal set 940 may be any kind of structure suitable for transferring data at high speeds, whether a bus, a point-to-point connection, or by other communication means. One non-limiting embodiment implemented at least in part with a Xilinx FPGA advantageously uses a Fast Simplex Link (FSL) for a connection that transfers a small descriptor of the context, and a memory bus for transferring the context itself. Output signal set 940 may be selected to match the block to which the signal set is connected, and is not critical to the invention.

The Tx port block output signal set 930 can go or be sent or communicated to any traffic interface. One non-limiting embodiment advantageously uses an Ethernet Media Access Controller (MAC) housed inside an FPGA. Another embodiment may use an external Ethernet MAC with a different physical interface. Other embodiments may use an Asynchronous Transfer Mode (ATM) interface, or one of a number of other high-speed interfaces such as by way of example but not of limitation, and interface like the System Packet Interface (SPI). The actual data sent on output signal set 930 may be or include packet data, which includes delimiters indicating where the packet begins and ends, or may be streaming data. Certain of the exemplary but preferred embodiments of the invention discussed below and elsewhere herein deal with packet data as an implementation choice; however, the invention is not limited to packet data and this description addresses just one of the implementation choices.

The Tx port block input signal set 950 may be any kind of structure suitable for transferring data at high speeds, whether a bus, a point-to-point connection, or other communication link or means. One non-limiting embodiment of the invention is implemented in a Xilinx FPGA and uses a Fast Simplex Link (FSL) for a connection that transfers a small descriptor of the context, and a memory bus for transferring the context itself. Input signal set 950 can be selected to match the block to which the signal set is connected, and is not critical to the invention.

Figure 10:
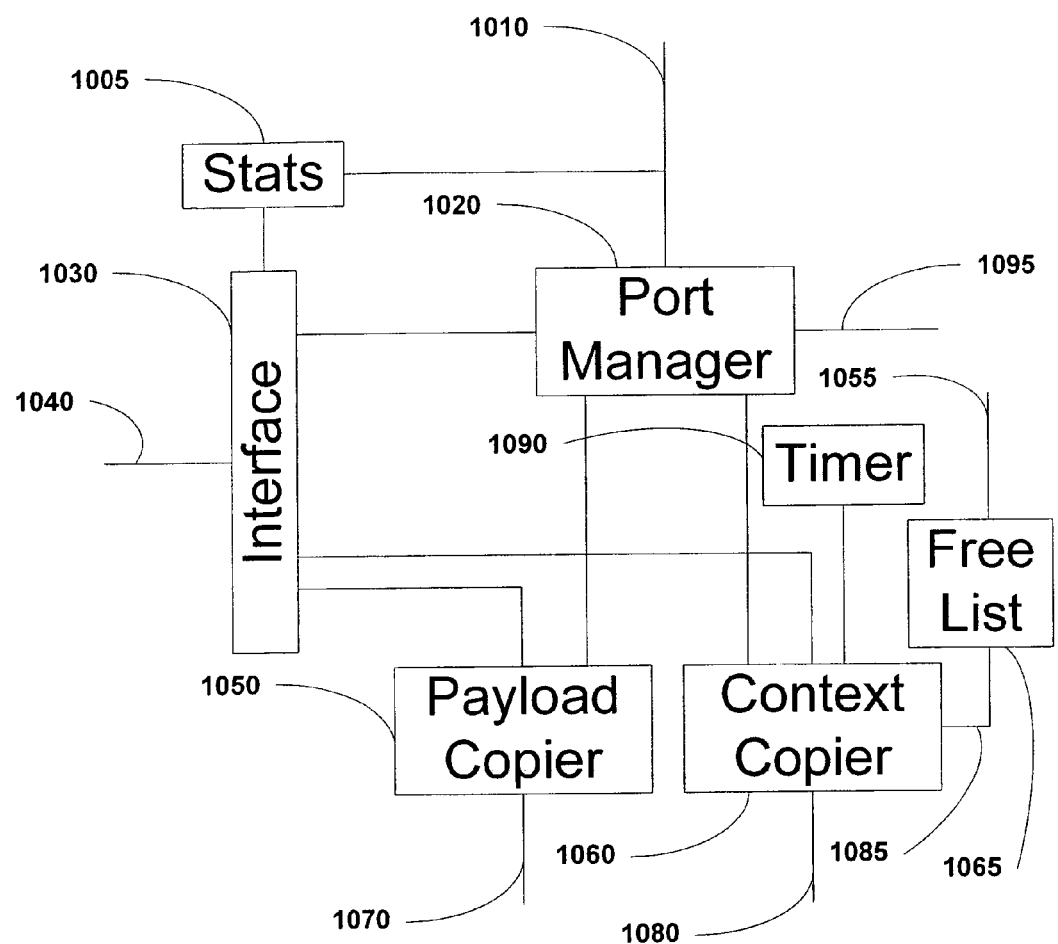
FIG. 10 shows an embodiment of the Rx Port Block of the embodiment of FIG. 8 with the Payload Copier and Context Copier having separate connections to the Interface.

FIG. 10 shows an exemplary implementation of an Rx Port Block 920 described herein above relative to the embodiment in FIG. 9. The non-limiting embodiment of FIG. 10 includes an Interface 1030, a Port Manager 1020, a Payload Copier 1050, and a Context Copier 1060. There is also a Timer block 1090 and a Stats block 1005. Port Manager 1020 may be initialized and controlled by host connection 1010, which can be a direct connection to the host bus, or, as in one exemplary but preferred embodiment, may be fed by a connection to Manager Block 810 in FIG. 8. Payload Copier sends payload data out via Payload output signal set 1070; Context Copier 1060 sends context data out via Context output signal set 1080; and Port Manager 1020 sends context descriptors out via Context Descriptor output signal set 1095. Free List 1065 may provide memory allocation pointers to Context Copier 1060 via Free List output signal set 1085; allocation pointers may be replaced on the free list via Free List input signal set 1055. Output signal sets 1070, 1080, 1085, and 1095 may be any suitable connection; the format of the connection is not critical to the invention. In one exemplary but non-limiting implementation, Payload output signal set 1070 and Context output signal set 1080 are buses, and Free List input signal set 1055, Free List output signal set 1085, and Context Descriptor output signal set 1095 are Fast Simplex Links (FSLs).

Upon detecting the presence of data at Interface 1030 on input signal set 1040, Port Manager 1020 directs the Context Copier 1060 and Payload Copier 1050 to take the data from the interface and send it out via connection 1080 and connection 1070, respectively. The way in which this copy occurs may vary based on the content of the Context and other implementation choices. The type of connection between the Interface and Payload and Context Copiers can be a point-to-point connection, bus, or any other suitable connection, and is not critical to the invention.

Figure 11:
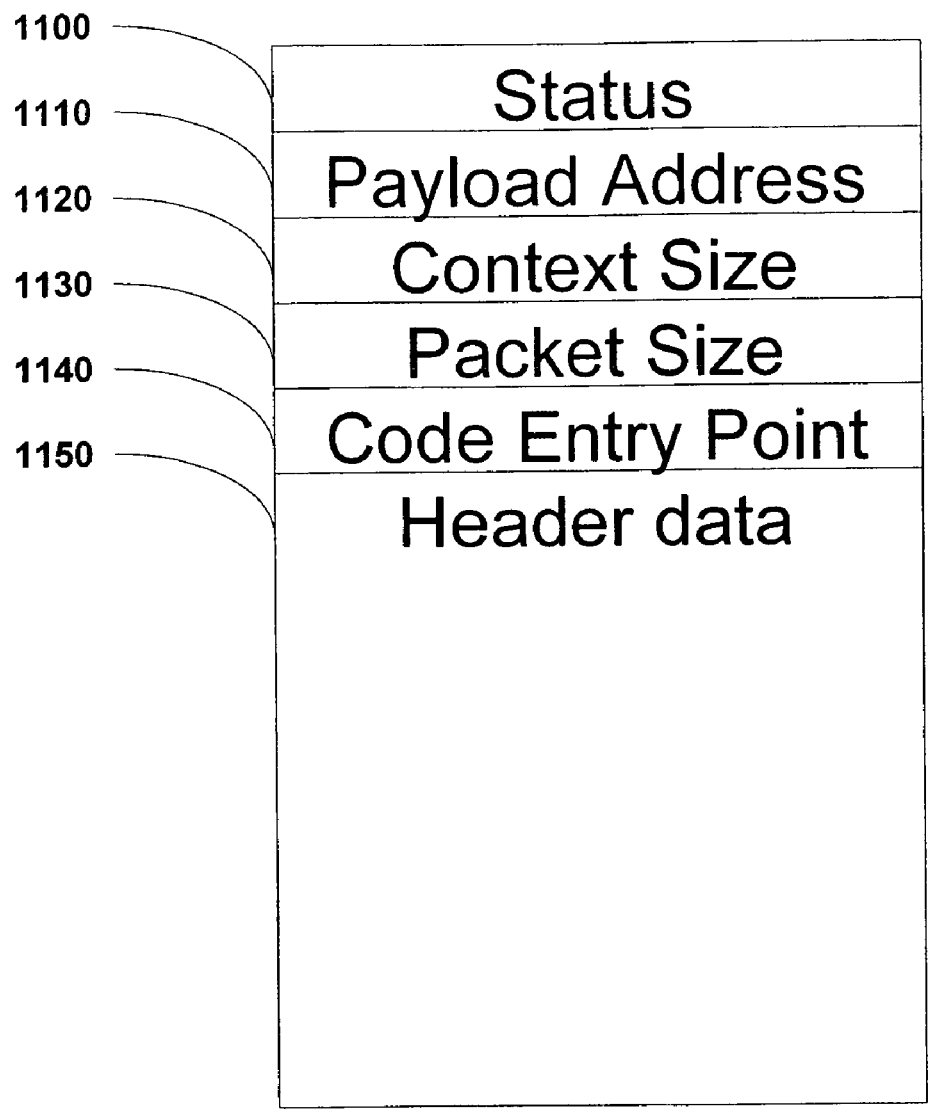
FIG. 11 shows an example of a context that is processed by the computing resources.

FIG. 11 shows an example Context. The context may be a collection of information that is created by the Context Copier, and sent to an output, such as for example output 1080 in the embodiment of in FIG. 10. The specific makeup of the context may vary both by implementation and by actual application usage, and is not critical to the invention. The context of FIG. 11 shows an embodiment with six fields: Status field 1100 which may include such information as whether the context represents a packet that should be dropped; Payload Address field 1110, which may carry the storage address of the portion of the incoming data that is not to be included in the context; Context Size field 1120, which may include the number of bytes from the incoming data that are to be included in the context; Packet Size field 1130, which may include the full size of the incoming data, optionally including both portions included and excluded from the context; Code Entry Point field 1140, which may provide an execution starting point for the program that starts operating on the context; and Header Data field 1150 which may include that portion of the incoming data included in the context. The fields prior to the Header data field 1150 are collectively be referred to as the Management data, regardless of which specific fields are used in any particular implementation. This is as contrasted with the Data field, which is extracted from the actual packet.

Status field 1100 contains a port number assigned to it, such as at initialization; an optional "drop" bit which is not set by the invention, but may optionally be set by some other entity operating on the context; the Tx Port Block may test the "drop" bit as will be described later. A Time of Arrival field is also provided by a counter. These elements are exemplary of information that may be provided in the status field of a particular embodiment of the invention, and different or other information may be included in Status Field 1100. Alternatively, the information included in Status Field 1100 may have been carried in individual fields. The specific contents and organization of Status Field 1100 is not critical to the invention.

A context descriptor may also be used to provide information about the context. In this particular exemplary implementation, the context descriptor consists of or includes the address of the context in the memory to which it has been sent. Other descriptor formats may alternatively be used as well; the specific descriptor format and the specific output types are not critical to the invention.

Figure 12:
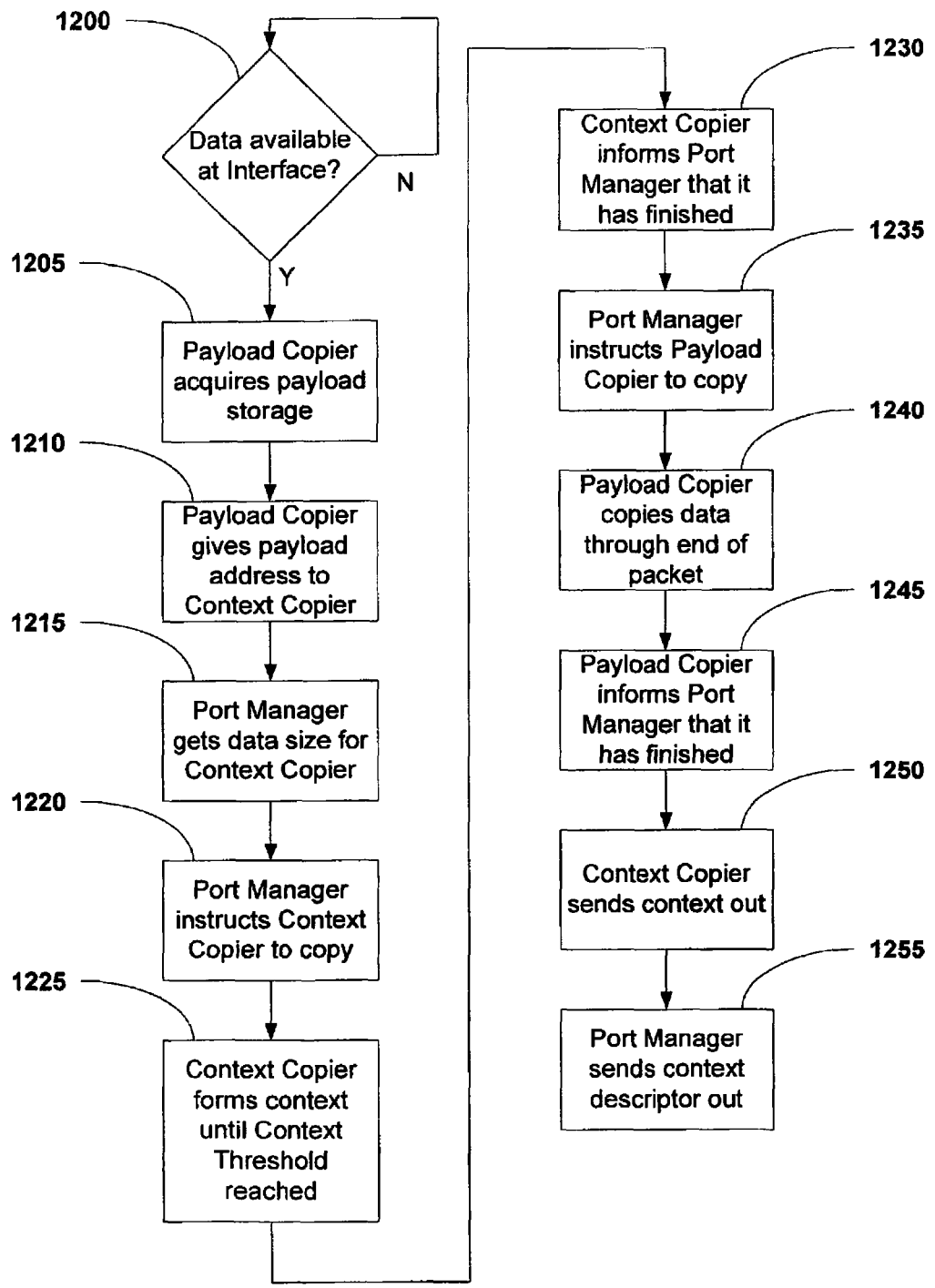
FIG. 12 shows an exemplary embodiment of a process for the execution of the Rx Port Block shown in the embodiment of FIG. 10, with the context being sent before the payload, and with the Payload Copier being instructed to start copying by the Port Manager.

FIG. 12 is a diagrammatic flow chart showing an exemplary embodiment of the process of taking or extracting data from the interface and sending it out or otherwise communicating it to another entity as a context and a payload. Once the manager determines that there is data available (Step 1200), it directs the Payload Copier 1050 to obtain suitable storage for the incoming payload data (Step 1205). The Payload Copier 1050 gives the address of that storage to the Context Copier 1060 (Step 1210) for insertion into the Context. It may be appreciated that the Payload Copier 1050 may alternatively give or otherwise provide or communicate the address to the Port Manager 1020, which may in turn furnish or provide it to the Context Copier 1060. This detail is not critical to the invention.

The Port Manager 1020 may also obtain the data block size from the Interface 1030 and provides it to the Context Copier 1060 (Step 1215). It then instructs the Context Copier 1060 to begin formation of the context (Step 1220). It may do this by creating a data structure in memory that pulls together or aggregates the various pieces of information that will populate the fields of the context. It obtains the Context Size field 1120 and the Code Entry Point field 1140 data by some means or procedure that is not critical to the invention. That information may be designed into the block as a fixed piece of data; alternatively it could be a fixed piece of data determined by a user; alternatively it could be passed to the Port Manager 1020 from the host; alternatively, it could be calculated by logic at execution time. The timestamp portion of Status field 1100 is loaded from Timer 1090.

After the Context Copier 1060 finishes forming the context (Step 1225), it informs the Port Manager 1020 that it is finished (Step 1230); the Port Manager 1020 then instructs the Payload Copier 1050 to begin copying the remaining data in the block (Step 1235). Note that the details of this communication are not critical to the invention. Rather than the Context Copier 1060 informing Port Manager 1020 that it was finished, Port Manager 1020 may alternatively monitor activity and detect and note completion of the context copy, or alternatively the Context Copier 1060 could inform the Payload Copier 1050 directly that it was finished. The Payload Copier 1050 then sends the remaining data to its output (Step 1240). When finished, it alerts the Port Manager 1020 (Step 1245), which in turn instructs the Context Copier 1060 to copy the newly formed context to Context output 1080 (Step 1250). Finally the Port Manager 1020 sends the context descriptor out (Step 1255) on Context Descriptor output signal set 1095.

Note that the order of sending the context out is not critical to the invention. The Context Copier could send the context contents out concurrently with the payload being copied as long as the context descriptor was sent out after all copying was complete. In addition, it would be possible for the context to be streamed out without creating an interim copy. The modularity provided by the preferred embodiment is simply an implementation having advantageous feature and operation, and is not critical to the invention.

Figure 13:
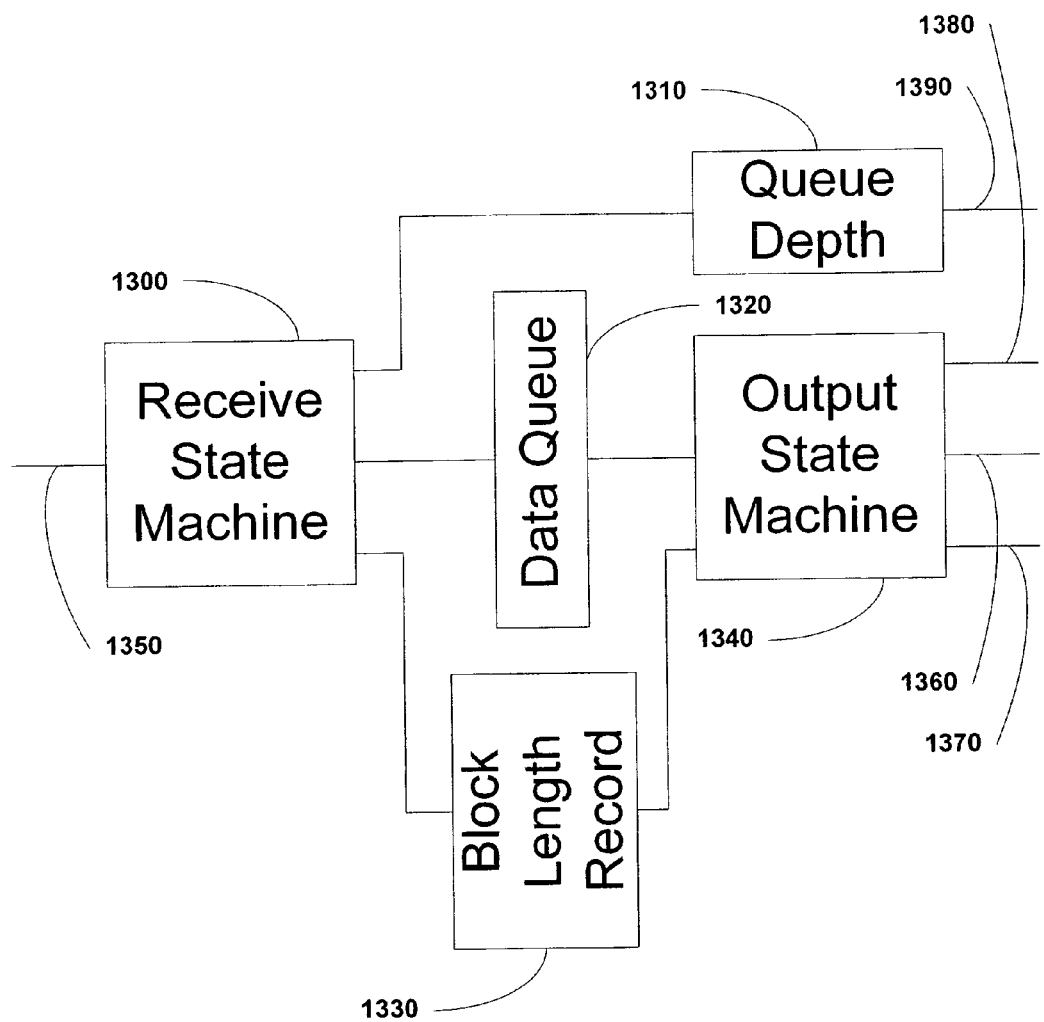
FIG. 13 shows an exemplary embodiment of the Interface Block of the Rx Port Block with the Queue Depth and the Block Length Record getting their information from the Receive State Machine.

FIG. 13 illustrates one non-limiting embodiment of Interface block 1030 already shown and described relative to the embodiment in FIG. 10. Receive State Machine 1300 takes the input data from input 1350 and sends it to Data Queue 1320, recording the length of the data block in Block Length Record 1330 and updating the Queue Depth 1310, which can be read via Queue Depth signal 1390. Output State Machine 1340 takes data from Data Queue 1320 and block length information from Block Length Record 1330 and copies data to outputs 1360 and 1370 for context and payload, respectively, under the control of input 1380.

Figure 14:
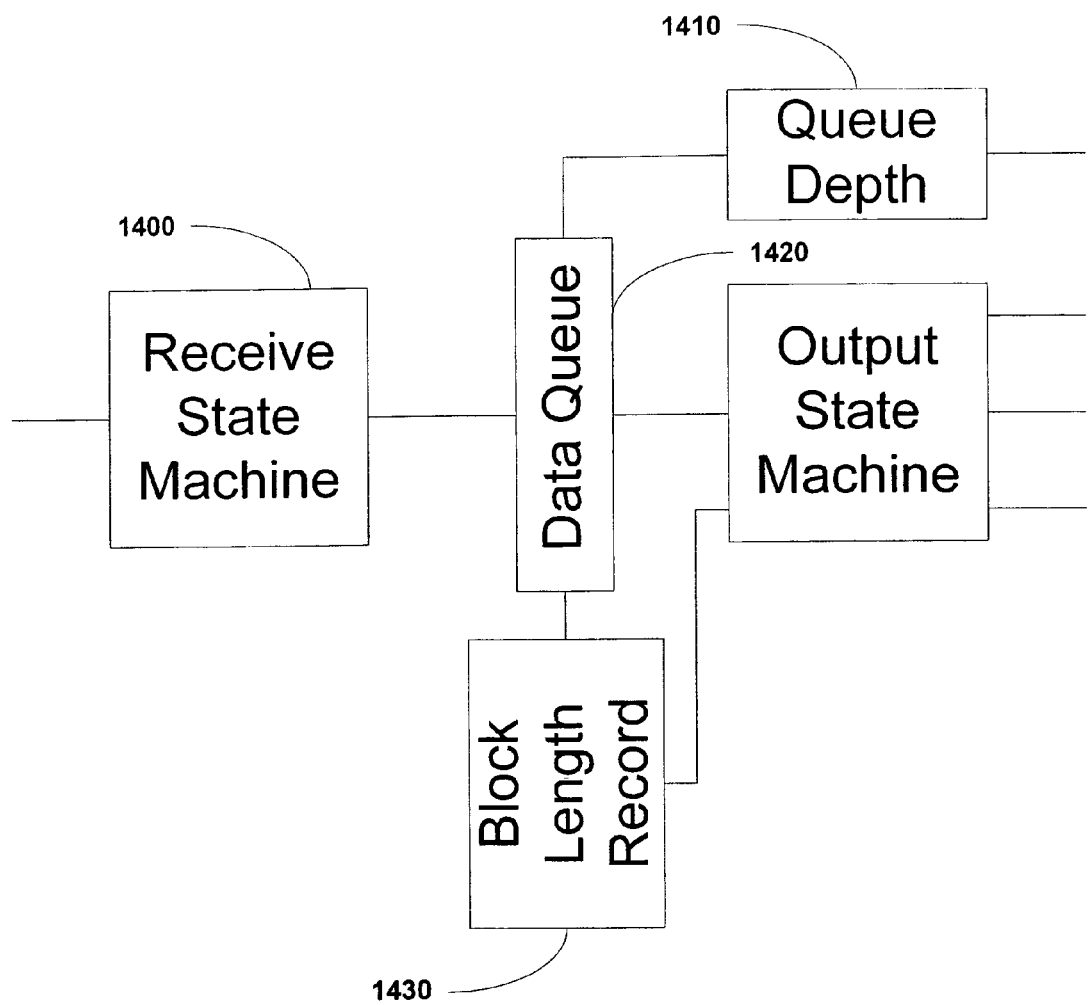
FIG. 14 shows an alternative embodiment of the Interface Block of the Rx Port Block, with the Queue Depth and Block Length Record getting their information from the Data Queue.

This particular arrangement could be different according to various alternatives; Data Queue 1320 may itself control Block Length Record 1330 and Queue Depth 1310; this detail is not critical to the invention. This variant is illustrated in the non-limiting embodiment of FIG. 14. For this variant, the specifics of Receive State Machine 1400 in FIG. 14 may be somewhat different from those of Receive State Machine 1300 in the embodiment of FIG. 13. Here Queue Depth 1410 and Block Length Record 1430 take their input from Data Queue 1420 instead of Receive State Machine 1400.

In one embodiment, Output State Machine 1340 can have three instructions sent to it on input 1380: (i) get data (e.g., getData), (ii) get length (e.g., getLength), and (iii) accept packet (e.g., acceptPacket). The getData and getLength instructions have the effect of retrieving the next data or next length, respectively, and removing them from the queue. The acceptPacket instruction has the effect of incrementing the Queue Depth. The specific instructions and their formats are not critical to the invention, and can be implemented using means known to one having ordinary skill in the art in light of the description provided here. For example, instructions could be added that inspected the next values on the queue without actually removing them.

In one exemplary non-limiting embodiment, Data Queue 1320 and Block Length Record 1330 are advantageously implemented using First-In First-Out (FIFO) memories; and Queue Depth 1310 is implemented using a register. These particular implementations are not critical to the invention. Data Queue 1320 and Block Length Record 1330 may optionally also be combined into a single queue containing both data and length information. In this case, the getData and getLength instructions may be replaced by a single getNext instruction or some similar instruction or set of instructions to accomplish the intended operation.

Output State Machine 1340 may act to grant access to the data in Data Queue 1320 by the entity requesting it on input 1380, which is, in one non-limiting embodiment, Port Manager 1020. It is also possible to provide the requesting entity with a direct access to Data Queue 1320, but in this situation the requesting entity would have to manage the pointers, which would potentially add some complexity. However, whether or not the requesting entity gets direct access to the data is not critical to the invention, and is a feature of a particular embodiment and implementation of the embodiment of the invention.

Figure 15:
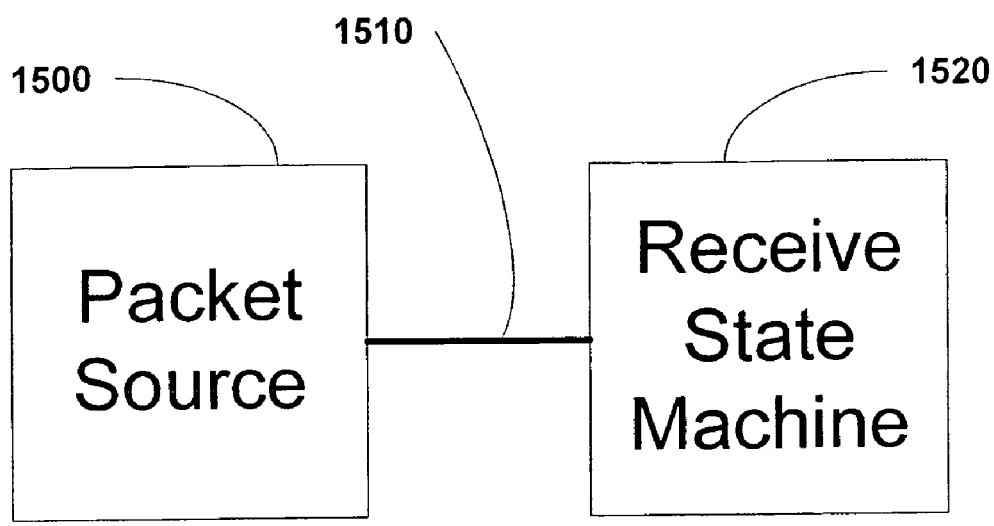
FIG. 15 shows an embodiment of the interconnection between an external source of packets and an Receive State Machine.

Receive State Machine 1300 may serve to bring data in from an outside format into Interface 1030. The specific circuits required may vary according to two variables or parameters illustrated in the embodiment in FIG. 15. The first variable or parameter is the actual packet format being received from Packet Source 1500. In one embodiment, that packet format is Ethernet, and the Packet Source 1500 is an Ethernet Media Access Controller (MAC) in accordance with the Ethernet protocol standards accepted in the industry (as of the date of filing of this patent application), which standards are hereby incorporated by reference. Another embodiment might have Packet Source 1500 delivering data in a format such as Asynchronous Transfer Mode (ATM), or any other such format known in the industry. The second variable or parameter is the actual physical connection 1510 between Packet Source 1500 and Receive State Machine 1520. This may depend on the specific configuration of Packet Source 1500; and it may for example be a proprietary bus or an industry standard interface such as Serial Packet Interface (SPI). The specific configuration of the Receive State Machine 1520 needed to accommodate these two variables may be determined by means and methods known to those skilled in the art. In one embodiment, Ethernet data is accepted on a physical connection 1510 that consists of eight bits of data, a receive ready (e.g., Rx_Ready) signal, and a receive error (e.g., Rx_Error) signal.

Figure 16:
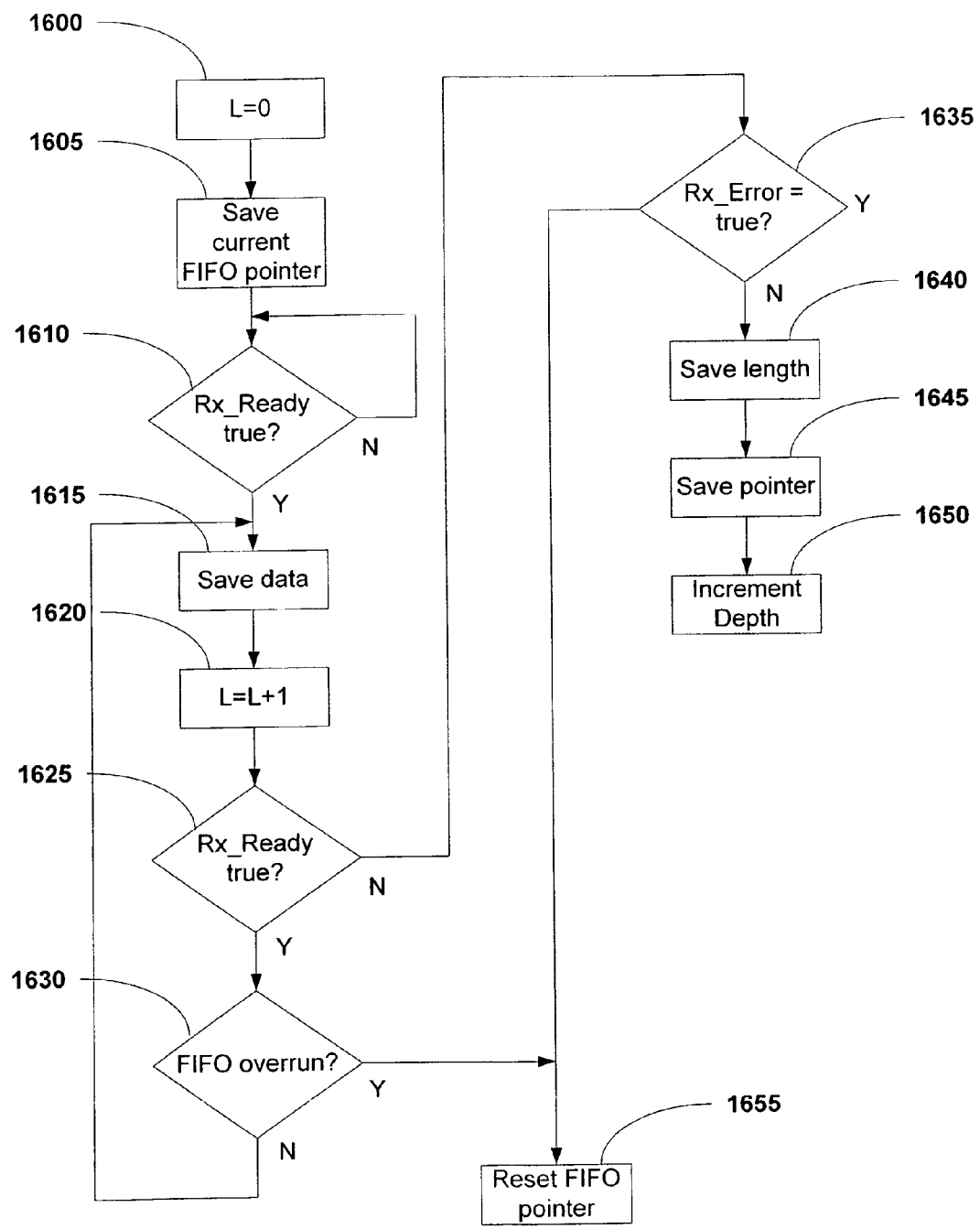
FIG. 16 illustrates an exemplary embodiment of the functionality of an Receive State Machine within an Rx Interface block.

FIG. 16 illustrates one non-limiting embodiment of the functioning of an exemplary Receive State Machine 1300. A length variable L is first initialized to zero (Step 1600). The current FIFO pointer is then saved (Step 1605) in case the packet is dropped, in which case the pointer would be reset. The Rx_Ready signal is then tested (Step 1610); when true, data is saved (Step 1615) and the Length variable is incremented (Step 1620). The Rx_Ready signal is then retested for data availability (Step 1625); if more data is available, then the FIFO (or other data structure) is tested (Step 1630) to make sure the FIFO is not full (this may be done by comparing the read and write pointers in a manner known to those skilled in the art in light of the description provided here). If the FIFO is full, then the FIFO pointer is reset (Step 1655) and copying stops, which has the effect of dropping the packet. If there is still room in the FIFO, then the Data save (Step 1615) and Length increment (Step 1620) are repeated. If Rx_Ready is not true in Step 1625, then the Rx_Error signal is tested (Step 1635). If the Rx_Error signal is true, then the FIFO pointer is reset (Step 1655), which has the effect of dropping the packet. If the Rx_Error signal is not true, then the length and pointer are saved (Steps 1640 and 1645), and Queue Depth 1320 is incremented (Step 1650), completing the process.

Figure 17:
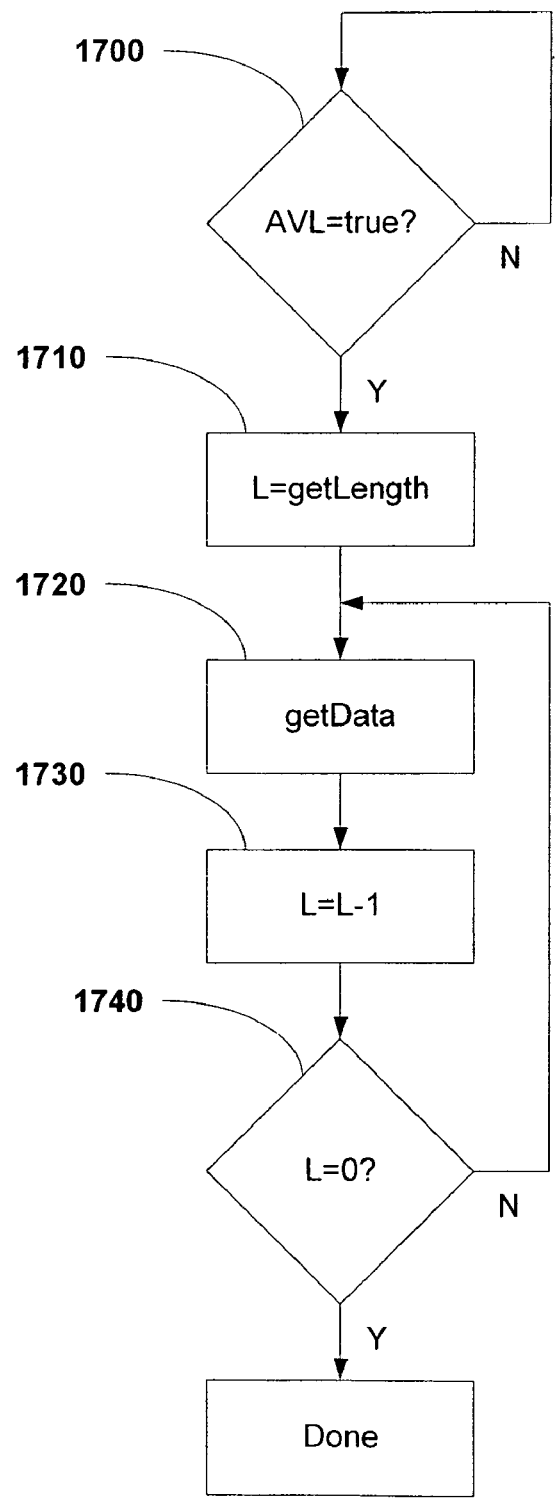
FIG. 17 illustrates an exemplary embodiment of the functionality of an Output State Machine within an Rx Interface block.

FIG. 17 illustrates an exemplary embodiment of a method, procedure, or algorithm for the usage of Output State Machine 1340. Output State Machine 1340 may service this procedure or algorithm using any implementation that would be known to one skilled in the art in light of the description provided here. The entity exercising this interface procedure or algorithm may be a single unit or a combination of units. In one non-limiting embodiment, Port Manager 1020 advantageously exercises Steps 1700 and 1710, and then under the direction of Port Manager 1020 as shown and described relative to the process shown and described relative to the embodiment of FIG. 12, Context Copier 1060 and Payload Copier 1050 exercise the remaining steps of the procedure or algorithm. Other distributions of operations may be configured.

As illustrated in FIG. 17, an availability signal AVL is provided from Output State Machine 1340. The requesting entity polls the AVL signal (Step 1700); once it's true, the length of data available is requested using the getLength instruction (Step 1710). The get data (e.g., getData) instruction is then successively issued (Step 1720), with the length L being decremented each time (Step 1730), until a test for L reaching zero is true (Step 1740).

The role of the Output State Machine 1340 in this particular embodiment is to provide access to the data by the requestor without the requestor having to specifically know where the data resides in memory. The storage and management of this information should be straightforward and apparent in light of the description provided here to one skilled in the art; and the specifics of this storage and management are not critical to the invention.

Figure 18:
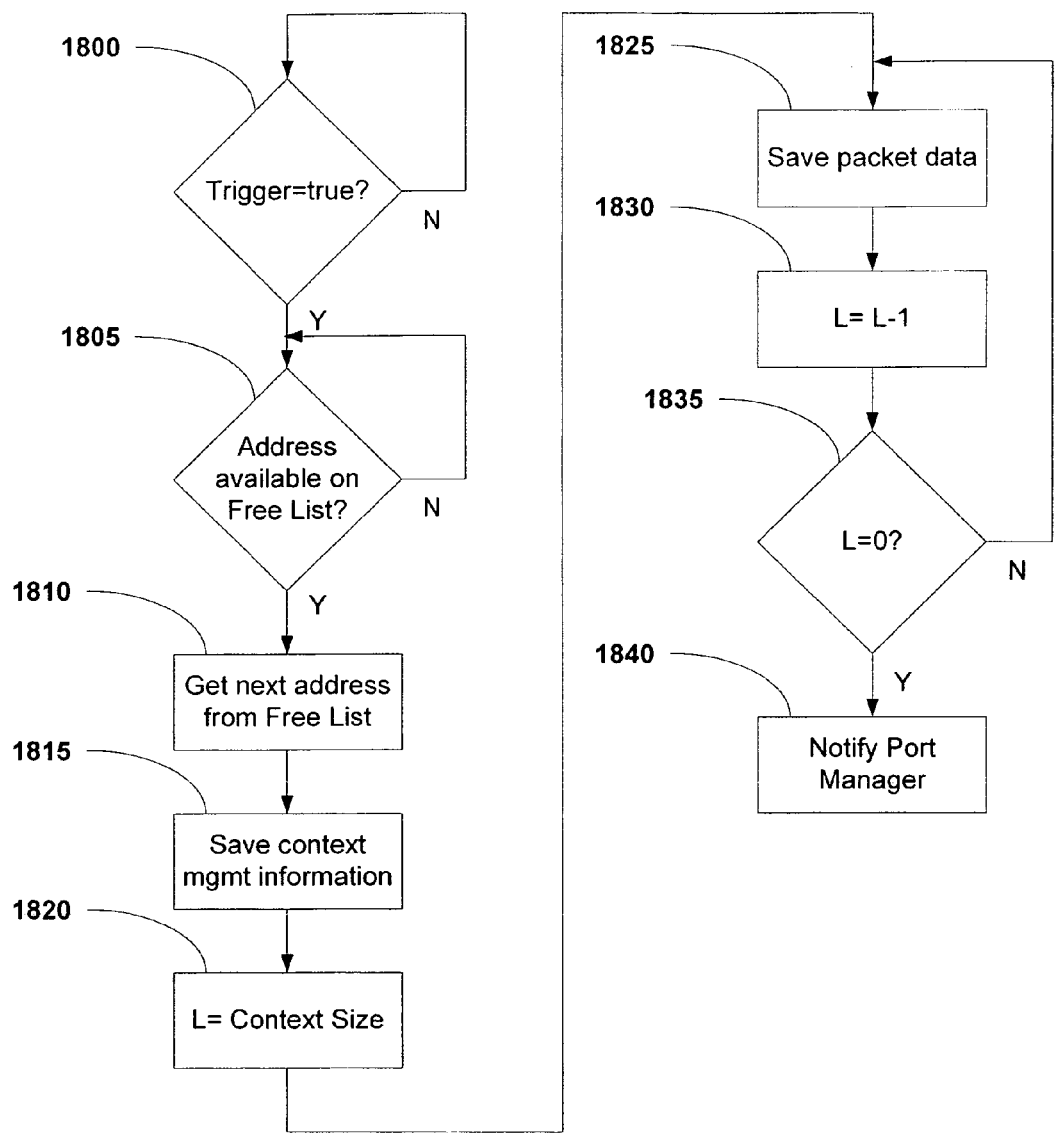
FIG. 18 shows an exemplary embodiment of the functionality of a Context Copier within an Rx Interface block.

FIG. 18 is a diagrammatic flow chart showing exemplary functioning of an embodiment of the Context Copier 1060. This Context Copier 1060 monitors a Trigger signal in Port Manager 1020 that instructs it to begin operation pursuant to the process outlined relative to the procedure described in FIG. 12. Free List 1065 may contain a list of destination memory blocks that are available to receive data. Input 1055 feeds Free List 1065 and may add pointers of available memory blocks to Free List 1065 as those blocks are freed up by a downstream entity. The specific implementation of Free List 1065 is not critical to the invention. In one non-limiting but preferred embodiment, it has advantageously been implemented using queues, and specifically, Fast Simplex Links (FSLs), which are a means of implementing a queue known to users of certain Field Programmable Gate Arrays (FPGAs).

The process starts with Context Copier 1060 monitoring the Trigger signal on Port Manager 1020 (Step 1800). When true, the free list is examined for available addresses (Step 1805); if there are none, then the process waits; if there is one, the next address on the free list is taken as the next context destination (Step 1810). The Management fields are then copied to the context location (Step 1815). In one non-limiting embodiment, the locations for each field are advantageously fixed at design time. However, another embodiment provides for a way for a user to specify the relative location of each field using methods that are known or will become apparent to one skilled in the art in light of the description provided here. Whether the fields are fixed, relocatable, or set forth in some other manner, is not critical to the invention. The Context Size is then placed in a register (Step 1820) or other suitable storage. Packet data is then stored (Step 1825) and the length variable is decremented (Step 1830), followed by a test (Step 1835) of whether the length has reached zero indicating that there is no more data. If the length is not zero, then the Save data (Step 1825) and decrement length (Step 1830) steps are repeated. When the length reaches zero, the Port Manager 1020 is notified that the operation is complete (Step 1840). It will be appreciated that other magnitude relationships and incrementing, decrementing, or comparison logic may alternatively be utilized to achieve the results described here.

Note that if no free list addresses are available, the copying of the context (and hence the packet) may or will be delayed. Optional schemes to provide additional memory from a memory pool or other such store of memory could be implemented to postpone an overflow situation, but there will always exist a potential for overflow. If delayed too long, Data Queue 1320 may fill up, preventing the acceptance of more packets. In this case, additional packets will be dropped until Data Queue 1320 has room. This is but one way of handling internal overflows; other overflow and packet dropping strategies are possible, including the dropping of packets already accepted into Data Queue 1320. The specific overflow and packet dropping strategy used is not critical to the invention.

Figure 19:
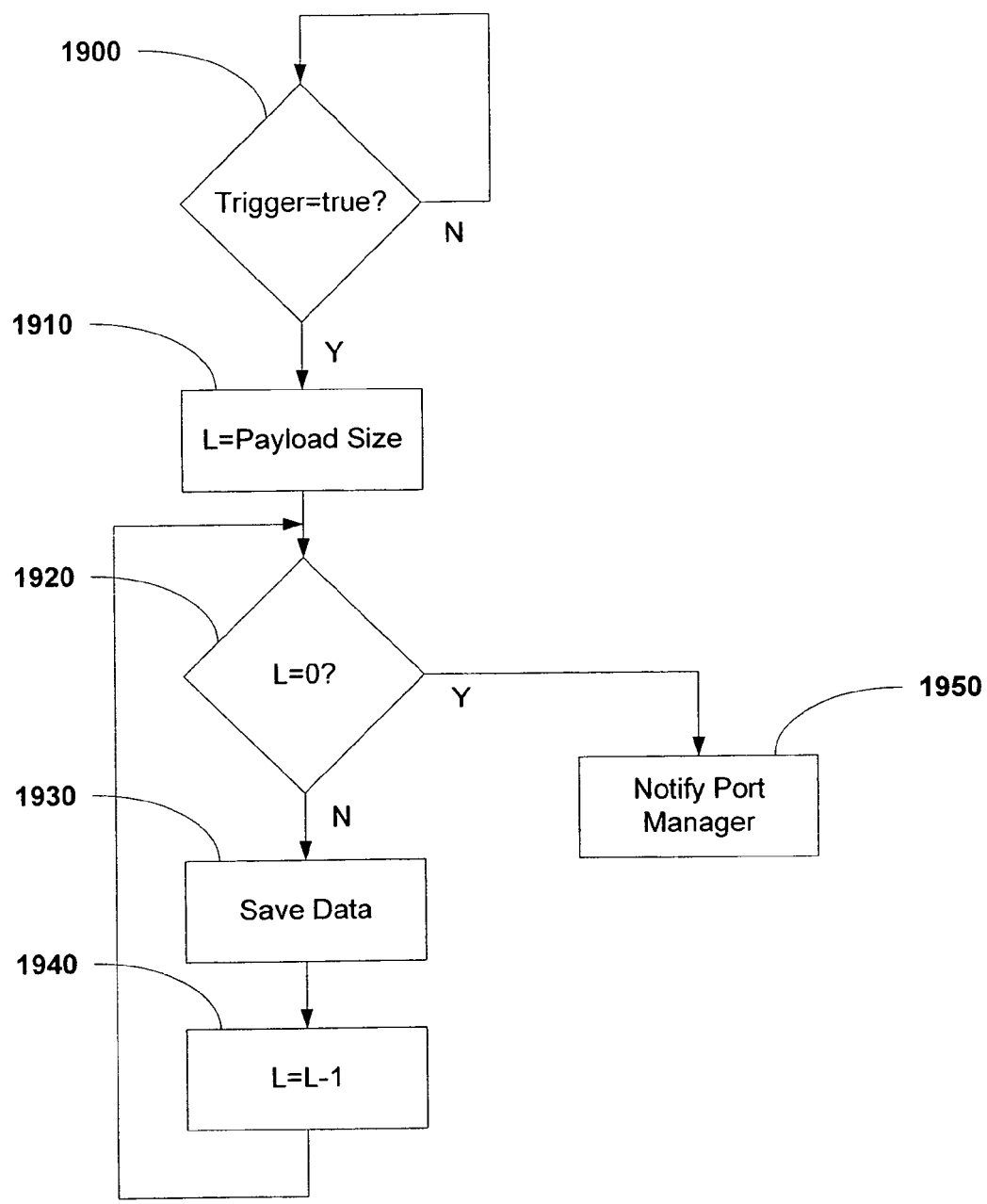
FIG. 19 shows an exemplary embodiment of the functionality of a Payload Copier within an Rx Interface block.

FIG. 19 is a diagrammatic flow chart that illustrates an embodiment of the operation of a non-limiting embodiment of the Payload Copier 1050. It receives from the Port Manager 1020 a packet size and the context size, from which it calculates a Payload Size=max(0, Packet Size−Context Size). It also receives a Payload address. Optionally, a payload offset can be used to provide a gap after the start of the allocated memory before data is written. The existence of this optional gap is not critical to the invention. A Trigger signal, which is used by the Port Manager 1020 to start the payload copy operation in accordance with the process of FIG. 12, is monitored (Step 1900). When it is determined to be true, a length variable is initialized with the calculated payload size (Step 1910). If tested greater than zero (Step 1920), data is saved (Step 1930) and the length variable is decremented (Step 1940); the length is then retested (Step 1920). Once the length reaches zero, the Port Manager 1020 is notified that the payload copy process is complete (Step 1950).

FIG. 19 illustrates an embodiment where the payload is stored in a single memory. A different embodiment allows the payload to be broken up into a plurality of pieces and stored in a number of different memories, giving priority if desired to memories having preferable characteristics such as for example higher speed, while using other lower-priority memories when the high-priority memories are full.

Figure 20:
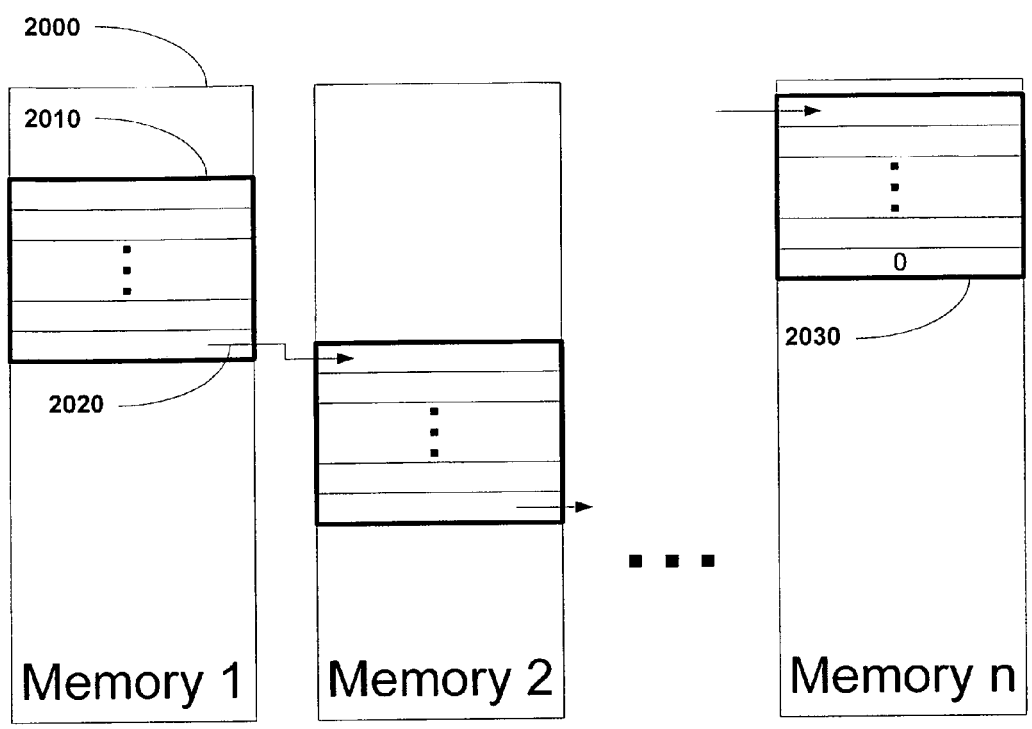
FIG. 20 illustrates segmented storage of payloads.

FIG. 20 illustrates one means of managing such segmented memory or storage. A plurality of memories 2000 is used; each may have a defined segment size, and a portion of the payload may be stored in each segment 2010. The segment size may be the same for all memories or different for each memory; whether or not the segment size is uniform for all memories is not critical to the invention. A payload can be stored across these memories in segments by means of links 2020. At the end of each stored segment 2010, a link 2020 is placed which points to the start of the next segment 2010. The last segment is terminated by a null link 2030 (consisting of the value "0" or some other predetermined value or indicator) to indicate that there are no further links. As each segment is terminated, a new link is requested from the Payload Access Block 830.

Figure 21:
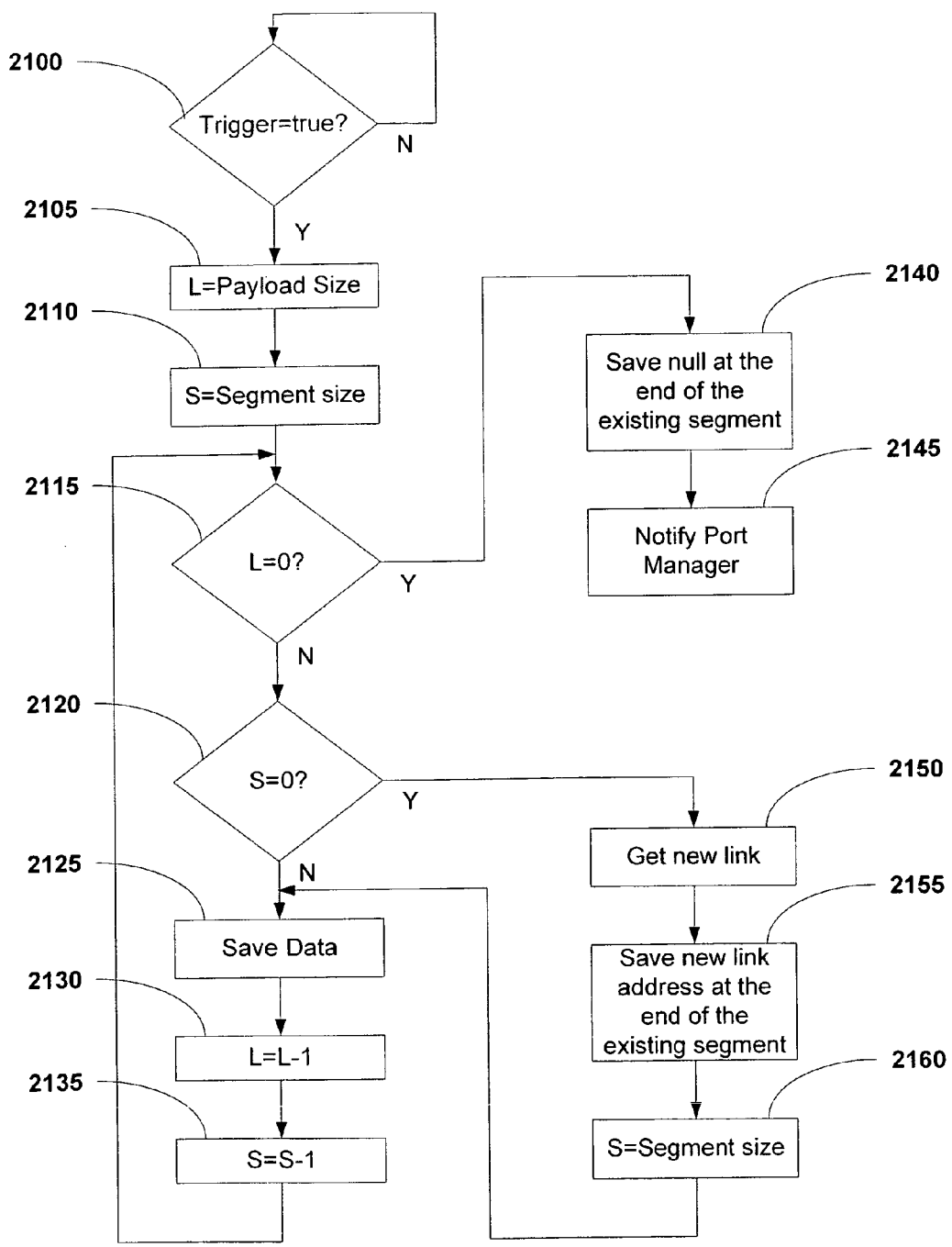
FIG. 21 illustrates an exemplary possible process for storing a payload in segmented storage.

FIG. 21 illustrates a process or procedure that may be used to implement an embodiment of segmented payload storage. It is somewhat similar to the process described relative to FIG. 19, but includes additional steps that are advantageous for managing the segment size and links. After detecting the trigger (Step 2100), the payload size is assigned to a length variable L (Step 2105) as before. In addition, a Segment size is assigned to its own variable S (Step 2110). The length is tested for zero (Step 2115), and then the segment variable is tested for zero (Step 2120). If the segment variable has not yet reached zero, then data is saved (Step 2125), the length is decremented (Step 2130), and the segment variable is decremented (Step 2135). Then the length and segment tests (Steps 2115 and 2120) are repeated. If the segment variable is zero, then that segment has been exhausted and a new one is needed. A new link is requested from the Payload Access Block 830 (Step 2150), and that link address is saved at the end of the current segment (Step 2155). The segment variable is then reloaded (Step 2160), with the same segment size in the case of a uniform segment size, or optionally with the segment size pertaining to the new memory in the case where each memory has an associated segment size. Data copying (Step 2125) can now recommence in the new segment. In the case that the length tests to zero (Step 2115), the final segment must be terminated with a null link (Step 2140), and then Port Manager 1020 can be notified (Step 2145) that the operation is complete.

The segmented memory scheme described relative to FIG. 20 and FIG. 21 illustrate one way of handling memory segmentation. Other ways are possible; for example, instead of storing each link at the end of each segment, a separate link table may be maintained. The specific scheme used for memory segmentation is not critical to the invention.

Figure 22:
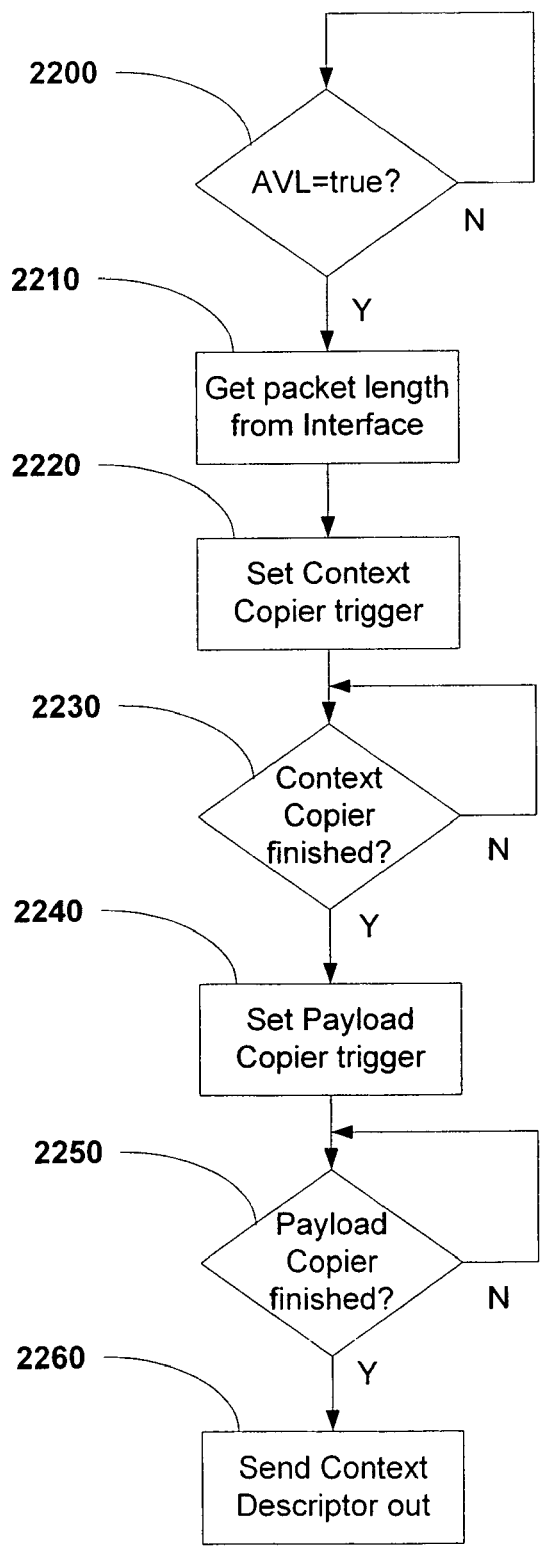
FIG. 22 shows an exemplary embodiment of the functionality of a Port Manager within an Rx Interface block.

FIG. 22 illustrates an embodiment of an implementation of the procedure and method performed by Port Manager 1020. It starts by querying the availability signal AVL signal on Interface 1030 to see if it's true (Step 2200). If true, it retrieves the packet length from Interface 1030 (Step 2210) and then sets the trigger to start Context Copier 1060 (Step 2220). It then polls to see if Context Copier 1060 is finished (Step 2230). Once Context Copier 1060 has completed, the trigger to start Payload Copier 1050 is set (Step 2240), and the Payload Copier 1050 is polled to see when it finishes (Step 2250). Once the Payload Copier 1050 is finished, the context descriptor is sent out on Context Descriptor output 1095 (Step 2260). It will be appreciated by those skilled in the art in light of the description provided herein that alternative true/false logic and/or different magnitude relationships (e.g., equal to, greater-than, less-than, and the like), and or different thresholds or values for comparison may be utilized in making the comparisons described here and elsewhere in the specification without departing from the spirit and scope of the invention.

Timer 1090 allows the arrival time of the data block to be added to the context in the form of a timestamp. The construction of Timer 1090 in the embodiment of FIG. 10 may be that of a standard timer, and its characteristics may be readily apparent to a worker having ordinary skill in the art in light of the description provided here.

Stats Block 1095 maintains statistics and allows the host to query for statistics through host connection 1010. The construction of Stats block 1095 in the embodiment of FIG. 10 is not critical to the invention. In one non-limiting embodiment, the following statistics may be kept: (i) packets per second received, (ii) packets per second dropped due to a full Data Queue 1320 (such as shown in and described relative to FIG. 13) within Interface block 1030 of the embodiment of FIG. 10, and (iii) packets per second dropped due to the sending block marking the packet as invalid. Different or other statistics may optionally or alternatively be kept. The gathering of other statistics may benefit from connecting Stats block 1095 to other blocks in the Rx Port Block 900. The means of implementing such connections may be readily apparent to those workers having ordinary skill in the art in light of the description provided here and are not critical to the invention. The specific means and/or method of gathering the statistics may likewise be readily apparent to those workers having ordinary skill in the art in light of the description provided here. Neither the specific statistics chosen nor the means of gathering them is critical to the invention. Reporting of statistics may be done by a variety of means and methods. Two exemplary possibilities are by (a) directly memory-mapping each statistic storage register and allowing the requesting entity to query each statistic individually; or (b) by memory-mapping only the Port Manager block 1020, and providing an instruction to the Port Manager 1020 that indicates the statistic to be retrieved and reported by the Port Manager 1020. One non-limiting embodiment of the invention advantageously uses the former of these two methods, and a different embodiment may use the latter. The specific reporting method is not critical to the invention.

Figure 23:
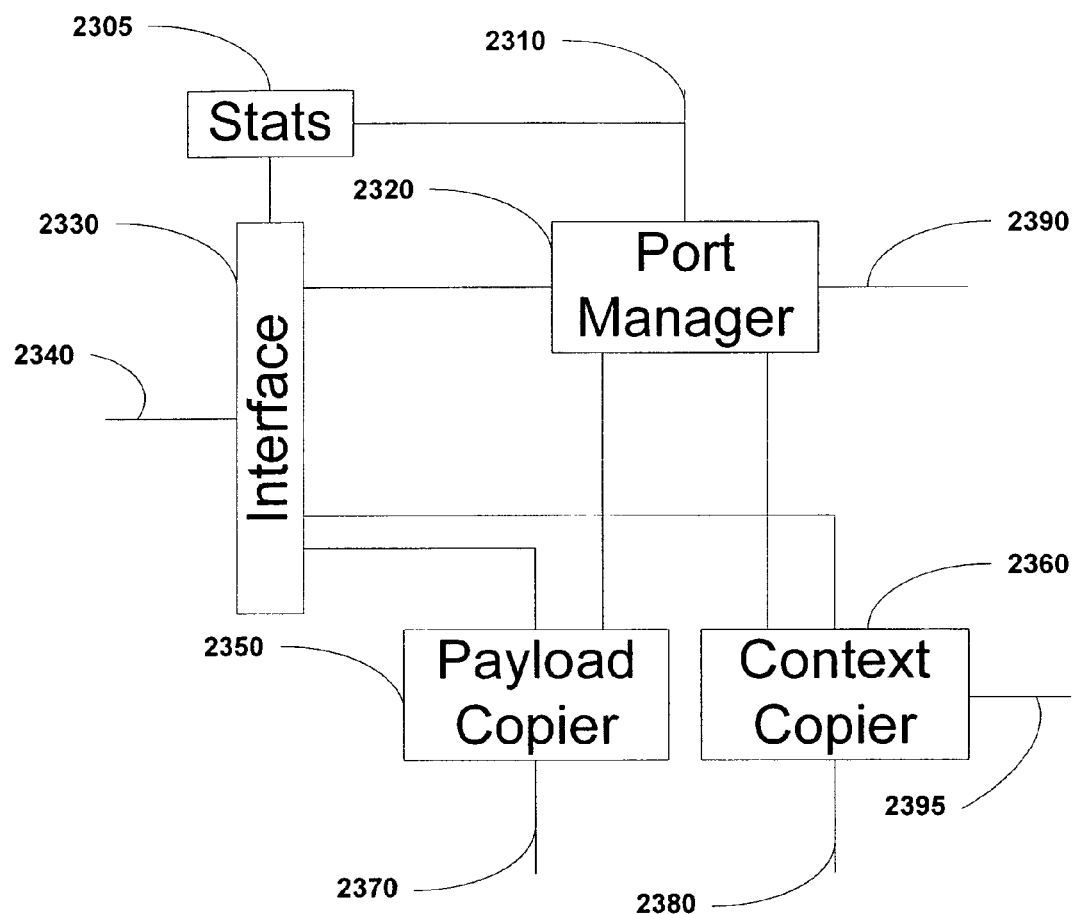
FIG. 23 shows an exemplary embodiment of the Tx Port Block of the embodiment of FIG. 8 with the Payload Copier and Context Copier having separate connections to the Interface.

The Tx Port Block is generally similar to the Rx Port Block, but is in a simplified sense reversed. FIG. 23 shows an exemplary implementation of a Tx Port Block 910 that was previously described relative to the embodiment in FIG. 9. In the FIG. 23 embodiment, the Tx Port Block comprises an Interface 2330, a Port Manager 2320, a Payload Copier 2350, a Context Copier 2360, and a Stats block 2305. Port Manager 2320 may be initialized and controlled by host connection 2310, which can be a direct connection to the host bus, or can be fed by a connection to Manager Block 810 in FIG. 8, or connected or coupled in some other suitable manner. The Payload Copier 2350 receives payload data from Payload input signal set 2370; the Context Copier 2360 receives context data from Context input signal set 2380; the Port Manager 2320 receives context descriptor data on Context Descriptor input signal set 2390; and Context Copier 2360 sends allocation pointers to a free list via Free List output signal set 2395. Input signal or signal sets 2370, 2380, and 2390 and output signal or signal set 2395 may be any suitable connection or signal or signal set; the format of the connection is not critical to the invention. In one implementation, Payload input signal set 2370 and Context input signal set 2380 are communicated over buses, and Free List output signal set 2395 and Context Descriptor input signal set 2390 are communicated over Fast Simplex Links (FSLs).

Upon detecting the presence of data at Context Descriptor input signal set 2390, Port Manager 2320 directs the Context Copier 2360 and Payload Copier 2350 to take the data from connection 2380 and connection 2370, respectively, and send it out via the interface. The way in which this copy occurs can vary based on the content of the Context and other implementation choices.

Figure 24:
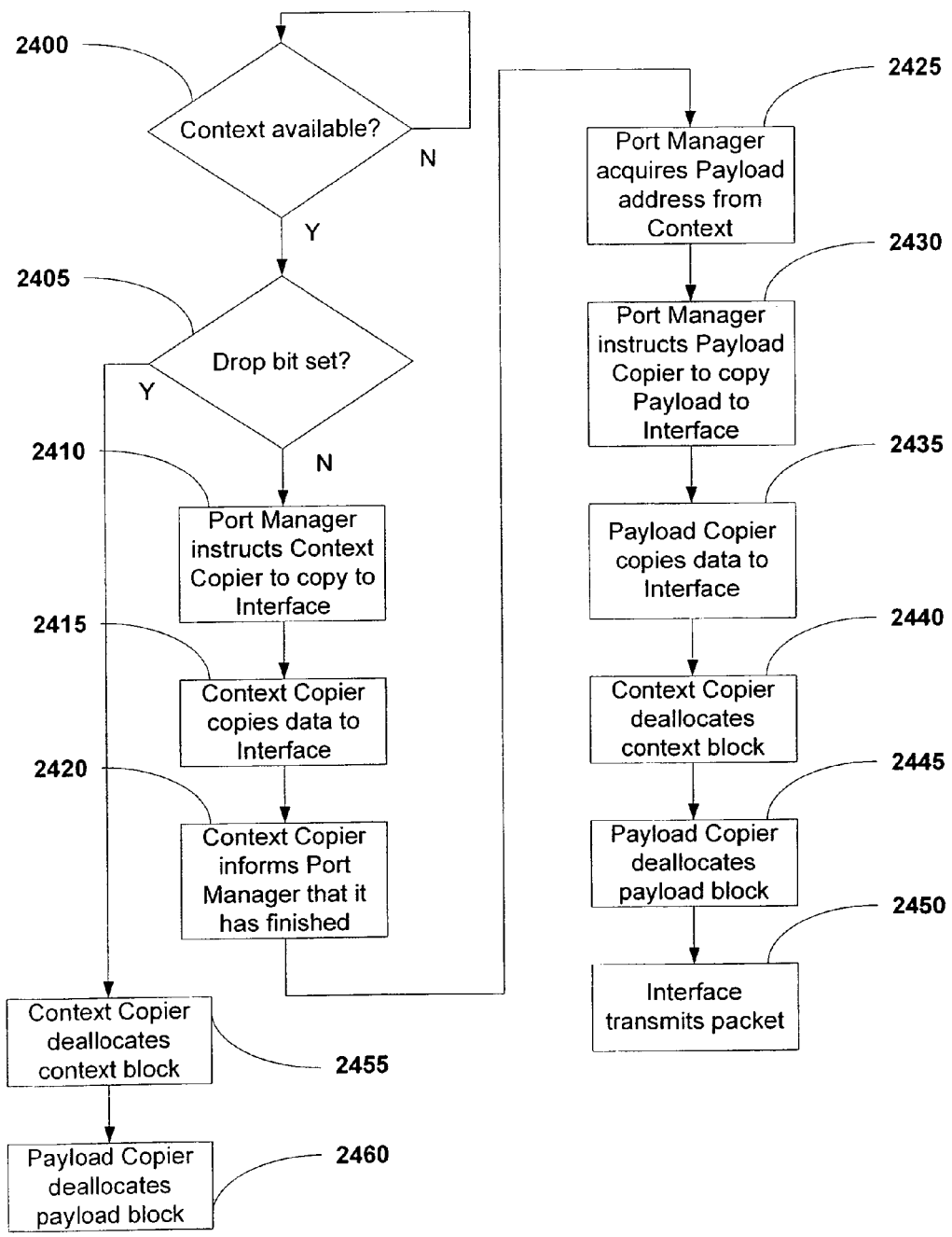
FIG. 24 shows an exemplary process for the execution of the Tx Port Block shown in the embodiment of FIG. 23, with the context being sent before the payload, and with the Payload Copier being instructed to start copying by the Port Manager.

FIG. 24 shows one example of an embodiment of the process of taking data from the interface and sending it out as a context and payload. When Port Manager 2320 detects that a context has arrived (Step 2400), it first tests to see if the Drop bit in Status Field 1100 of the context is set (Step 2405). If not set, it instructs the Context Copier 2360 to copy the context to Interface 2330 (Step 2410). Context Copier 2360 then copies the data from the context to Interface 2330 (Step 2415) and informs the Port Manager 2320 when finished (Step 2420). Port Manager 2320 then acquires the address of the payload from the Payload Address field 1110 in the context (Step 2425), and instructs Payload Copier 2350 to copy the payload data from that address into the Interface 2330 (Step 2430). The payload is copied to Interface 2330 (Step 2435), and then the context block and payload block are deallocated (Steps 2440 and 2445), and under instruction of Port Manager 2320, Interface 2330 transmits or otherwise communicates the packet (Step 2450) over output signal set 2340. The context and payload memories should advantageously be deallocated after their respective copy operations are complete; the specific ordering of the deallocation is not critical to the invention. If the Drop bit is set (Step 2405), then the packet is not sent, and the context and payload memories are simply deallocated (Steps 2455 and 2460). Again, alternative logic may be used relative to setting the Drop bit in Status Field so that either logic "0", logic "1", or a different state indicator may be utilized.

After the Context Copier 2360 finishes its copy, the Port Manager 2320 instructs the Payload Copier 2350 to begin copying the remaining data from payload storage to the Interface block. Note that the details of this communication are not critical to the invention. Rather than the Port Manager 2320 monitoring activity and noting completion of the context copy, the Context Copier 2360 may alternatively inform the Payload Copier 2350 directly (or even indirectly through some intermediary) that it was finished.

Figure 25:
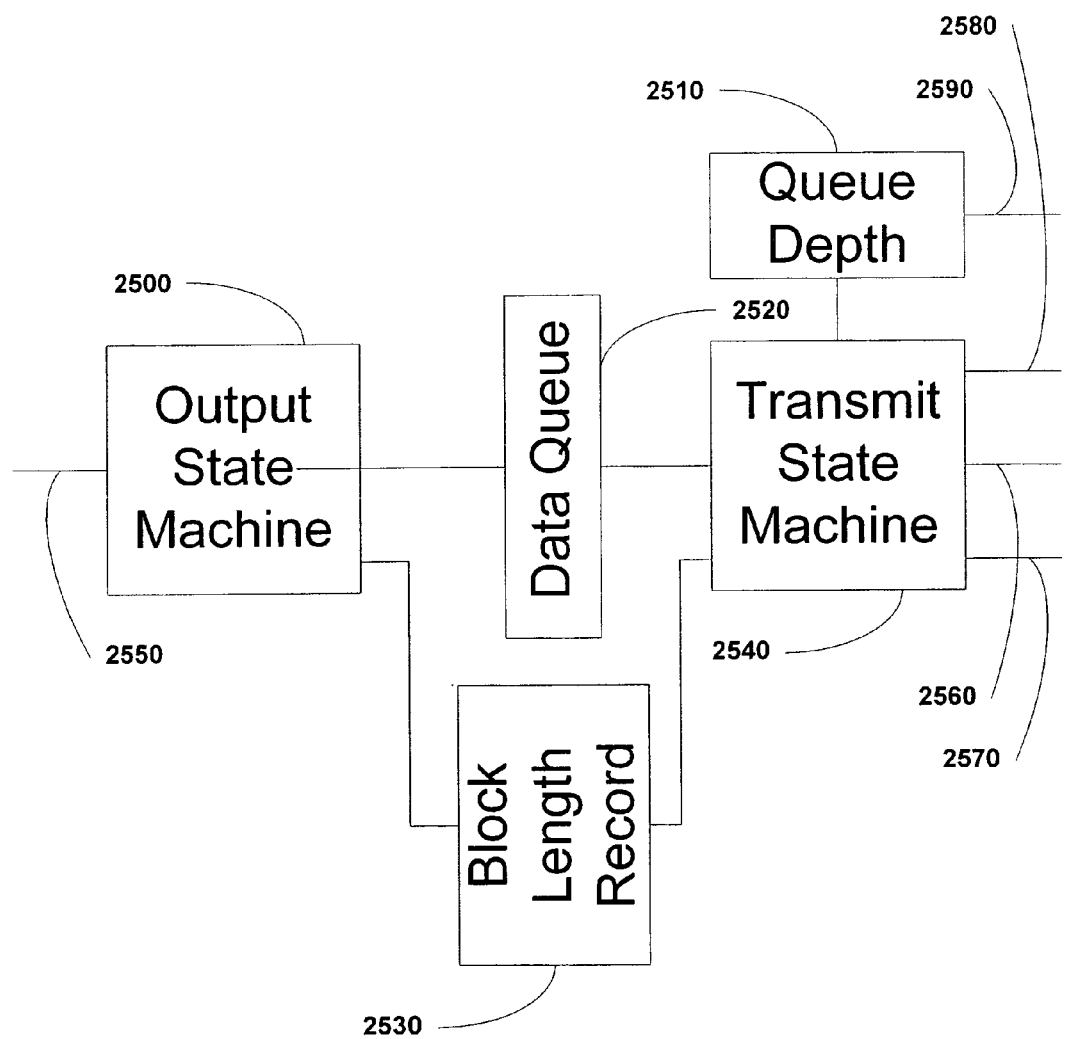
FIG. 25 shows an exemplary embodiment of the Interface Block of the Tx Port Block with the Output State Machine getting its information from the Queue Depth and the Block Length Record.

FIG. 25 illustrates one exemplary embodiment of Interface block 2330 previously described relative to FIG. 23. Transmit State Machine 2540 takes the input data from inputs 2560 and 2570 from context and payload, respectively, under the control of input 2580, and sends it to Data Queue 2520, recording the length of the data block in Block Length Record 2530 and updating the Queue Depth 2510. Output State Machine 2500 takes data from Data Queue 2520 and block length information from Block Length Record 2530 and copies data to output 2550.

Figure 26:
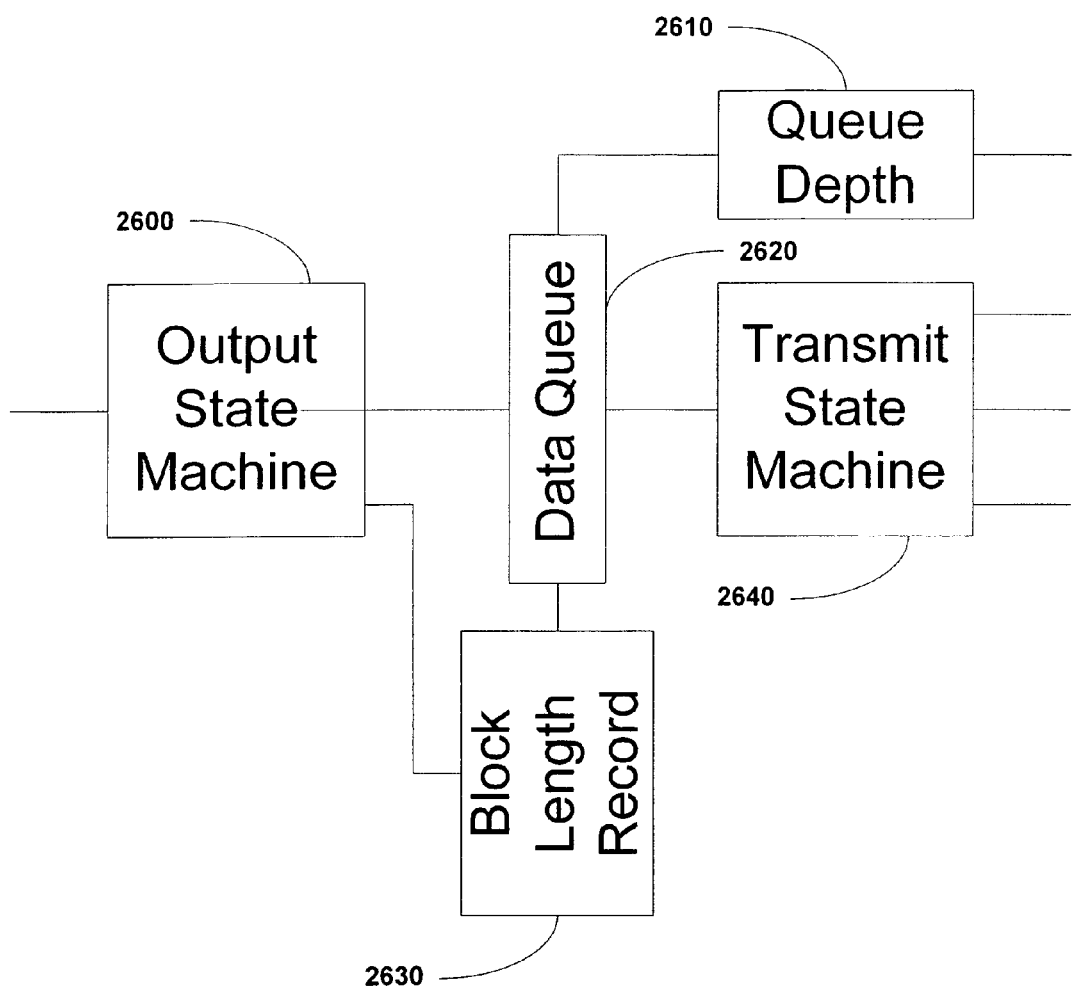
FIG. 26 shows an alternative exemplary embodiment of the Interface Block of the Tx Port Block, with the Output State Machine getting its information from the Data Queue.

This particular arrangement may be different in different embodiments of the invention; Data Queue 2520 may for example itself control Block Length Record 2530 and Queue Depth 2510 or other techniques may be implemented; and, this detail is not critical to the invention. This variant is also illustrated in the embodiment illustrated in FIG. 26. For this variant, the specifics of Transmit State Machine 2640 (e.g., 2640B) in FIG. 26 would be different from those of Transmit State Machine 2540 (e.g., 2640A) in FIG. 25. Here Queue Depth 2610 and Block Length Record 2630 take their input from Data Queue 2620 instead of Transmit State Machine 2640.

In one embodiment, Transmit State Machine 2540 can have three instructions sent to it on input 2580, these instruction may include: (i) set data (e.g., setData), (ii) set length (e.g., setLength), and (iii) accept packet (e.g., acceptPacket). The setData and setLength instructions have the effect of delivering the next data or next length, respectively, and adding them from the queue. The acceptPacket instruction has the effect of incrementing the Queue Depth. The specific instructions and their formats are not critical to the invention, and can be implemented using means that would be apparent to one having ordinary skill in the art in light of the description provided here.

In one non-limiting embodiment, Data Queue 2520 and Block Length Record 2530 may be implemented using First-In First-Out (FIFO) memories. Queue Depth 2510 may be implemented using a register. These implementations are not critical to the invention. Data Queue 2520 and Block Length Record 2530 may also be combined into a single queue containing both data and length information. In this case, the setData and setLength instructions could be replaced by a single set next (e.g., setNext) instruction or some similar instruction or set of instructions.

Transmit State Machine 2540 may act to grant access to Data Queue 2520 by the entity requesting it on input 2580, which is, in one embodiment, Port Manager 2320. In an alternative embodiment, the requesting entity is given or granted direct access to Data Queue 2520, but then the requesting entity may need to manage the pointers, potentially adding some complexity. However, whether or not the requesting entity gets direct access to the data is not critical to the invention, and is a feature of a particular embodiment of the invention.

Figure 27:
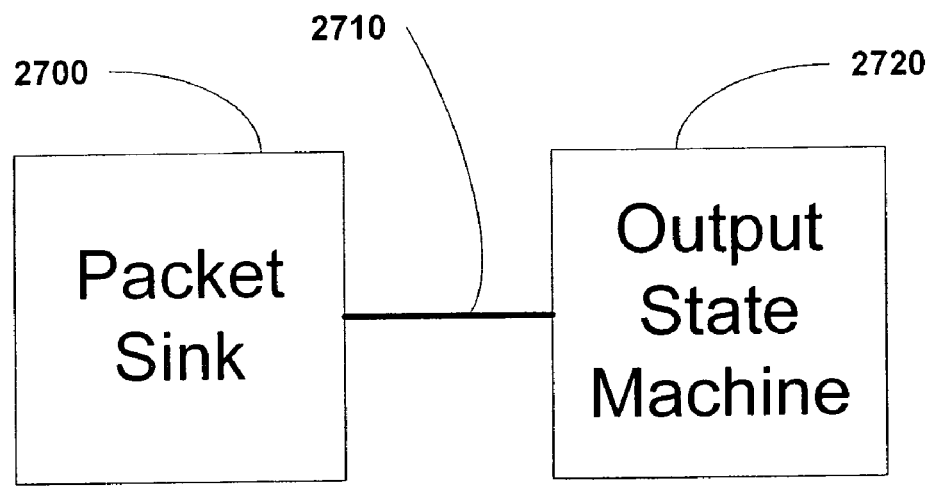
FIG. 27 shows an exemplary interconnection between an external sink of packets and an Output State Machine.

Output State Machine 2500 may serve to send data out to an outside format from Interface 2330. The specific circuits required may vary according to two variables illustrated in the embodiment of FIG. 27. The first possible variable is the actual packet format being sent to Packet Sink 2700. In one non-limiting embodiment that packet format is Ethernet, and the Packet Sink 2700 is an Ethernet Media Access Controller (MAC) in accordance with the Ethernet protocol standards accepted in the industry. Another embodiment might have Packet Sink 2700 delivering data in a format such as Asynchronous Transfer Mode (ATM), or any other such format well known in the industry.

The second variable is the actual physical connection 2710 between Packet Sink 2700 and Output State Machine 2720. This will or may depend on the specific configuration of Packet Sink 2700; it might for example be a proprietary bus or an industry standard interface such as Serial Packet Interface (SPI), the standard for which is hereby incorporated by reference as of the date or filing of this application. The specific configuration of the Output State Machine 2720 needed to accommodate these two variables may be determined by means known to those having ordinary skill in the art in light of the description provided herein. In one embodiment, Ethernet data is accepted on a physical connection 2710 that includes or consists of eight bits of data, a transmit ready signal (Tx_Ready signal), and a transmit error signal (Tx_Error signal).

Figure 28:
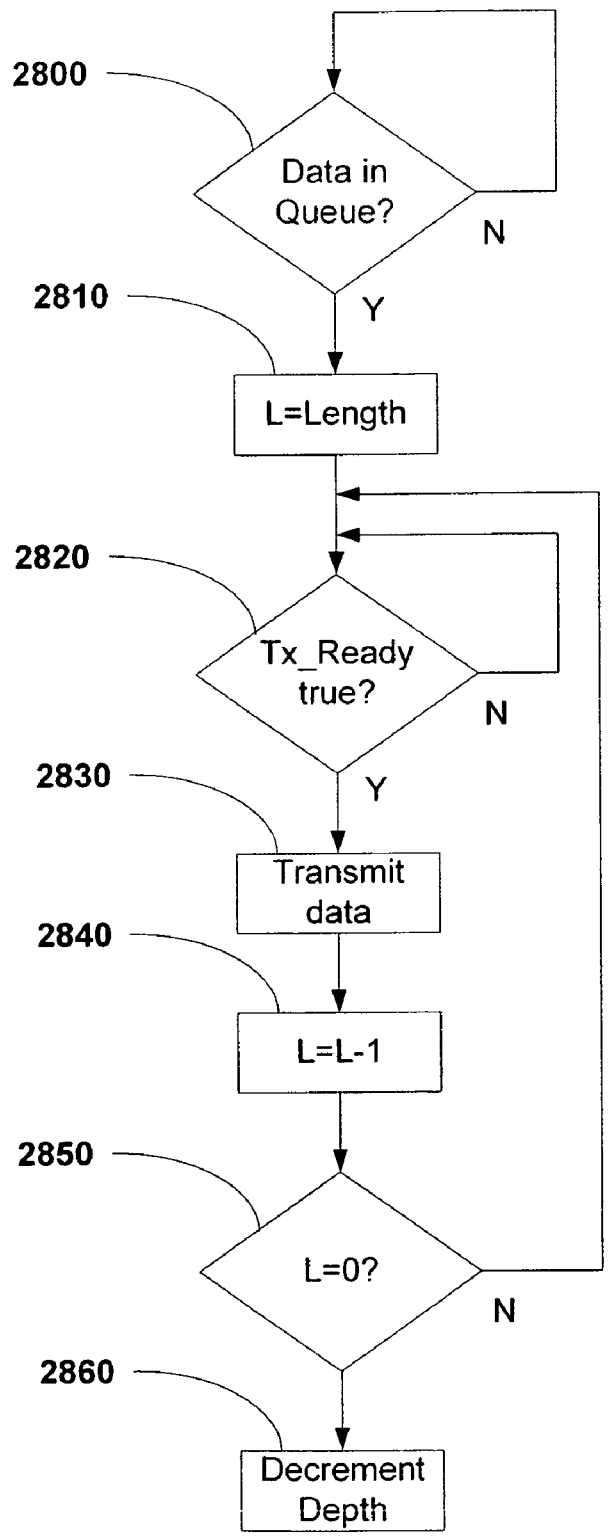
FIG. 28 illustrates an exemplary embodiment of the functionality of an Output State Machine within a Tx Interface block.

FIG. 28 illustrates one exemplary embodiment of the operation and functioning of an exemplary Output State Machine 2500. Data Queue 2520 is tested for available data (Step 2800); when available, a length variable L is initialized (Step 2810) to the length of the packet to be transmitted. The Tx_Ready signal is then tested (Step 2820) to ensure that the line is ready to accept data. When ready, data is transmitted (Step 2830), and the length variable L is decremented (Step 2840). If L is not yet zero (Step 2850), then the process returns to test the line (Step 2820) and transmit more data. Once L reaches zero, the Queue Depth 2510 is decremented (Step 2860), and the process completes.

Figure 29:
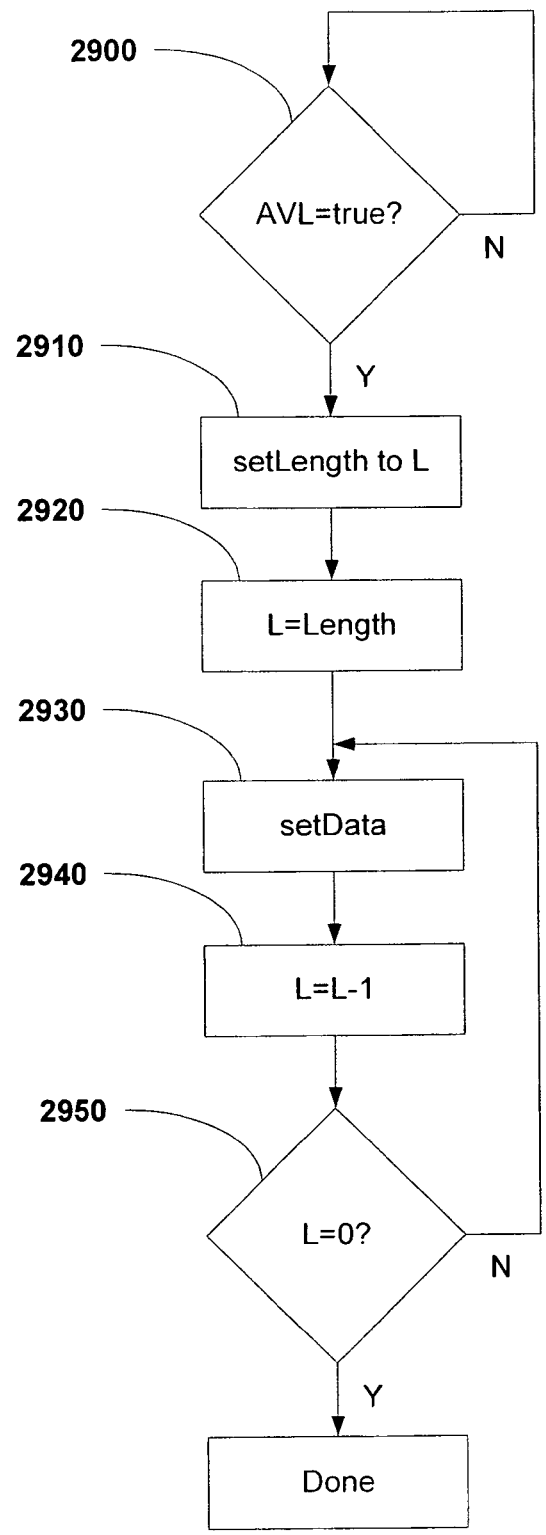
FIG. 29 illustrates an exemplary embodiment of the functionality of an Transmit State Machine within a Tx Interface block.

FIG. 29 illustrates an embodiment of the usage and operation of an exemplary Transmit State Machine 2540. Transmit State Machine 2540 can service this algorithm using any appropriate implementation, and such implementation should be apparent to workers having ordinary skill in the art in light of the description provided herein. The entity exercising this interface algorithm may be a single unit or a combination of units. In one exemplary but non-limiting embodiment, Port Manager 2320 exercises Steps 2900 and 2910, and then under the direction of Port Manager 2320 as described relative to the process illustrated in FIG. 24, Context Copier 2360 and Payload Copier 2350 exercise the remaining steps of the procedure or algorithm.

As illustrated in FIG. 29, an availability signal AVL may be provided from Transmit State Machine 2540. The requesting entity polls the AVL signal (Step 2900); once it's true, the length of data to be stored is set using the setLength instruction (Step 2910). A length variable L is initialized to the length of data to be stored (Step 2920), and the set data (e.g., setData) instruction is then successively issued (Step 2930), with the length L being decremented each time (Step 2940), until a test for L reaching zero is true (Step 2950).

In at least one embodiment, a role of the Transmit State Machine 2540 is to provide access to the data to the requestor without the requestor having specifically to know where the data resides in memory. The storage and management of this information may be provided in any of a variety of ways, and such ways should be readily apparent to those workers having ordinary skill in the art in light of the description provided herein, and the specifics are not critical to the invention.

Figure 30:
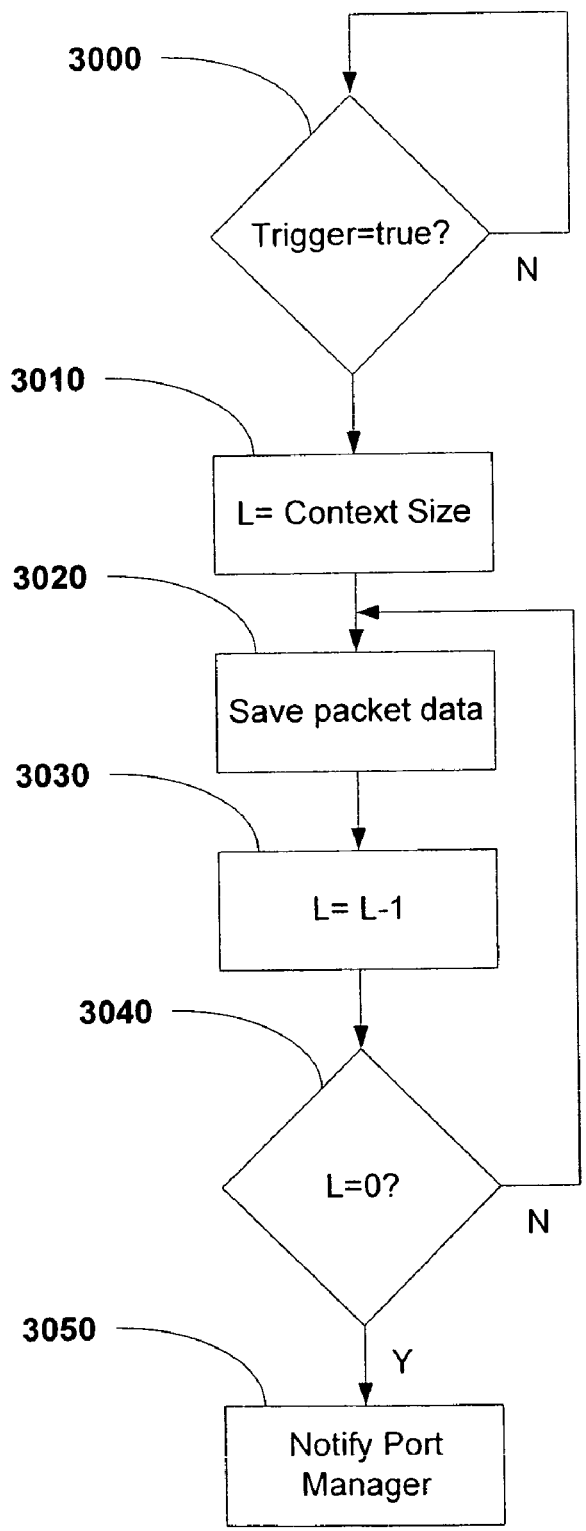
FIG. 30 shows an exemplary embodiment of the functionality of a Context Copier within a Tx Interface block.

FIG. 30 shows the functioning of Context Copier 2360. The process starts with Context Copier 2360 monitoring the Trigger signal on Port Manager 2320 (Step 3000). When true, the Context Size is placed in a register (Step 3010) or other suitable storage. Packet data is then sent (Step 3020) and the length variable is decremented (Step 3030), followed by a test (Step 3040) of whether the length has reached zero indicating that there is no more data. If the length is not zero, then the Save data (Step 3020) and decrement length (Step 3030) steps are repeated. When the length reaches zero, Port Manager 2320 is notified that the operation is complete (Step 3050).

Figure 31:
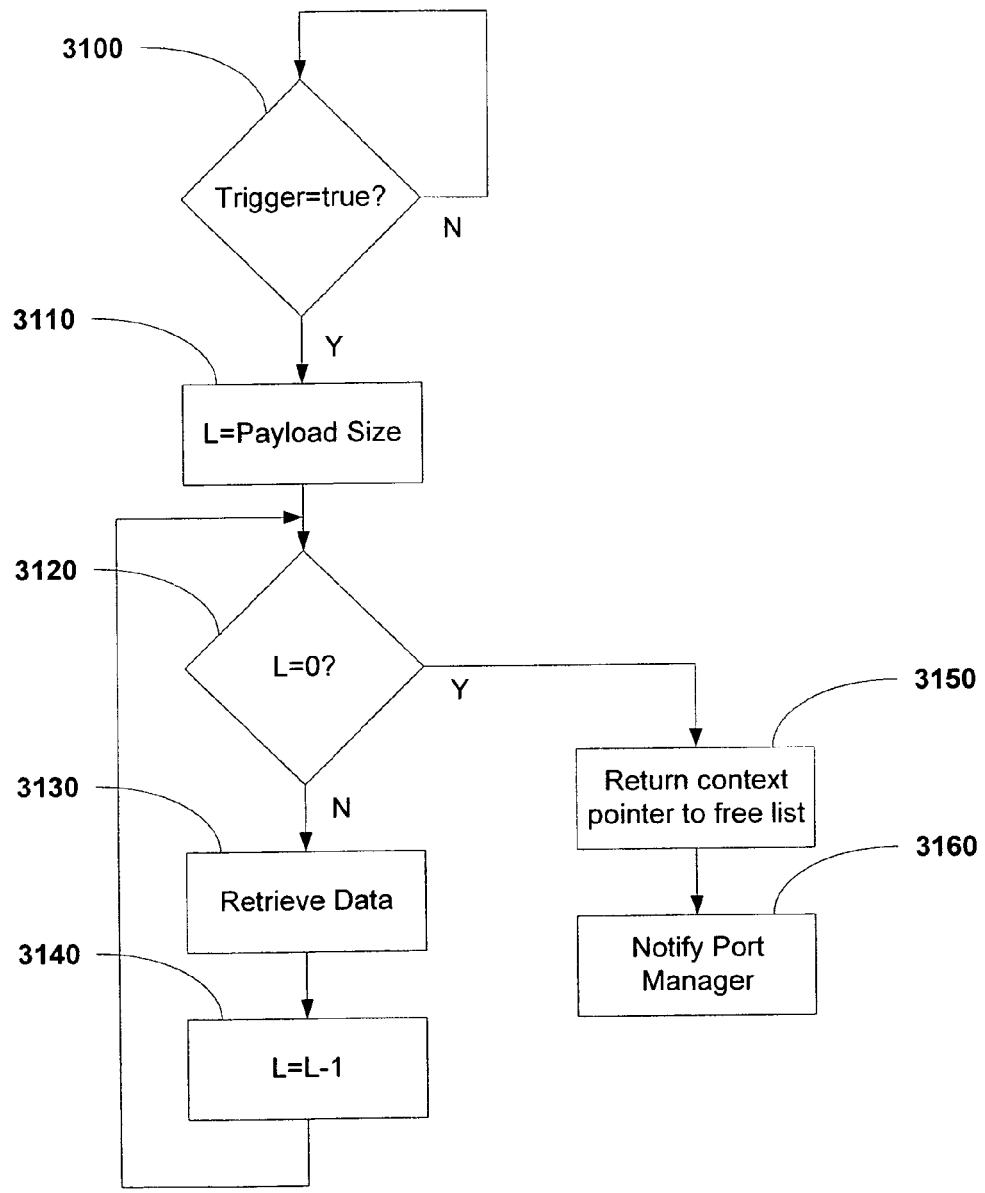
FIG. 31 shows an exemplary embodiment of the functionality of a Payload Copier within a Tx Interface block.

FIG. 31 illustrates an exemplary operation of an implementation of the Payload Copier 2350. Payload Copier 2350 receives from the Port Manager 2320 a packet size and the context size, from which it calculates a Payload Size. In one embodiment the Payload Size=max(0, Packet Size−Context Size). The Payload Copier also receives a Payload address. Optionally, a payload offset may be used to reflect a gap after the start of the allocated memory before data is written. The existence of this gap is optional and is not critical to the invention. A Trigger signal, which is used by the Port Manager 2320 to start the payload copy operation in accordance with the process described relative to the embodiment illustrated in FIG. 24, is monitored (Step 3100). When true, a length variable is initialized with the calculated payload size (Step 3110). If tested greater than zero (Step 3120), data is retrieved and sent to Interface 2330 (Step 3130) and the length variable is decremented (Step 3140); the length is then retested (Step 3120). Once the length reaches zero, the context memory is deallocated by returning its pointer to Free List 1065 (Step 3150), and Port Manager 2320 is notified that the payload copy process is complete (Step 3160).

FIG. 31 illustrates an embodiment where the payload is retrieved from a single memory. Another embodiment allows a fragmented payload to be retrieved from a number of different memories, giving priority if desired to memories having preferable characteristics like speed, while using other lower-priority memories when the high-priority memories are full, as illustrated in FIG. 20.

Figure 32:
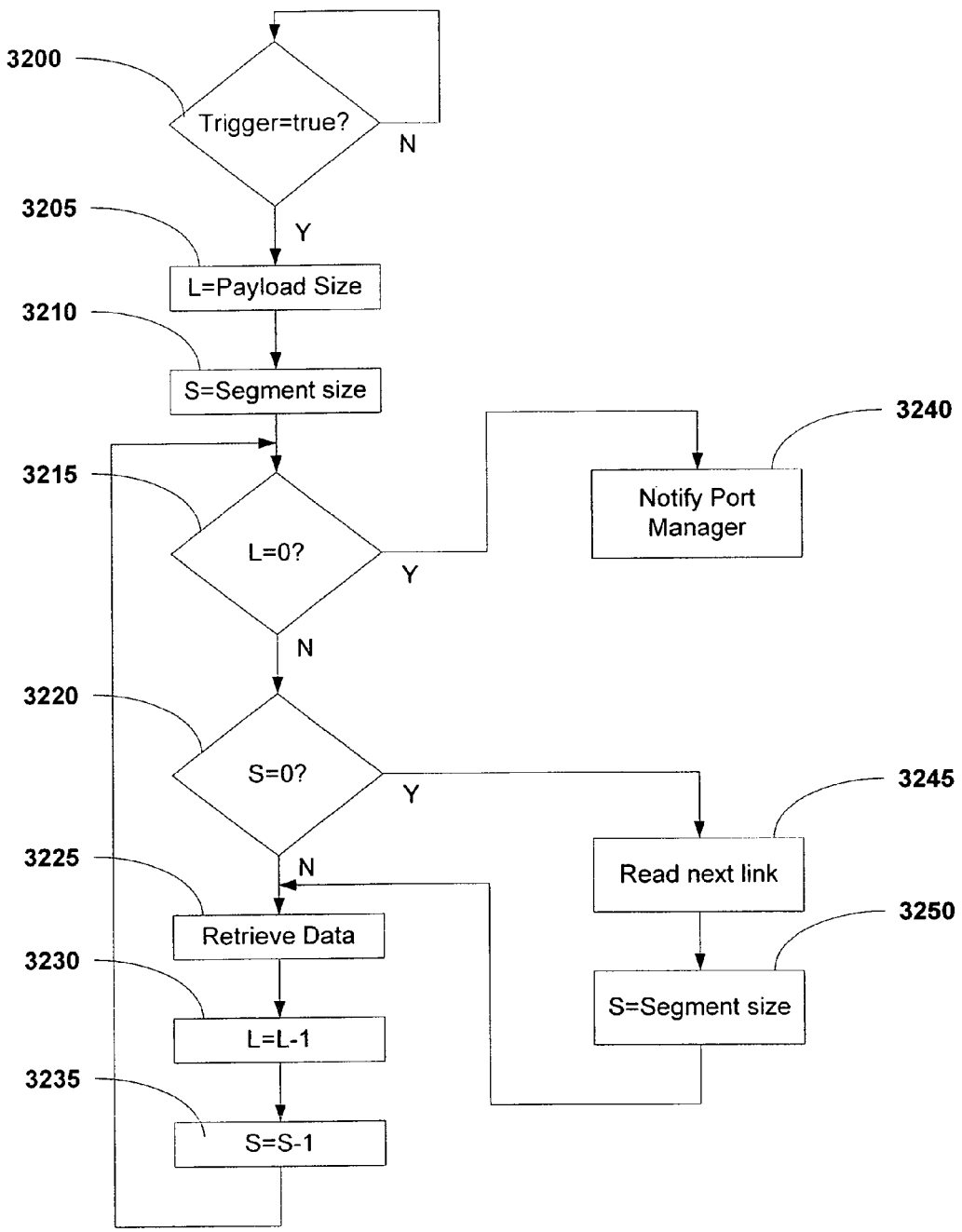
FIG. 32 illustrates an exemplary possible process for storing a payload in segmented storage.

FIG. 32 illustrates a non-limiting embodiment of a process that can be used to retrieve payload data from segmented payload storage. It is similar to the process already described relative to FIG. 31, with additional steps added to manage the segment size and links. After detecting the trigger (Step 3200), the payload size is assigned to a length variable L (Step 3205) as before. In addition, a Segment size is assigned to its own variable S (Step 3210). The length is tested for zero (Step 3215), and then the segment variable is tested for zero (Step 3220). If the segment variable has not yet reached zero, then data is retrieved and sent to Interface 2330 (Step 3225), the length is decremented (Step 3230), and the segment variable is decremented (Step 3235). Then the length and segment tests (Steps 3215 and 3220) are repeated. If the segment variable is zero, then that segment has been exhausted and a new one is needed. The next link address is read from the current memory (Step 3245). The segment variable is then reloaded (Step 3250), with the same segment size in the case of a uniform segment size, or optionally with the segment size pertaining to the new memory in the case where each memory has an associated segment size. Data retrieval (Step 3225) can now recommence in the new segment. In the case that the length tests to zero (Step 3215), Port Manager 2320 may be notified (Step 3240) that the operation is complete.

Figure 33:
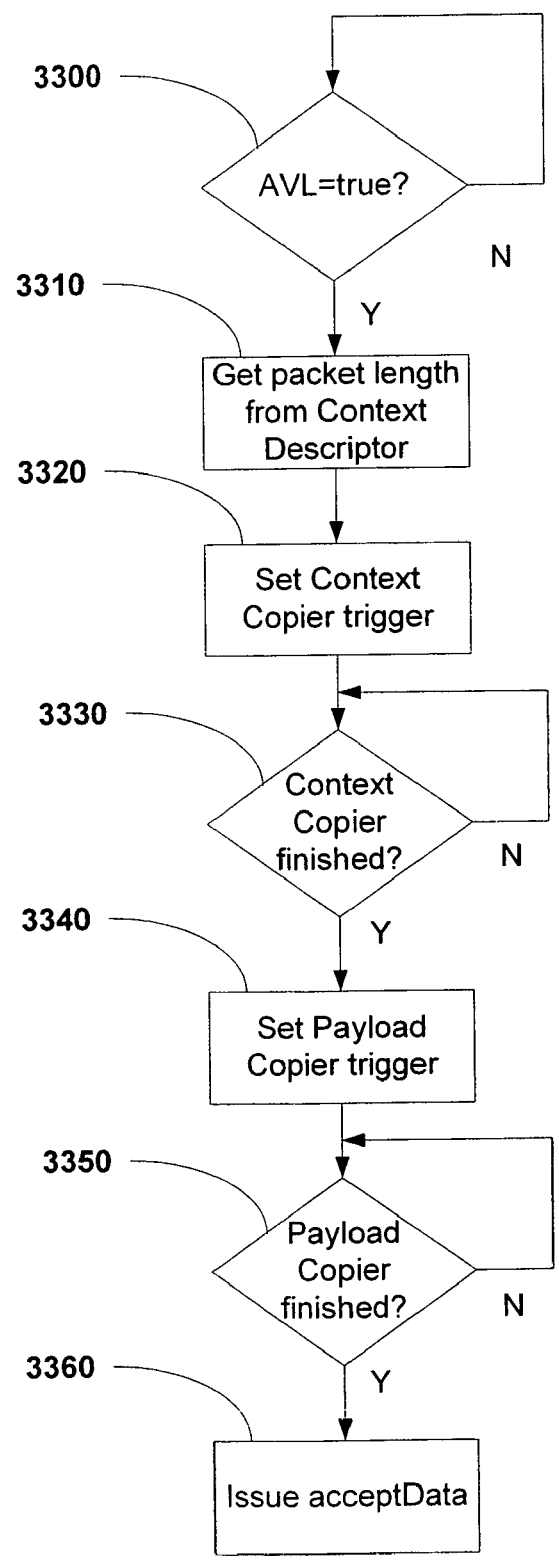
FIG. 33 shows an exemplary embodiment of the functionality of a Port Manager within a Tx Interface block.

FIG. 33 illustrates a non-limiting exemplary embodiment of operation of the Port Manager 2320. It starts by querying the AVL signal on Interface 2330 to see if it's true (Step 3300). If true, it retrieves the packet length from Context Descriptor signal set 2390 (Step 3310) and then sets the trigger to start Context Copier 2360 (Step 3320). It then polls to see if Context Copier 2360 is finished (Step 3330). Once Context Copier 2360 has completed, the trigger to start Payload Copier 2350 is set (Step 3340), and the Payload Copier 2350 is polled to see when it finishes (Step 3350). Once finished, it issues an accept data (e.g., acceptData) instruction (Step 3360) to Interface 2330 to complete the process.

Stats block 2305 operates to maintain statistics and allows the host to query for statistics through host connection 2310. The Stats block 2305 may be optional in some embodiments and the construction of Stats block 2305 as shown in FIG. 23 is not critical to the invention. In one embodiment, the following statistics may advantageously be kept: (i) packets per second transmitted, and (ii) packets dropped as directed by processing. Other or different statistics may be kept as well. Various means and methods may be used to gather when desired and to store statistics when so desired, and the specific means of gathering and storing the statistics will be apparent to one skilled in the art in light of the description provided here. Neither the specific statistics chosen nor the means of gathering them is critical to the invention. Reporting of statistics can be done by a variety of means and methods. Two of these possibilities are by directly memory-mapping each statistic storage register and allowing the requesting entity to query each statistic individually; or by memory-mapping only the Port Manager 2320, and providing an instruction to the Port Manager 2320 that indicates the statistic to be retrieved and reported by the Port Manager 2320. One embodiment advantageously uses the former of these two methods and another method uses the latter method. The specific reporting method is not critical to the invention.

Figure 34:
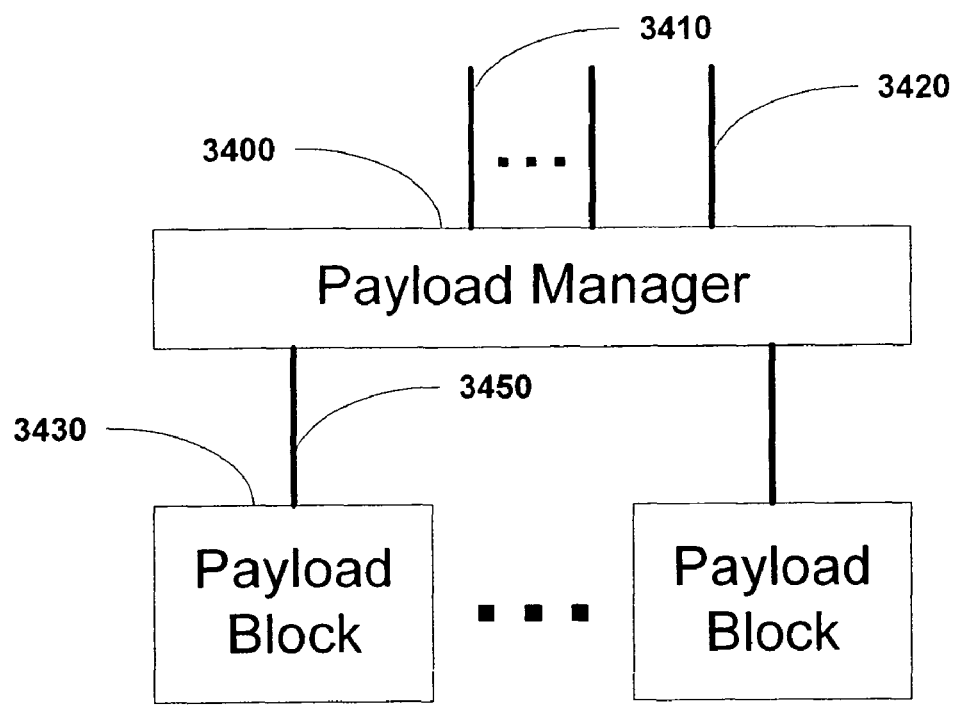
FIG. 34 shows an exemplary embodiment of a Payload Access Block.

FIG. 34 shows an exemplary embodiment of Payload Access Block 830 already shown and described relative to FIG. 8. It includes two blocks, a Payload Manager 3400 with Packet Access Module connections 3410 and optional host connection 3420, and one or more Payload Block 3430 connected via Payload Block connection 3450. Payload Manager 3400 accepts requests for allocations, deallocations, and access to Payload Blocks 3430 and provides arbitration and access.

Figure 35:
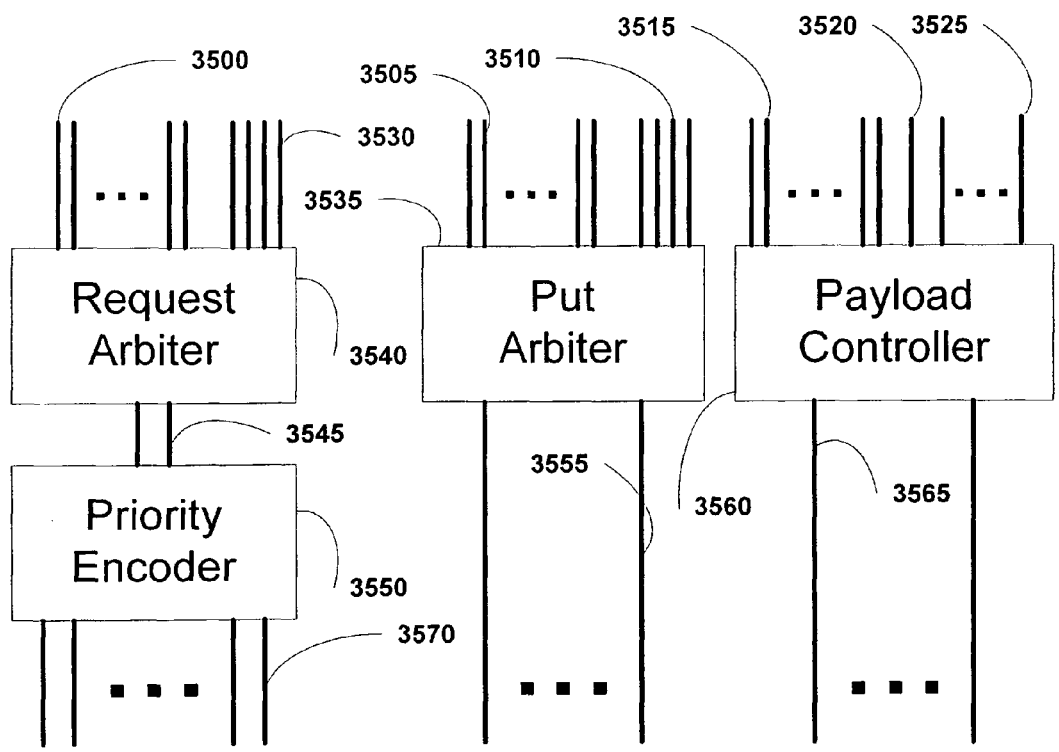
FIG. 35 shows an exemplary embodiment of a Payload Manager.

FIG. 35 illustrates an exemplary embodiment of Payload Manager 3400. In includes a Request Arbiter 3540, with Packet Access Module Request connections 3500 and optional Host connections 3530; a Priority Encoder 3550 connected to or coupled with Request Arbiter 3540 by connections 3545, and with Payload Block Allocation connections 3570; a Put Arbiter 3535 with Packet Access Module Put connections 3505, optional host Put connections 3510, and Payload Block Deallocation connections 3555; and a Payload Controller 3560 with Packet Access Module Access connections 3515, optional Host Access connection 3520, optional Pipeline Access connections 3525, and Payload connections 3565.

Request Arbiter 3540 receives requests for payload memory allocations (primary locations and link extensions if multiple memories are used) from the Packet Access Modules 820 and optionally from a host. It arbitrates the requests using arbitration techniques known to those skilled in the art to provide orderly access to the Priority Encoder 3550. Priority Encoder 3550 assigns a priority to each of the memories that it manages. It receives a status (for example a full, or a not full status) from each Payload Block 3430 on one of the Payload Block Allocation connections 3570, and may provide a memory pointer from the highest priority memory that is not full. The priority encoding techniques used are well known to those skilled in the art. Put Arbiter 3535 takes deallocation requests from the Packet Access Modules 820 and optionally from the host. It arbitrates the requests using arbitration techniques well known to those skilled in the art to provide orderly servicing of the deallocation requests. Payload Controller 3560 provides actual access to the contents of Payload Blocks 3430. Such access may be requested by the Packet Access Modules 820 and optionally by the host or optionally by one or more connections to computing elements via Pipeline connections 3525.

Figure 36:
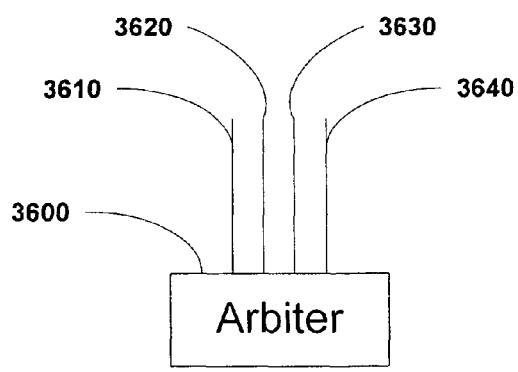
FIG. 36 illustrates an exemplary embodiment of the Host Request and Put interface in the embodiment of FIG. 35.

In the exemplary embodiment illustrated in FIG. 35, the Packet Access Module Request input 3500 and Put input 3505 include request/grant pairs of signals in a manner well known to one skilled in the art. The Host Request and Put inputs 3530 and 3510 in this embodiment were implemented differently, as illustrated in the embodiment of FIG. 36. Arbiter 3600 receives Request input signal 3610 and Grant output signal 3620, but in addition may create a Done output signal 3630 and a Wait output signal 3640. Because of the way the host issues a request, once the host releases the request signal, the Grant may already have been issued, or alternatively it may not have been issued yet.

Figure 37:
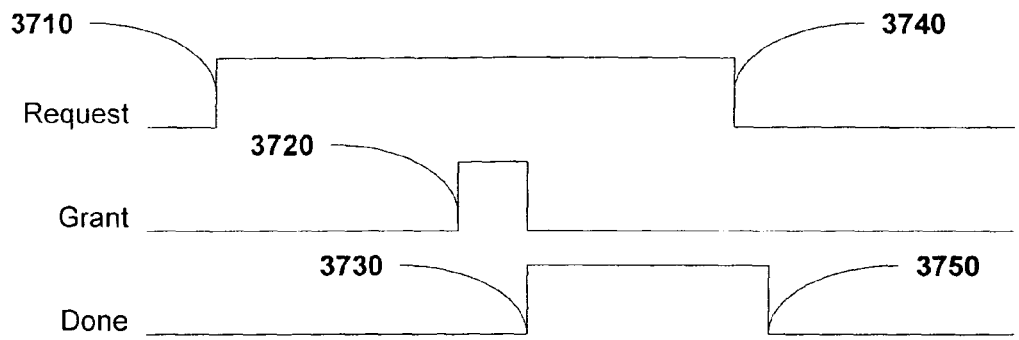
FIG. 37 illustrates exemplary timing of the signals in the embodiment of FIG. 36 when an access grant occurs before the host grant request expires.

In order to remove possible ambiguity and prevent a timeout, Done output signal 3630 is asserted if the Grant output signal 3620 is asserted while the Request input signal 3610 is still asserted. The Done output signal 3630 will be deasserted once the Request input signal 3610 is deasserted. This is illustrated in FIG. 37. Request input signal 3610 is asserted (Step 3710), and at some time the Grant output signal 3620 is asserted (Step 3720). Because Request input signal 3610 is still asserted, Done output signal 3630 is asserted (Step 3730). Once Request input signal 3610 is deasserted (Step 3740), then the Done output signal 3630 is deasserted (Step 3750).

Figure 38:
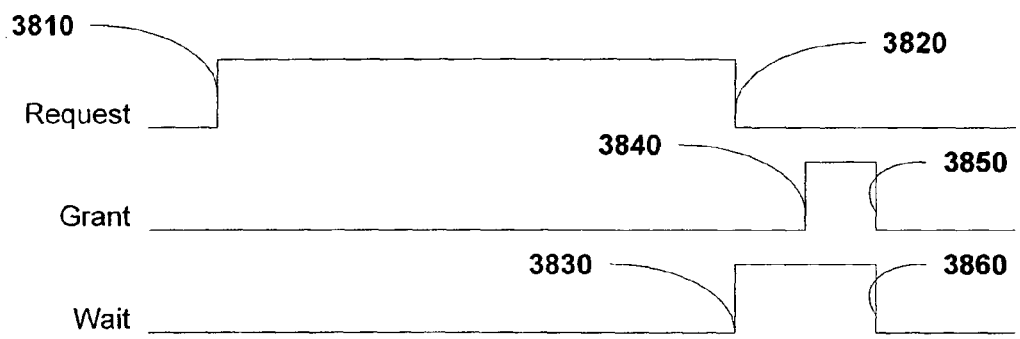
FIG. 38 illustrates exemplary timing of the signals in the embodiment of FIG. 36 when an access grant occurs after the host grant request expires.

FIG. 38 illustrates an exemplary embodiment of a situation where Grant output signal 3620 is asserted after Request input signal 3610 is deasserted. Again, the Request input signal 3610 is first asserted (Step 3810), but is deasserted (Step 3820) before anything has happened. Therefore, the Wait output signal 3640 is asserted (Step 3830). The Grant output signal 3620 is eventually asserted (Step 3840), and when it is deasserted (Step 3850), the Wait output signal 3640 is also deasserted (Step 3860). The logic required to implement the Done and Wait output signals 3630 and 3640 is straightforward and should be readily apparent to one having ordinary still in the art in light of the description provided here. The host uses the values of the Done and Wait output signals to receive an acknowledgment that its request has been received, and to decide whether it has already been granted access or should wait some more time for the access grant.

The foregoing exemplary discussion discusses one possible exemplary implementation of a part of one embodiment of the invention, and is provided in considerable detail so that it will be apparent to those workers having only rudimentary skill in the relevant art how one may make and use the invention. It will be apparent that various other circuits, logic, and methodologies or procedures may alternatively be utilized to achieve the overall operation and benefits described. Therefore it will be appreciated that neither the invention as a whole nor the particular embodiments described in great detail are limited to these implementations and that this particular implementation is not critical to the invention. For example, alternative handshaking protocols can be implemented in place of the one described.

Figure 39:
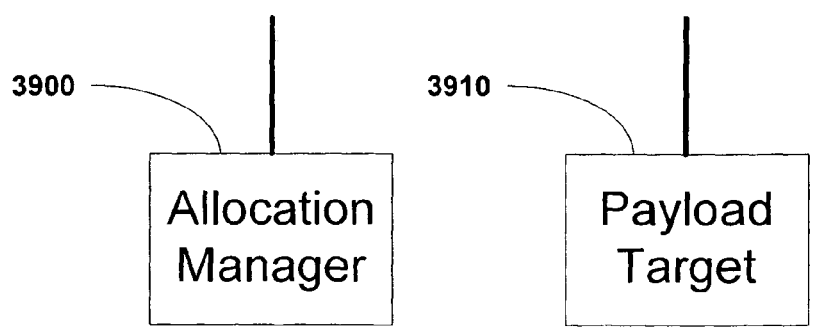
FIG. 39 illustrates an exemplary embodiment of a Payload Block.

An embodiment of Payload Block 3430 is illustrated in FIG. 39. It includes an Allocation Manager 3900 and a Payload Target 3910. Allocation Manager 3900 provides allocation and deallocation services for a specific memory. Payload Target 3910 provides content access for a specific memory.

Figure 40:
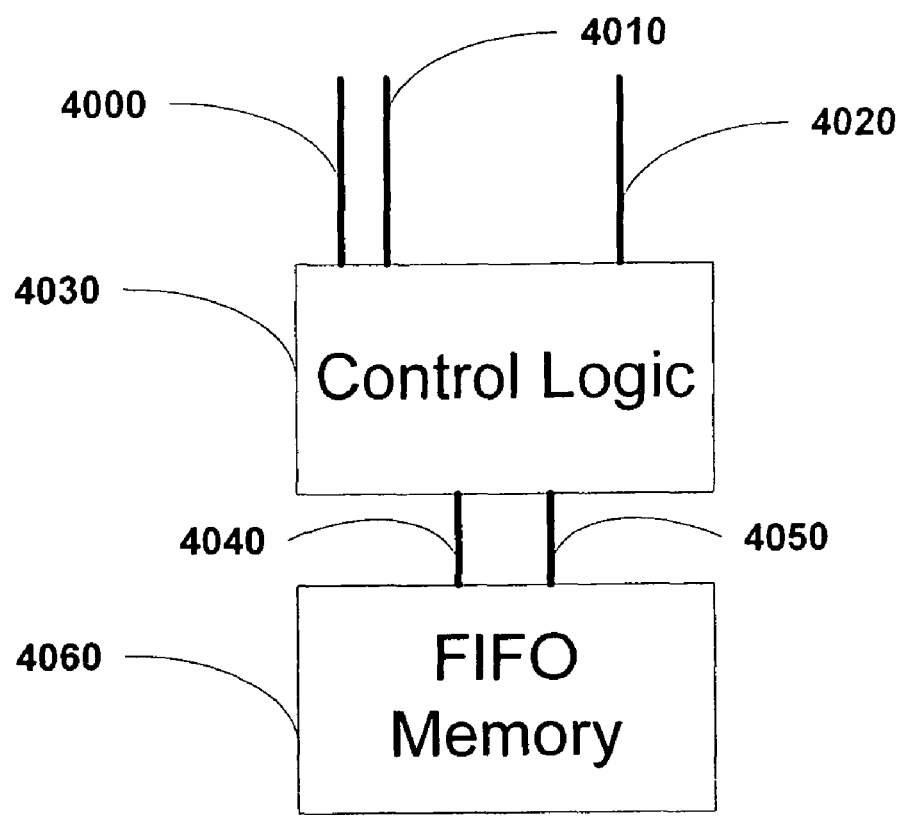
FIG. 40 shows an exemplary embodiment of an Allocation Manager.

An exemplary implementation of Allocation Manager 3900 is illustrated in FIG. 40. It includes Control Logic 4030 connected to a First-In-First-Out (FIFO) Memory 4060 via Read connections 4040 and Write connections 4050. Control Logic 4030 is connected to Get Pointer bus 4000, Status output signal 4010 and Put Pointer bus 4020. These are used to implement a so called "ring RAM" (described in further detail below) to manage allocation of blocks of memory to be used for storing payload data. This is one method of providing allocation management, but it will be appreciated in light of the description provided here that other suitable methods can also be used. The allocation methodology is not critical to the invention.

Figure 41:
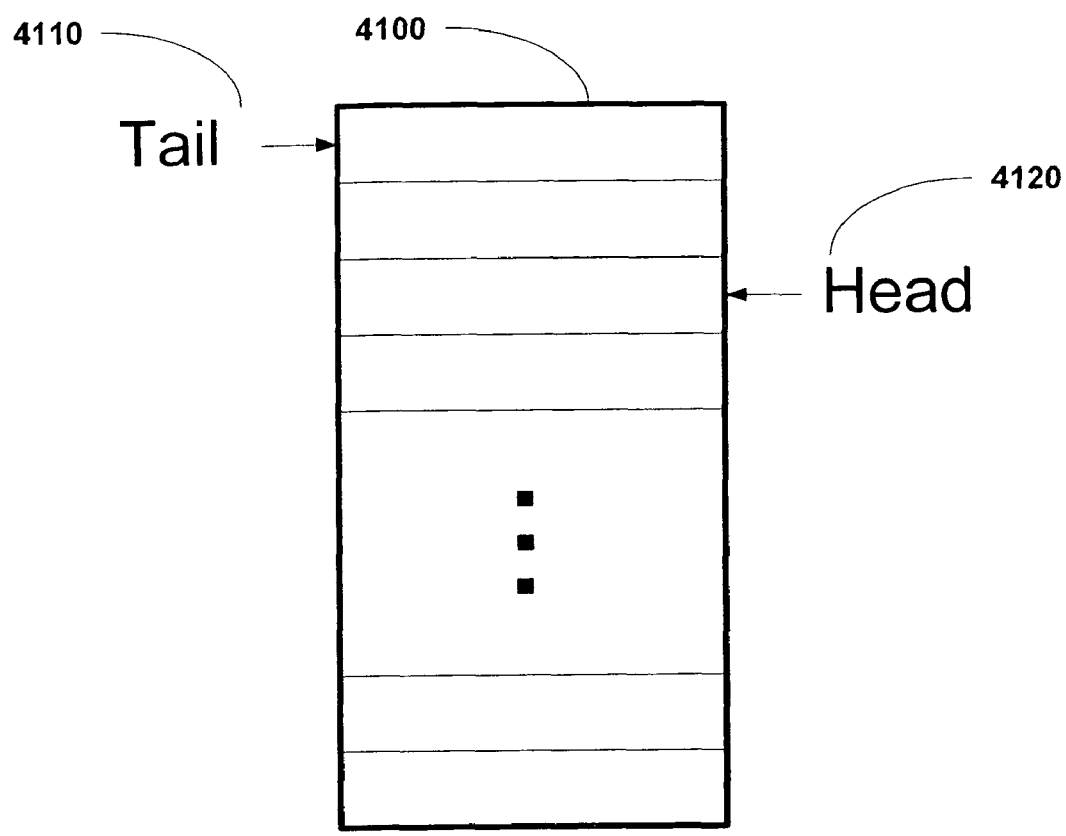
FIG. 41 shows an exemplary embodiment of a Ring RAM that may be used in the Payload Manager block of the Payload Block.

FIG. 41 illustrates an exemplary ring RAM. The logic of Control Logic 4030 controls how the ring RAM operates; given the operation described below, the content and operation of Control Logic 4030 is straightforward and will be apparent to those skilled in the art in light of the description provided. Two registers store the value of Tail 4110 and Head 4120. These values define the bounds of a list of addresses stored in FIFO 4100 or other data structure. This list may be smaller than the entire available memory for addresses.

This particular exemplary embodiment uses blocks of fixed size, but this is not a limitation of either the invention or of any particular embodiment, other embodiments may implement variable-sized blocks or a combination of fixed size and variable sized blocks. Still another alternative embodiment may allow fragmentation by using a linked list of addresses (or equivalent means and method) that allow multiple non-contiguous fixed-size blocks to be used to store larger packets. These variations may typically affect how the data is actually stored in memory and any state machine details required to format that data, but those data storage and state machine variations are not critical to the invention.

Figure 42:
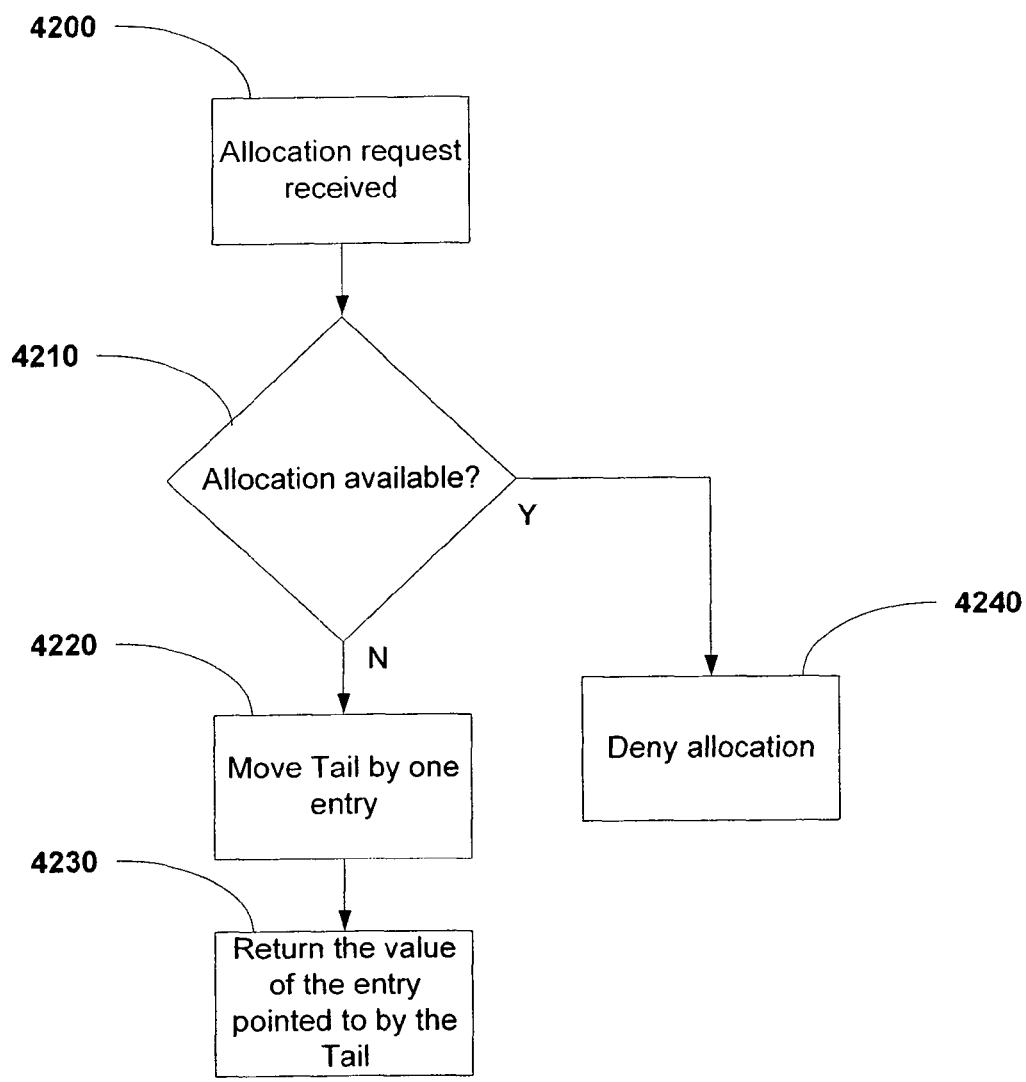
FIG. 42 shows an exemplary process for allocating a payload storage block.

FIG. 42 shows an exemplary embodiment of the process for allocating a block of payload memory for the fixed-block-size configuration illustrated in FIG. 41. When a request for allocation is received (Step 4200), the system first checks to see whether there is an allocation available (Step 4210). This may be done by examining whether the Tail pointer is one location behind the Head pointer. If so, then no new blocks are available and the allocation is denied (Step 4240). If there is a block available, the Tail is advanced one location (Step 4220) and the value of the new location is returned as the starting address of the allocated block (Step 4230).

Figure 43:
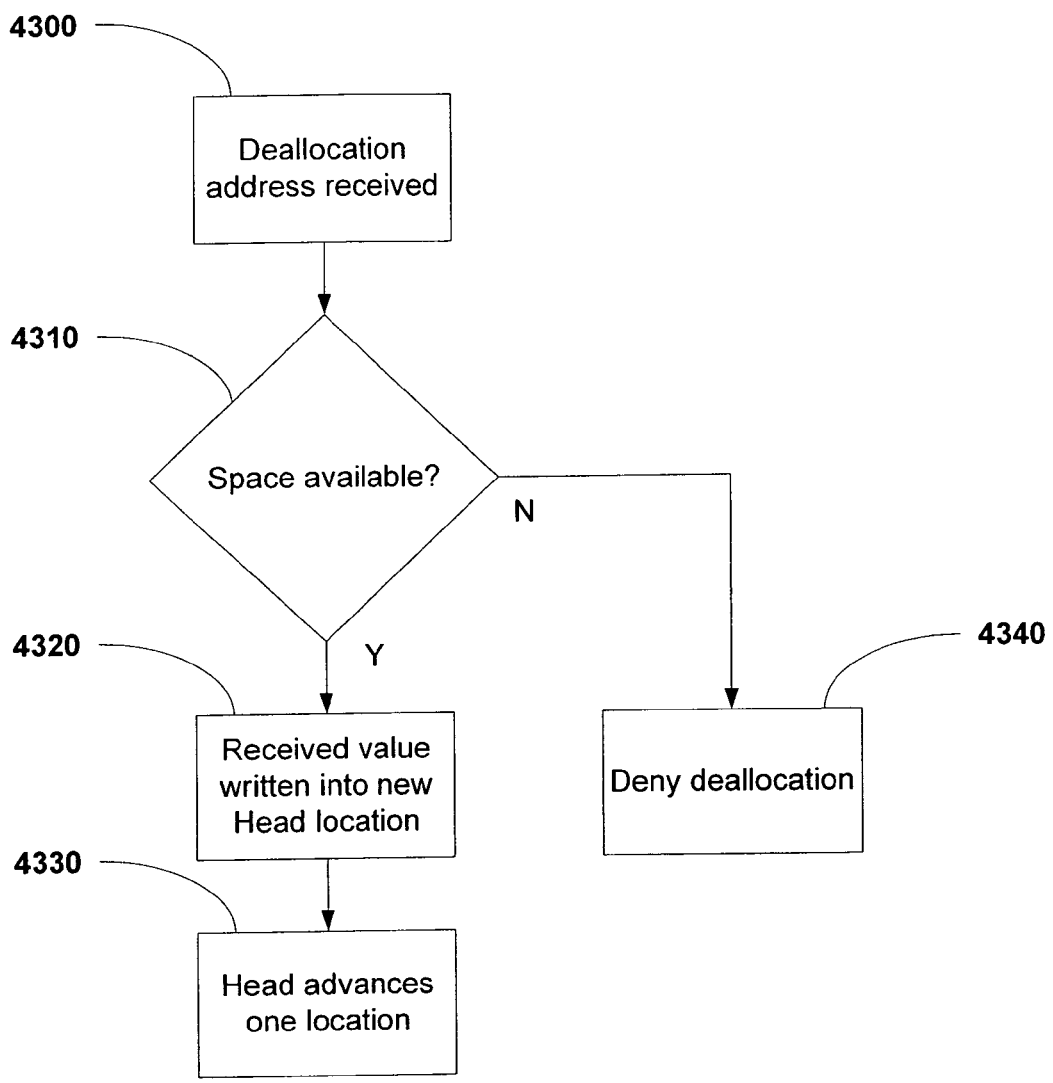
FIG. 43 shows an exemplary process for deallocating a payload storage block.

FIG. 43 shows an exemplary embodiment of the process for deallocating a block of payload memory for the fixed-block-size configuration illustrated in the embodiment of FIG. 41. The deallocation request arrives (Step 4300) with the address of the block being deallocated. Because it is optionally possible for a host to increase the number of allocatable blocks during execution such that the number available and the number outstanding actually exceed the available space in the Ring RAM, a check must be made to ensure that there is room for the deallocated pointer (Step 4310). If there is room, then the received value is written into the new location pointed to by the Head (Step 4320) and the Head is advanced one location (Step 4330). If there is no room in Step 4310, then the deallocation is denied (Step 4340).

Figure 44:
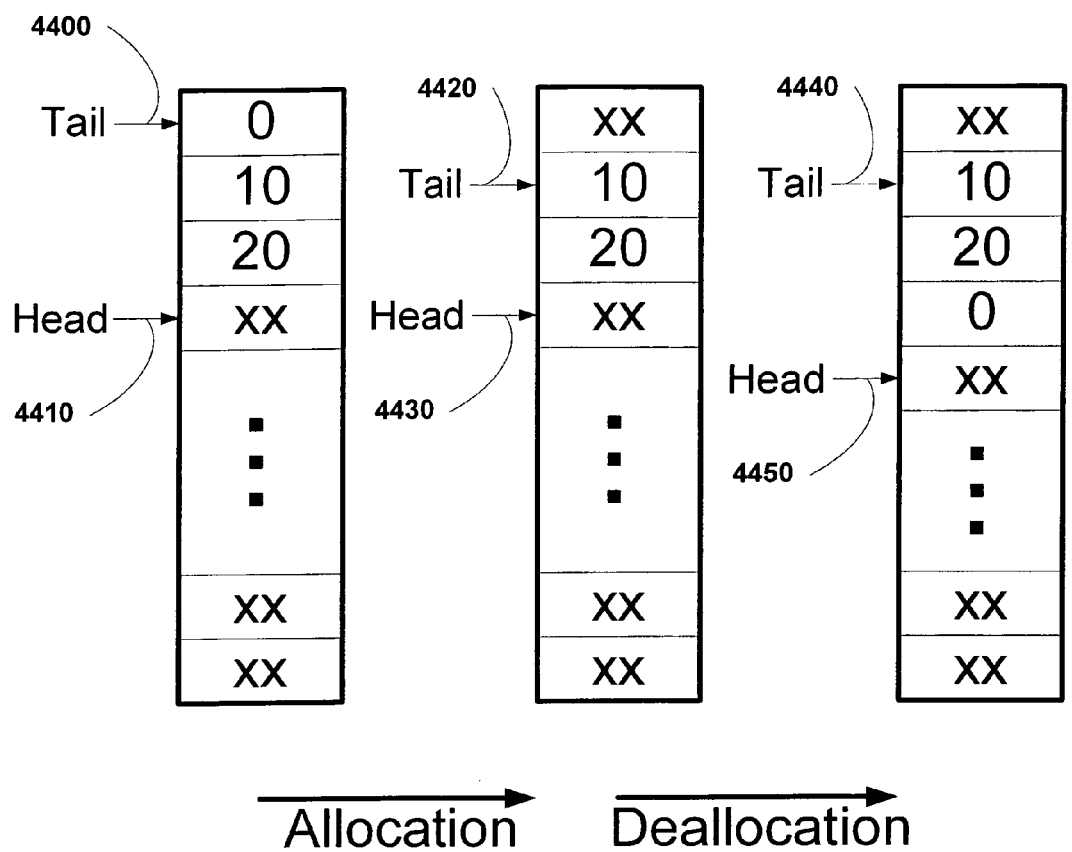
FIG. 44 illustrates an exemplary effect on the Ring RAM of an allocation and deallocation using one means of allocating and deallocating.

FIG. 44 illustrates aspects of the operation and effects of the embodiments described relative to FIG. 42 and FIG. 43. On the left, Tail 4400 is pointing to the location with content "0" and Head 4410 is pointing to the location after the location containing content "20". In this example, there is one additional location that has value "10" in it. The contents of all other locations are undefined, as indicated by value "xx" and the other values indicated are for the purpose of explanation. The actual bit value of these locations is not important, and can vary by implementation. Upon allocation, Tail 4400 is moved to the location shown by Tail 4420. The value "0", to which Tail 4400 points, is returned as the allocated value. Since address "0" has been allocated and is no longer available, it is no long present in the list. The actual value of the cell that Tail 4400 pointed to is not important after the Tail has moved to the location indicated by Tail 4420. The old value can remain, or a new "undefined" value can be entered. The location of Head 4410 does not change during allocation; Head 4430 is in the same position as Head 4410. Upon a deallocation request, the value of the deallocated block address, in this example "0", is placed in the location pointed to by Head 4430. The Head location is then advanced to the position shown by Head 4450. The position of Tail 4420 does not change upon deallocation, as shown by Tail 4440.

Figure 45:
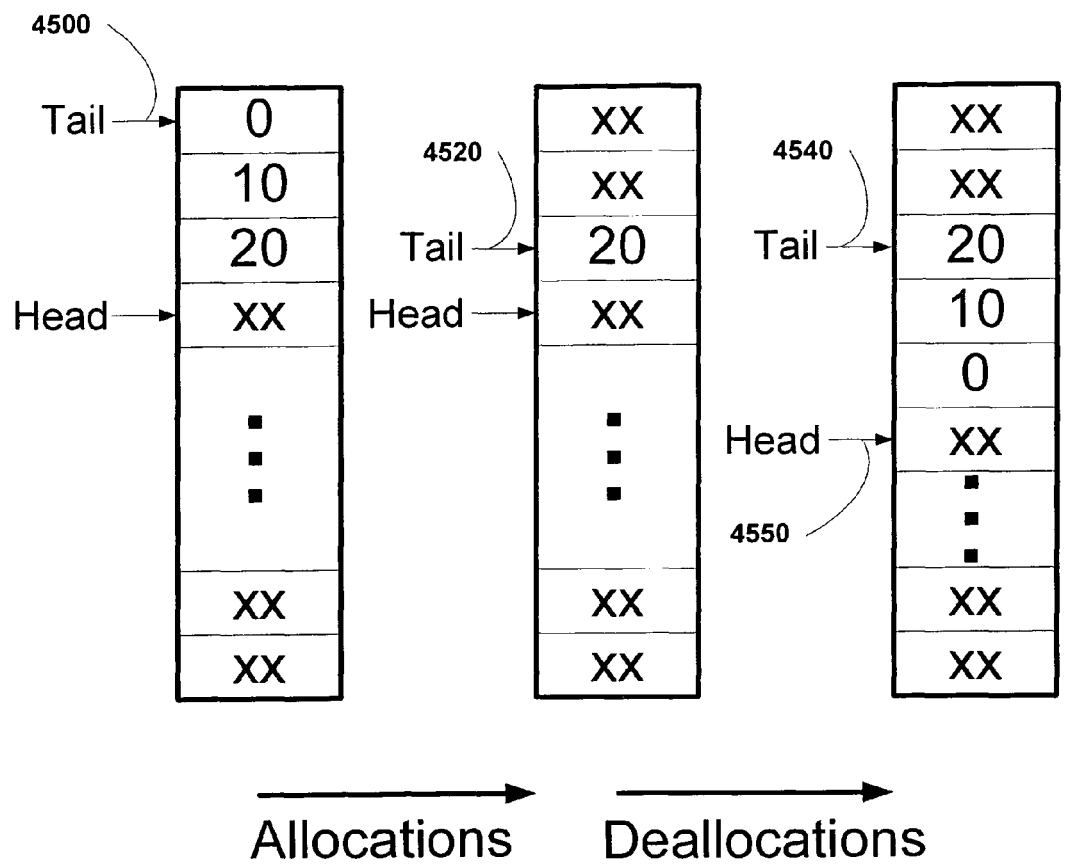
FIG. 45 illustrates the exemplary effect on the Ring RAM of successive allocations and deallocations using one means of allocating and deallocating, emphasizing the fact that blocks may be deallocated in a different order from the order in which they were allocated.

Note that this example shows the first allocated block (location 0) being the block deallocated. There is no requirement that blocks be deallocated in the order allocated so that any deallocation order may be used. FIG. 45 shows an example where after two allocations of blocks starting at "0" and "10", Tail 4500 is moved to the location shown by Tail 4520. The deallocations came in the opposite order, with address "10" being deallocated prior to address "0", as shown in the two cells above Head 4550.

The values of the addresses in the table are also not critical to the invention. They will usually correspond to the sizes of the block.

Upon table initialization, the values of all available blocks will be placed into the Ring RAM. The system may be designed such that during operation, additional payload memory blocks can be requested up to the number that can be held in the Ring RAM. This may advantageously be implemented by writing additional values into the Ring RAM and moving the Head pointer accordingly. The new values written in to the Ring RAM do not have to be contiguous with the original values written in. None of the values has to be contiguous to any preceding or following value, and the order of values entered does not matter.

The details of initialization, allocation, and deallocation may usually vary somewhat if variable-sized or fragmented blocks are used, and the changes that may be needed should be apparent to those workers having ordinary skill in the art and in any event the particular implementation details are not critical to the invention.

The details of Tail and Head pointer location relative to contents is also not critical to the invention. For example, the Head may be designed and implemented to point to the last available block address rather than one location beyond the last available block address, or according to some other scheme. Likewise, the Tail could be designed to point to one location before the first available block address rather than pointing to the first available block address, or according to some other scheme. This will affect the system only in that the decision determining whether or not available blocks exist will change in a way that will be apparent to workers having ordinary skill in the art in light of the description provided here.

Figure 46:
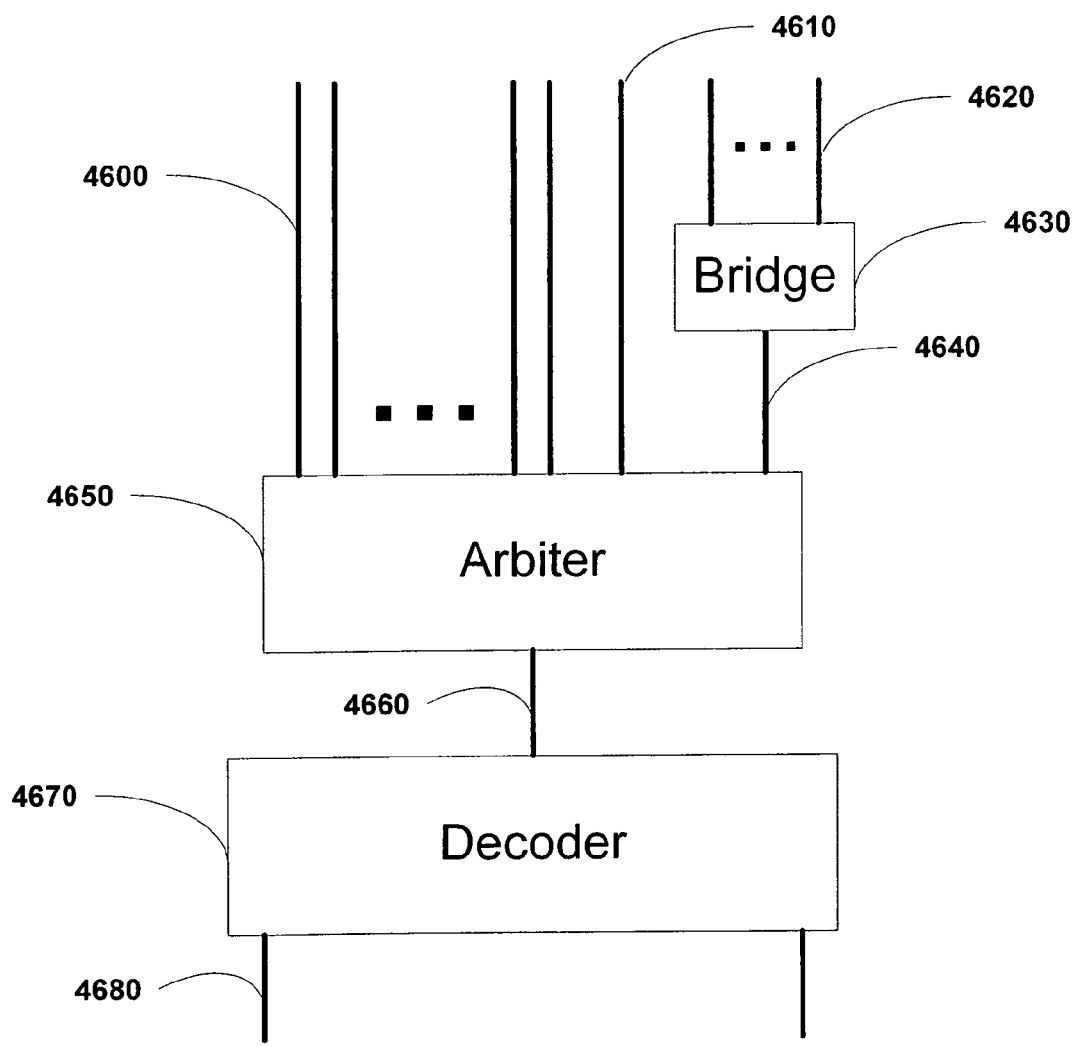
FIG. 46 illustrates an exemplary embodiment of a Payload Controller.

One embodiment of Payload Controller 3560 is shown and now described relative to the embodiment illustrated in FIG. 46. It includes an Arbiter 4650 with Packet Access Module Access connections 4600, optional Host Access connection 4610, and optional Pipeline Access connections 4620, which in this exemplary implementation are FSLs bridged to a bus 4640 by Bridge 4630. The Pipeline Access connections 4620 may alternatively be individually bridged onto separate busses that would go to the Arbiter 4650. Alternatively, instead of a simple Bridge, a Direct Memory Access (DMA) or other method of requesting data may be utilized. The specific formats of all of the connections into the Arbiter 4650 are not critical to the invention and various alternative means as are known in the art may be used. Arbiter 4650 performs access arbitration in accordance with standard techniques well known to those skilled in the art. Arbiter 4650 provides an address to Decoder 4670 on Decode input connection 4660; and Decoder 4670 accesses the selected memory via Payload Target connection 4680. The functioning of Decoder 4670 is that of a standard decoder and not described in further detail here.

Figure 47:
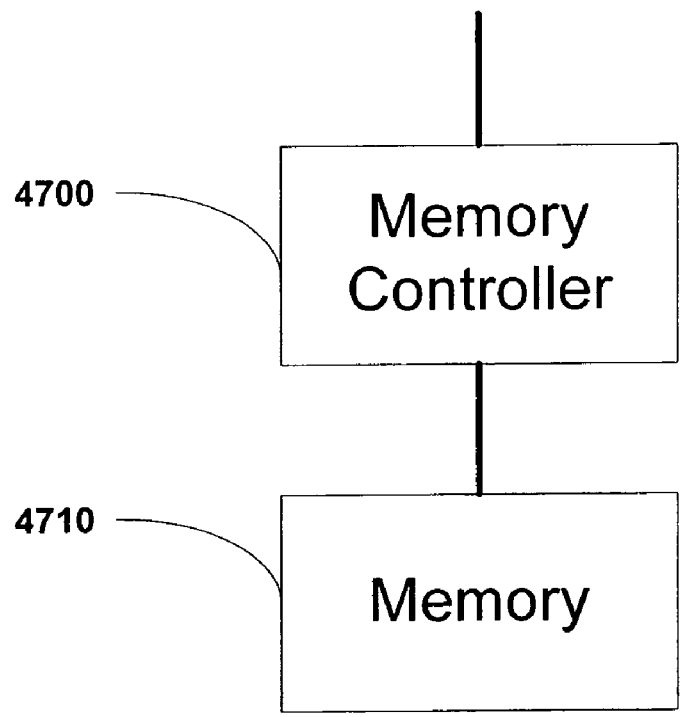
FIG. 47 shows an exemplary embodiment of a Payload Target.

One implementation of a Payload Target 3910 is shown in FIG. 47. It consists of a Memory Controller 4700 and a Memory 4710. Memory 4710 can be of any suitable type, Static Random Access Memory (SRAM), Dynamic RAM (DRAM), or any other memory type whose characteristics meet the needs of a particular application. In the preferred embodiment, a priority is assigned to the Payload Blocks 3430 by the order in which they are physically attached; that is, the first memory is highest priority and will be chosen first if available; the second memory will only be used if the first is no longer available. This priority scheme is not critical to the invention, and other priority schemes can be used. Memory Controller 4700 will be of a standard design well known to one skilled in the art according to the type of memory. All connections configurations will be determined by the memory type, and will be obvious to one skilled in the art. The type of memory and the resulting other configurations that result from the memory type are not critical to the invention, and it is expected that the different Payload Targets will use different memories and have different memory controller and connection configurations.

Figure 48:
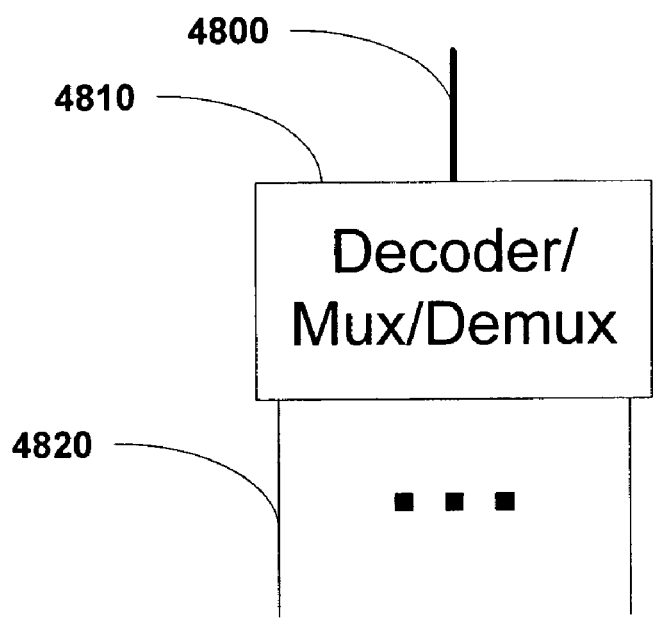
FIG. 48 shows an exemplary embodiment of a Manager Block.

Manager block 810 can act primarily to be an interface between the host bus and clock domain and the system of the invention, an example of which is shown in FIG. 48. Decoder/Mux/Demux 4810 allows the host to access the rest of the system via Host bus 4800, decodes the address presented by the host, and demuxes the signal to the appropriate Internal Target connection 4820 within the system. Internal Target connections 4820 can be any of a number of types of connections, appropriate to the actual kind of circuit to which they connect. The types of connections are not critical to the invention. Conversely, an internal element can access the host bus, being demuxed onto Host bus 4800 by decoder/multiplexer/demultiplexer (Decoder/Mux/Demux) 4810. Various ways of implementing a decoder, multiplexer, and demultiplexer are known in the art and any of these may be adapted to provide the operation as described so that the implementation of Decoder/Mux/Demux 4810 will be straightforward to one skilled in the art in light of the description provided here, and a particular structure is not critical to the invention.

Figure 49:
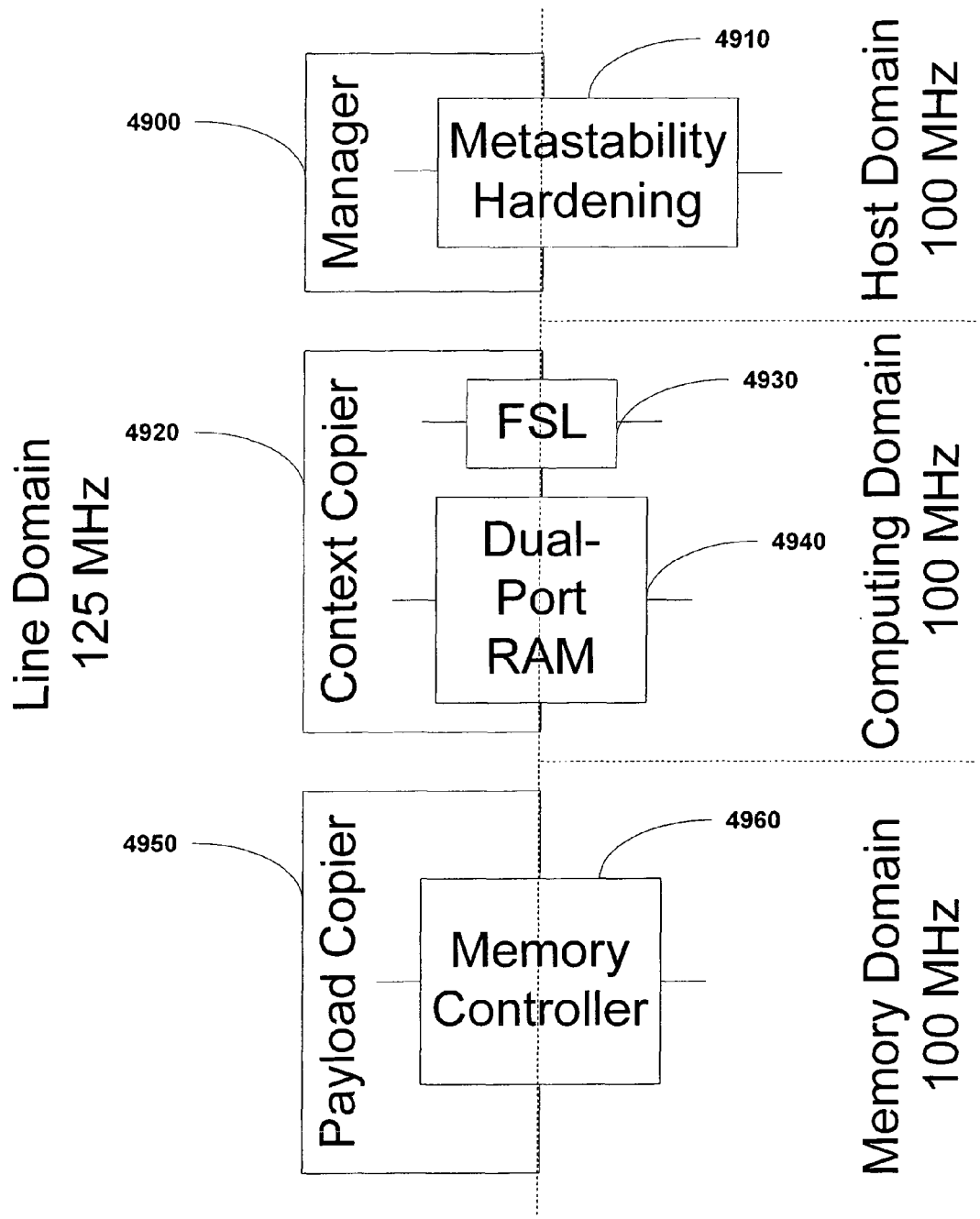
FIG. 49 illustrates one exemplary method or process of implementing the clock domain crossings.

FIG. 49 illustrates exemplary structure, means, and method by which one realized embodiment provides clock domain crossing management. There can be several clock domains and the number of clock domains may vary according to implementation; in one embodiment there are four clock domains. The inventive Packet Ingress/Egress Block (PE/IB) may operate in the Line Domain, but presents its outputs using double-buffers, FSLs, Dual-port RAM, and Memory Controllers. Specifically, Manager 4900 may interact with the Host domain through Metastability Hardening block 4910. The circuit techniques used in Metastability Hardening block 4910 act to reduce the effects of metastability caused at the boundary of dissimilar clock domains. The specific techniques used are not critical to the invention. Context Copier 4920 interacts with the Computing Domain through FSLs 4930 and Dual-Port RAM 4940. FSLs include FIFOs; FIFOs and Dual-Port RAMs both, by definition, include two ports with independent clocks, and are intended, among other things, for use in crossing clock domain boundaries. Their use in this manner is common amongst those skilled in the art. Payload Copier 4950 interacts with the Memory Domain through Memory Controller 4960. In fact, each memory may have a different timing domain (especially if asynchronous); each individual memory controller would then effect that transition.

In the embodiment of FIG. 49 there are only two values of clock frequency used. The Line Domain operates at 125 MHz and the others operate at 100 MHz. But because the other domains do not interact with each other, each could use a clock frequency different from the other and from the Line Domain with no change in circuit.

It may be appreciated that although some of the elements that may be used to cross the clock boundaries may be known for their use in crossing clock domains, it is the architecture or construction of the Packet Ingress/Egress Block that allows such elements to be used by providing a decomposition that decouples the regions that may have different clock domains.

Initialization of the Packet Ingress/Egress Block can be accomplished by any suitable means; the preferred embodiment includes registers for any values that need to be established at system start-up. Those registers are accessible by address for modification via Host Interface 840.

Figure 50:
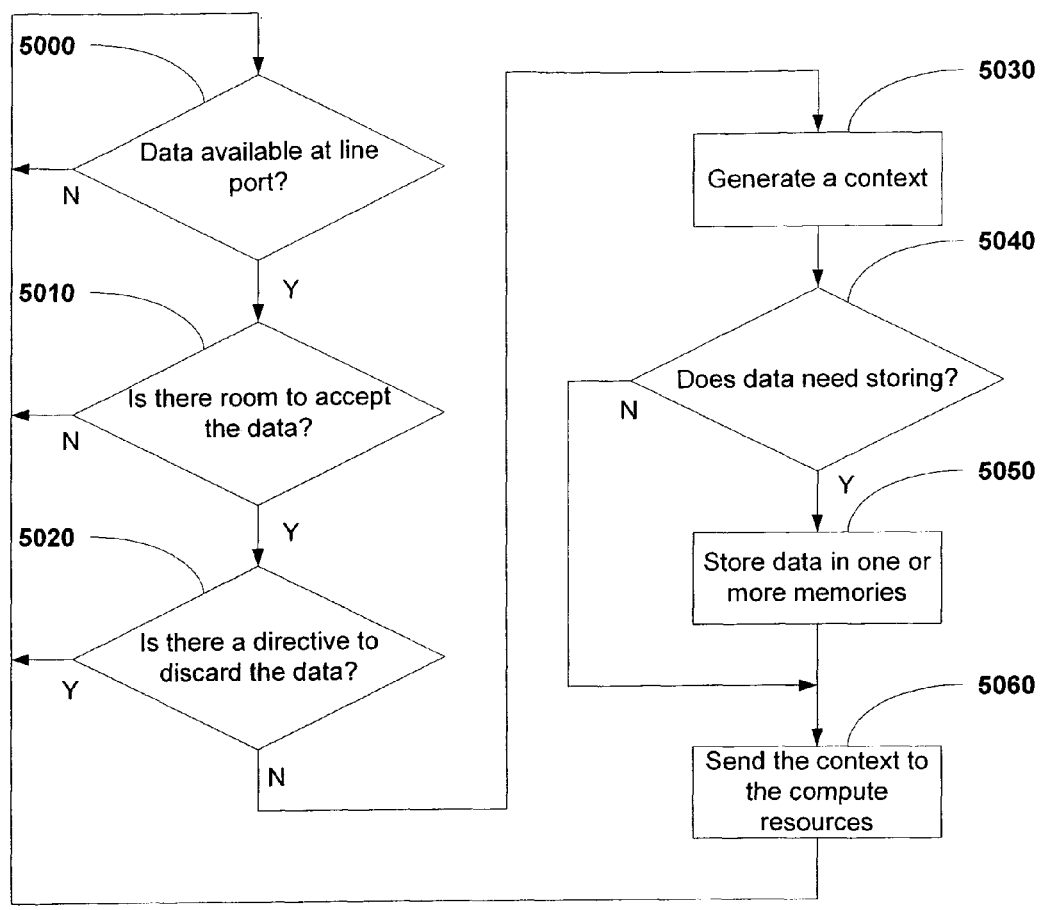
FIG. 50 illustrates an exemplary process that may be executed by an embodiment of the Packet Ingress/Egress Block.

A example of one of the processes executed by the Packet Ingress/Egress Block, exemplary embodiments of which are described above, is shown in FIG. 50. The line ports are checked for incoming data (Step 5000); if no data is available then the line ports are checked again. When data is available, a check is made whether there is room in the system to accept the data (Step 5010). If there is no room, then that incoming data is discarded and the system returns to looking for new incoming data (Step 5000). If there is room to accept the data, then the system listens for a directive from the unit sending the data indicating whether the data should be discarded (Step 5020). If that directive arrives, then the system discards the incoming data by returning to listen for new incoming data (Step 5000). If no such directive arrives, then a Context is formed (Step 5030), and the system checks to see whether data needs storing in memory (Step 5040). If so, the data is stored in one or more memories (Step 5050), after which the context is sent to the computing resources (5060). If no data needs storing as determined in Step 5040, then Step 5050 is skipped, and the system moves directly to Step 5060. After the system completes Step 5060, it returns to Step 5000 to look for more incoming data.

Figure 51:
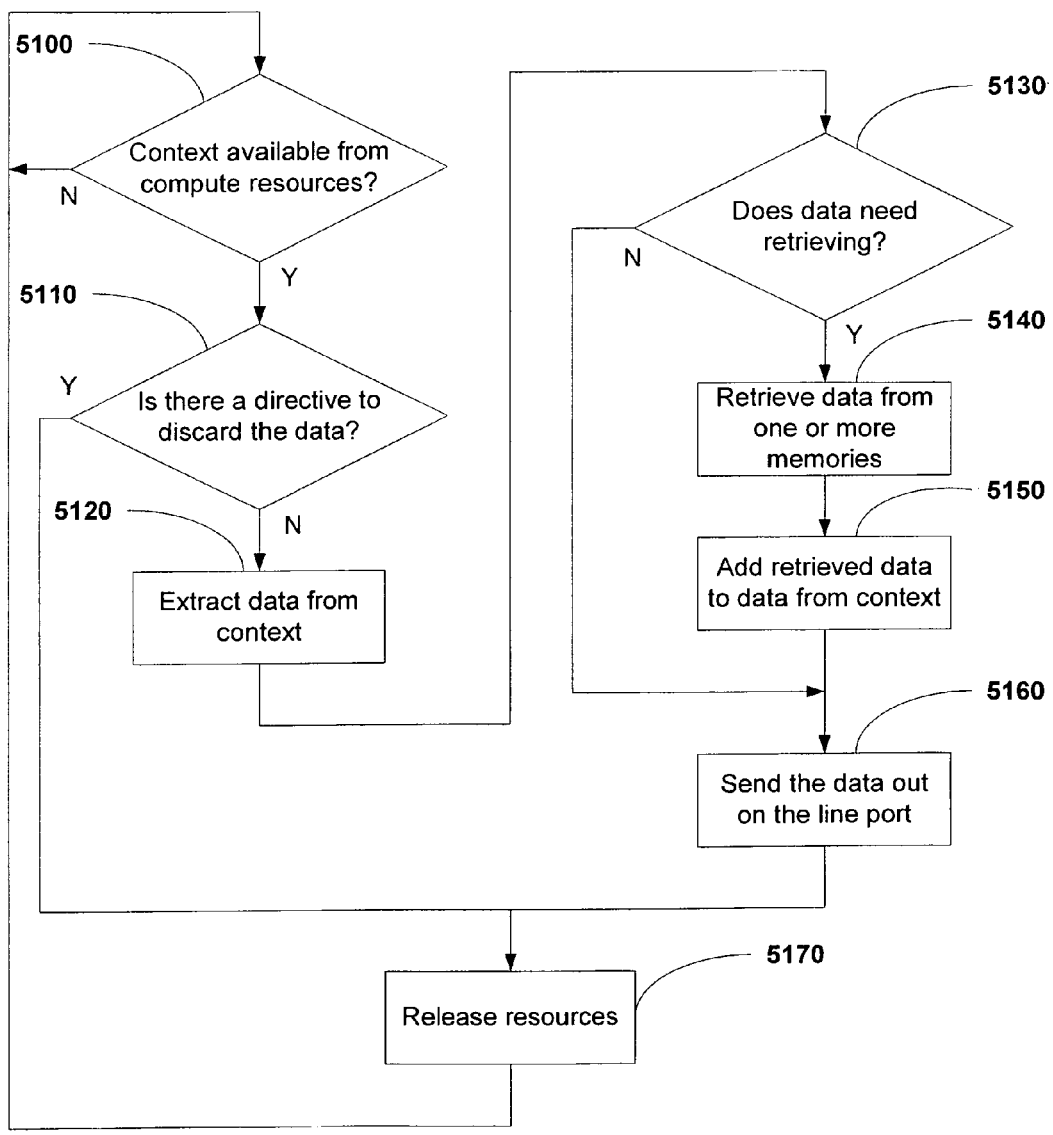
FIG. 51 illustrates another exemplary process that may be executed by an embodiment of the Packet Ingress/Egress Block.

Another of the processes executed by the Packet Ingress/Egress Block is presented in the exemplary embodiment in FIG. 51. In this process, the system checks to see if there is a context available from the compute resources (Step 5100). If not then the system returns to check again. If a context is available, then the system checks to see if it should discard the data (Step 5110). If so, then the resources associated with the context are released (Step 5170), and the system looks for another context in Step 5100. If the context is not to be discarded in Step 5110, then the system extracts relevant data from the context (Step 5120), and may need to retrieve additional data from memory (Step 5130). If so, then the data is retrieved from one or more memories (Step 5140) and is combined with the data extracted from the context (5150); the combined data is then sent out on the line port (Step 5160). If no additional data needed retrieving in Step 5130, then Steps 5140 and 5150 are bypassed, and the data is sent to the line port in Step 5160. After the data is sent out, the context resources are released (Step 5170), and the system returns to look for the next incoming context.

Figure 52:
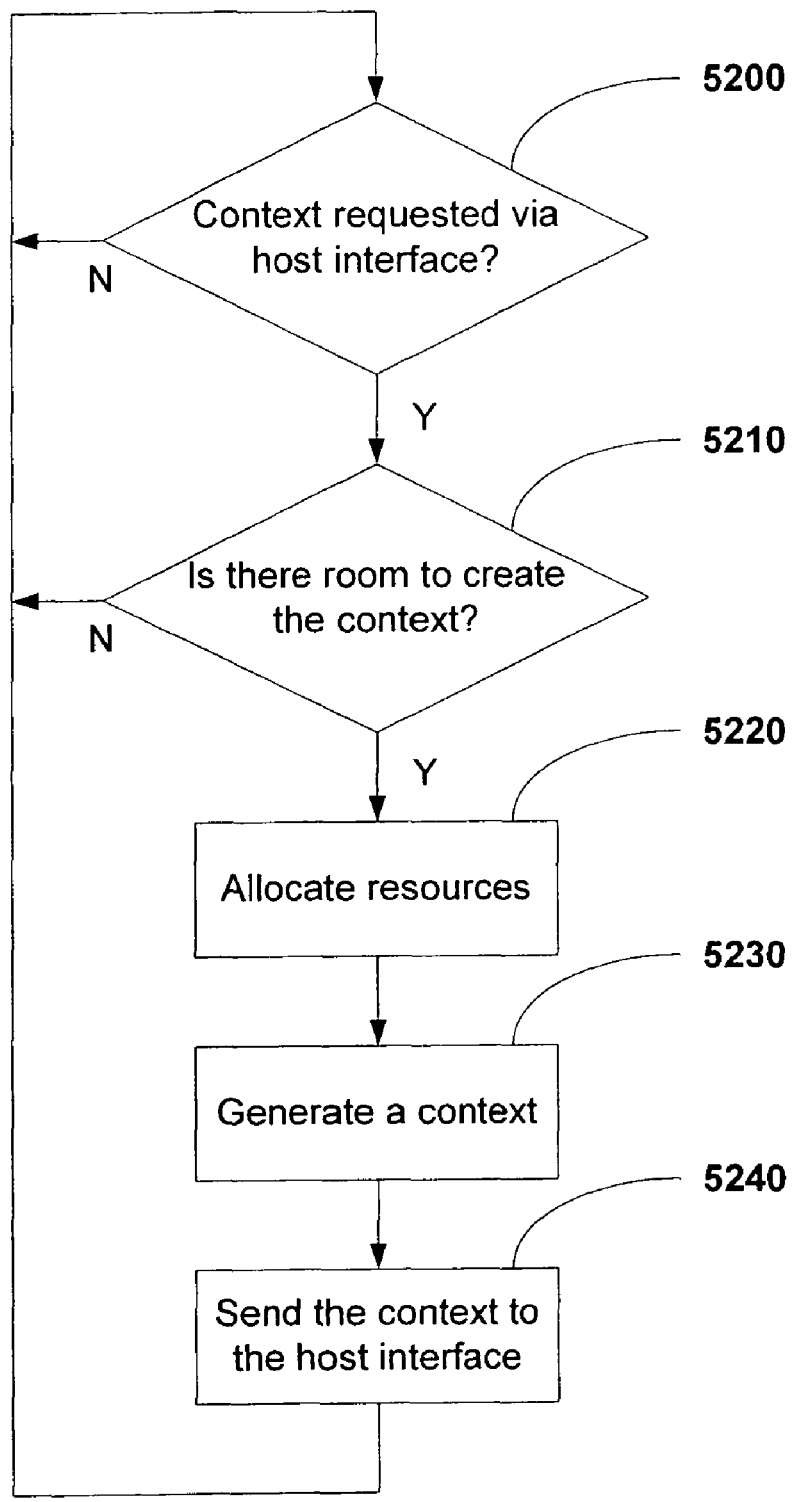
FIG. 52 illustrates still another exemplary process that may be executed by an embodiment of the Packet Ingress/Egress Block.

Yet another process executed by the Packet Ingress/Egress Block is presented in the exemplary embodiment of FIG. 52. Here a context can be requested via the host interface by a host. The system listens for a request (Step 5200); if one comes, then a check is made to ensure resources are sufficient (Step 5210); if so, then resources are allocated (Step 5220), a context is generated (Step 5230), and is sent to the host interface (Step 5240).

Figure 53:
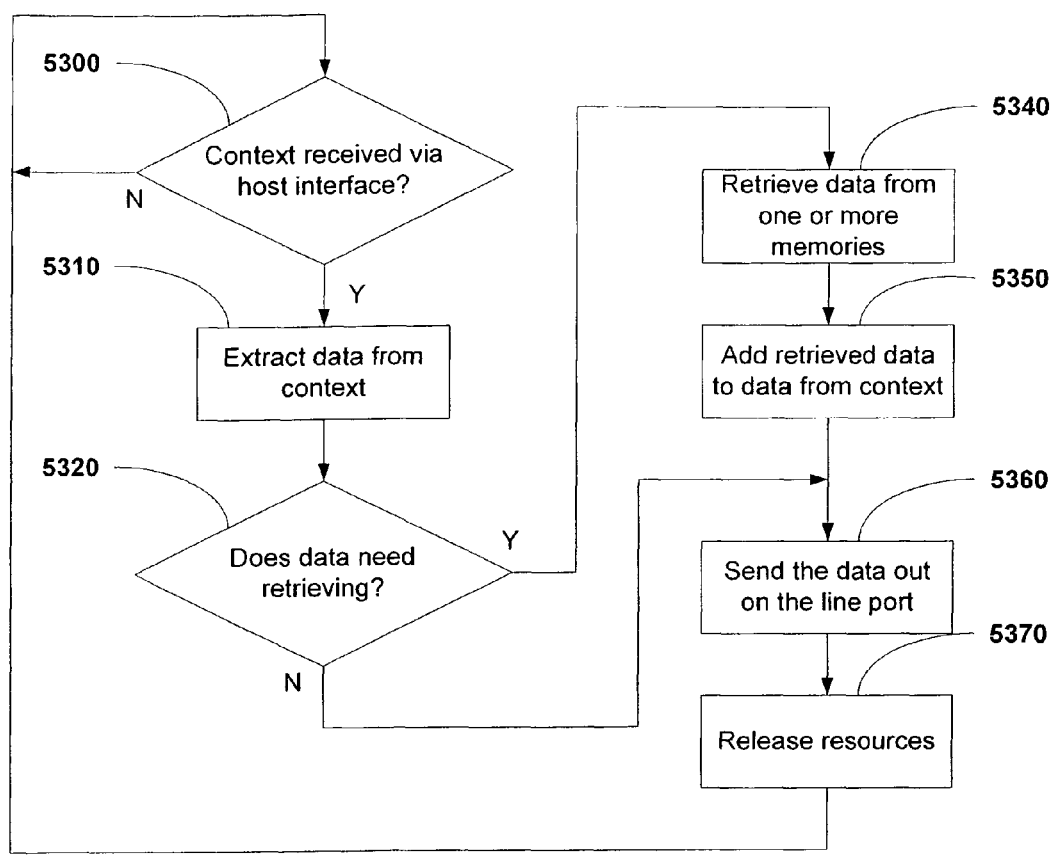
FIG. 53 illustrates still another exemplary process that may be executed by an embodiment of the Packet Ingress/Egress Block.

Yet another process executed by the Packet Ingress/Egress Block is presented in the exemplary embodiment in FIG. 53. Here a context can be delivered from a host via the host interface. The system looks for a context on the host interface (Step 5300); if one is found, then the system extracts relevant data from the context (Step 5310), and may need to retrieve additional data from memory (Step 5320). If so, then the data is retrieved from one or more memories (Step 5340) and is combined with the data extracted from the context (5350); the combined data is then sent out on the line port (Step 5360). If no additional data needed retrieving in Step 5320, then Steps 5340 and 5350 are bypassed, and the data is sent to the line port in Step 5360. After the data is sent out, the context resources are released (Step 5370).

It may be appreciated that various procedures and methods are described herein and are susceptible to implementation as or within computer programs. These computer programs may be stored on computer readable media for storage and may be executed within a processor or processing logic on a general purpose or special purpose computer.

Additional Description

As used herein, the term "embodiment" means an embodiment that serves to illustrate by way of example but not limitation.

It will be appreciated to those skilled in the art that the preceding examples and preferred embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

We claim:

1. A system comprising:
   at least one line port for receiving units of information from a source;
   a receiver circuit coupled to the at least one line port and comprising a plurality of receiver port blocks, each receiver port block configured to:
      extract a context from a received unit of information, the context representing information associated with the received unit of information for processing at a computing resource,
      extract a payload from the received unit of information, the payload representing information associated with the received unit of information not subject to processing at the computing resource, the payload comprising at least a first segment and a second segment,
      send the extracted context to the computing resource for processing,
      store the first segment of the extracted payload in a memory device, and
      store the second segment of the extracted payload in another memory device; and
   a transmitter circuit coupled to the computing resource and the memory device, the transmitter circuit comprising a plurality of transmitter port blocks, each transmitter port block paired with a fixed corresponding receiver port block and configured to:
      receive, from the computing resource, a processed context corresponding to the context extracted by the paired receiver port block,
      receive the first segment of the payload stored by the paired receiver port block from the memory device,
      receive the second segment of the payload stored by the paired receiver port block from the other memory device,
      generate a processed unit of information by combining the processed context, the first segment of the received payload and the second segment of the received payload, and
      send the processed unit of information to a destination.

2. The system as in claim 1, wherein the context includes information comprising a portion of the received unit of information.

3. The system as in claim 1, wherein the context includes information comprising all of the received unit of information.

4. The system as in claim 1, wherein the context includes information comprising at least a portion of the received unit of information and other information.

5. The system as in claim 1, wherein the at least one line port comprises a plurality of line ports.

6. The system as in claim 1, wherein the unit of information comprises at least one of a packet and a cell, and the packet and cell each comprising payload data, a header, and a trailer.

7. The system as in claim 6, wherein the received unit of information and the processed unit of information are the same format.

8. The system as in claim 1, wherein the received unit of information is a packet conforming to Ethernet standard.

9. The system as in claim 1, wherein the received unit of information is a cell conforming to Asynchronous Transfer Mode (ATM) standard.

10. The system as in claim 6, wherein the received unit of information and the processed unit of information are different formats.

11. The system as in claim 7, wherein the received unit of information and the processed unit of information conform to the Ethernet standard format.

12. The system as in claim 7, wherein the received unit of information and the processed unit of information conform to the Asynchronous Transfer Mode (ATM) standard format.

13. The system as in claim 1, wherein the system is fabricated on at least one integrated circuit chip comprising the memory device.

14. The system as in claim 1, wherein the system is fabricated on a first integrated circuit chip and a second integrated circuit chip, the memory device located on the first integrated circuit chip, the receiver circuit and the transmitter circuit located on the second integrated circuit chip.

15. The system as in claim 1, wherein the memory comprises a Static Random Access Memory (SRAM).

16. The system as in claim 1, wherein the memory comprises a Dynamic Random Access Memory (DRAM).

17. The system as in claim 1, wherein the received unit of information is discarded responsive to receiving an instruction to discard from the source.

18. The system as in claim 1, wherein the processed unit of information is discarded responsive to receiving an instruction from the computing resource.

19. The system as in claim 1, wherein the context includes at least one computation management information item.

20. The system as in claim 19, wherein an arrival time of the received unit of information is recorded as a computation management item.

21. The system as in claim 19, wherein a size of the received unit of information from the source is recorded as one of the computation management items.

22. The system as in claim 19, wherein a start of computation is recorded as one of the computation management items.

23. The system as in claim 1, wherein the units of information are created responsive to receiving a request from a host.

24. The system as in claim 1, wherein operating statistics are maintained and reported to a host.

25. The system as in claim 1, further comprising a mechanism for managing independent clock domains for the at least one line port, a host interface for communicating with a host, at least one computing resource output port, and the memory, and the other memory.

26. The system as in claim 1, further comprising a host interface for receiving instructions to initialize the system.

27. The system as in claim 26, further comprising registers that can be accessed, addressed, and modified via the host interface to initialize the system.

28. A circuit comprising:
   a first circuit component including at least one line port that receives a unit of information from a source;
   a second circuit component coupled to the at least one line port and comprising a plurality of receiver port blocks, each receiver port block configured to:
      extract a context from a received unit of information, the context representing information associated with the received unit of information for processing at a computing resource,
      extract a payload of the received unit of information, the payload representing information associated with the received unit of information not subject to processing at the computing resource, the payload comprising at least a first segment and a second segment,
      send the extracted context to the computing resource for processing,
      store the first segment of the extracted payload in a memory device, and
      store the second segment of the extracted payload in another memory device; and
   a third circuit component comprising a plurality of transmitter port blocks, each transmitter port block paired with a fixed corresponding receiver port block and configured to:
      receive a processed context from the computing resource, the processed context corresponding to the context extracted by the paired receiver port block,
      receive the first segment of the extracted payload stored by the paired receiver port block from the memory device,
      receive the second segment of the extracted payload stored by the paired receiver port block from the other memory device,
      generate a processed unit of information by combining the processed context, the received first segment of the payload, the received second segment of the payload, and
      send the processed unit of information to a destination.

29. The circuit as in claim 28, further comprising:
   a host interface for coupling the circuit to an external host, the host including a processor.

30. The circuit as in claim 28, further comprising:
   a memory interface for coupling the circuit to the memory device.

31. A method comprising:
   receiving units of information via a line port;
   extracting contexts of the received units of information at a plurality of receiver port blocks in parallel, the context representing information associated with a received unit of information for processing at a computing resource;
   extracting payloads of the received units of information at the plurality of receiver port blocks in parallel, the payload representing information associated with the received unit of information not subject to processing at the computing resource, each of the payloads comprising at least a first segment and a second segment;
   sending the extracted contexts to the computing resource for processing;
   storing first segments of the extracted payloads in a memory device;
   storing second segments of the extracted payloads in another memory device;
   receiving processed contexts from the computing resource at a plurality of transmitter port blocks, each transmitter port block paired with a fixed corresponding receiver port block;
   receiving, at each of the plurality of transmitter port blocks, the first segment of the payload stored by the paired receiver port block from the memory device;
   receiving, at each of the plurality of transmitter port blocks, the second segment of the payload stored by the paired receiver port block from the other memory device;
   generating processed units of information at the plurality of transmitter port blocks in parallel by combining the processed contexts with the received first segments of the payloads and the received second segments of the payloads, wherein each of the plurality of transmitter port blocks receives a processed context extracted by the paired receiver port block; and
   sending the processed units of information to a destination.

32. The method as in claim 31, further comprising discarding a unit of information if there are insufficient resources in a system to handle the unit of information.

33. The method as in claim 31, further comprising discarding a unit of information if so directed by the source of the unit of information.

* * * * *